(12) United States Patent
Reznik

(10) Patent No.: US 8,571,340 B2
(45) Date of Patent: Oct. 29, 2013

(54) EFFICIENT FIXED-POINT APPROXIMATIONS OF FORWARD AND INVERSE DISCRETE COSINE TRANSFORMS

(75) Inventor: Yuriy Reznik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1290 days.

(21) Appl. No.: 11/766,653

(22) Filed: Jun. 21, 2007

(65) Prior Publication Data

US 2007/0297502 A1 Dec. 27, 2007

Related U.S. Application Data

(60) Provisional application No. 60/841,362, filed on Aug. 30, 2006, provisional application No. 60/847,194, filed on Sep. 25, 2006, provisional application No. 60/829,669, filed on Oct. 16, 2006, provisional application No. 60/869,530, filed on Dec. 11, 2006, provisional application No. 60/883,932, filed on Jan. 8, 2007, provisional application No. 60/816,697, filed on Jun. 26, 2006, provisional application No. 60/896,778, filed on Mar. 23, 2007, provisional application No. 60/909,335, filed on Mar. 30, 2007.

(51) Int. Cl.
*G06K 9/36* (2006.01)

(52) U.S. Cl.
USPC .......................................... 382/250; 375/240

(58) Field of Classification Search
USPC .................... 382/232, 250; 375/240
See application file for complete search history.

(56) References Cited

U.S. PATENT DOCUMENTS

| | | | | |
|---|---|---|---|---|
| 5,129,015 A | * | 7/1992 | Allen et al. | 382/167 |
| 5,285,402 A | * | 2/1994 | Keith | 708/402 |
| 5,642,438 A | * | 6/1997 | Babkin | 382/250 |
| 5,754,456 A | | 5/1998 | Eitan et al. | |
| 5,974,185 A | | 10/1999 | Boyce et al. | |

(Continued)

FOREIGN PATENT DOCUMENTS

| | | |
|---|---|---|
| CN | 1653822 A | 8/2005 |
| EP | 0955608 | 11/1999 |

(Continued)

OTHER PUBLICATIONS

Weiping Li; "A new algorithm to compute the DCT and its inverse"; Jun. 1991, IEEE Transactions on signal processing, 1305-1313.*

(Continued)

*Primary Examiner* — Chan S Park
*Assistant Examiner* — Eueng-Nan Yeh
(74) *Attorney, Agent, or Firm* — Brent Boyd

(57) ABSTRACT

Techniques are described to approximate computation of an inverse discrete cosine transform using fixed-point calculations. According to these techniques, matrixes of scaled coefficients are generated by multiplying coefficients in matrixes of encoded coefficients by scale factors. Next, matrixes of biased coefficients are generated by adding a midpoint bias value to a DC coefficient of the matrix of scaled coefficients. Fixed-point arithmetic is then used to apply a transform to the matrixes of biased coefficients. Values in the resulting matrixes are then right-shifted in order to derive matrixes of pixel component values. Matrixes of pixel component values are then combined to create matrixes of pixels. The matrixes of pixels generated by these techniques closely resemble matrixes of pixels decompressed using the ideal inverse discrete cosine transform ("IDCT").

66 Claims, 12 Drawing Sheets

(56) References Cited

U.S. PATENT DOCUMENTS

| | | | |
|---|---|---|---|
| 6,009,207 | A | 12/1999 | Chen |
| 6,020,838 | A | 2/2000 | Knudsen et al. |
| 6,026,183 | A | 2/2000 | Talluri et al. |
| 6,167,092 | A | 12/2000 | Lengwehasatit |
| 6,292,817 | B1 * | 9/2001 | Matsui .................. 708/402 |
| 6,529,634 | B1 | 3/2003 | Thyagarajan et al. |
| 6,539,058 | B1 | 3/2003 | Pearlstein et al. |
| 6,694,342 | B1 | 2/2004 | Mou |
| 6,704,358 | B1 | 3/2004 | Li et al. |
| 6,735,609 | B2 | 5/2004 | Dixit et al. |
| 6,799,192 | B1 | 9/2004 | Handley |
| 6,909,753 | B2 | 6/2005 | Meehan et al. |
| 7,054,493 | B2 | 5/2006 | Schwartz |
| 2001/0026642 | A1 | 10/2001 | Kang et al. |
| 2002/0010729 | A1 | 1/2002 | Dixit et al. |
| 2002/0090028 | A1 | 7/2002 | Comer et al. |
| 2002/0090029 | A1 | 7/2002 | Kim |
| 2002/0154693 | A1 | 10/2002 | Demos et al. |
| 2003/0078953 | A1 | 4/2003 | Hallapuro et al. |
| 2003/0177158 | A1 | 9/2003 | Zheltov et al. |
| 2004/0010528 | A1 | 1/2004 | Kumar et al. |
| 2004/0091157 | A1 | 5/2004 | Kang |
| 2004/0117418 | A1 | 6/2004 | Vainsencher et al. |
| 2005/0004962 | A1 | 1/2005 | Ju |
| 2005/0033788 | A1 | 2/2005 | Handley |
| 2005/0050128 | A1 | 3/2005 | Ju |
| 2005/0196055 | A1 | 9/2005 | Zhong et al. |
| 2006/0129622 | A1 | 6/2006 | Dang |
| 2007/0003153 | A1 | 1/2007 | Miller-Smith |
| 2007/0297503 | A1 | 12/2007 | Reznik |
| 2007/0297504 | A1 | 12/2007 | Reznik et al. |
| 2007/0299897 | A1 | 12/2007 | Reznik |
| 2008/0095245 | A1 | 4/2008 | Reznik |

FOREIGN PATENT DOCUMENTS

| | | |
|---|---|---|
| EP | 0990992 | 4/2000 |
| GB | 2304946 A | 3/1997 |
| JP | 2002537736 A | 11/2002 |
| JP | 2002374531 A | 12/2002 |
| JP | 2005157832 | 6/2005 |
| KR | 1019990087552 | 12/1999 |
| KR | 1020000013653 | 3/2000 |
| KR | 1020030045028 | 6/2003 |
| KR | 1020060135613 | 12/2006 |
| RU | 2119727 | 9/1998 |
| RU | 2122295 | 11/1998 |
| RU | 2128405 | 3/1999 |
| RU | 2196391 | 1/2003 |
| RU | 2273112 | 3/2006 |
| TW | 395135 | 6/2000 |
| TW | 224931 | 12/2004 |
| WO | WO9210925 A1 | 6/1992 |
| WO | WO9421083 A1 | 9/1994 |
| WO | WO9733236 A1 | 9/1997 |
| WO | WO9834406 A1 | 8/1998 |
| WO | WO9939303 | 8/1999 |
| WO | WO0049810 A1 | 8/2000 |
| WO | 0135673 A1 | 5/2001 |
| WO | WO0251160 | 6/2002 |
| WO | WO2008002881 | 1/2008 |

OTHER PUBLICATIONS

Gregor Rozinaj et al.; "Approximation of DCT without multiplication in JPEG"; Oct. 1996, IEEE ICECS '96 Proceeding, 704-707.*

Vassil Dimitrov et al.; "Multiplierless DCT algorithm for image compression applications"; vol. 11, No. 2, 2004, International Journal Information Theories & Applications, 162-169.*

C. Loeffler, A Ligtenberg, and GS Moschytz, "Practical Fast 1-D DCT algorithms with 11 multiplications," Proc. IEEE International Conference on Acoustic, Speech, and Signal Proc. (ICASSP), vol. 2, pp. 988-991, May 1989.

IEEE CAS Standards Committee, "IEEE Standard Specifications for the Implementations of 8×8 Inverse Discrete Cosine Transform", IEEE Standard 1180-1190, Dec 6, 1990, pp. 1-12.

ISO/IEC 11172:1992 "Information Technology—Coding of moving pictures and associated audio for digital storage media at up to about 1,5 Mbit/s—Part 2—Video," pp. 1-27, (earlier than this application Jun. 21, 2007).

ISO/IEC 14496-2:2001 "Information technology—Coding of Audio-visual objects—Part2: Visual," Jul. 2001, PART1, pp. 1-249.

ISO/IEC 14496-2:2001 "Information technology—Coding of audio-visual objects—Part2: Visual," Jul. 2001, PART2, pp. 1-99.

ISO/IEC JTC1/SC29/WG11 N7335, "Call for Proposals on Fixed-Point 8×8 IDCT and DCT Standard," Poznan, Poland, Jul. 2005, pp. 1-18.

M. Vetterli and A. Ligtenberg, A Discrete Fourier-Cosine Transform Chip, IEEE Journal on Selected Areas in Communications, vol. SAC-4, No. 1, Jan. 1986 pp. 49-61.

M12936: C-X Zhang and L.Yu, "Low complexity and High Fidelity Fixed-Point Multiplier-less DCT/IDCT Implementation Scheme," ISO/IEC JTC1/SC29/WG11 MPEG 2006/M12936, Jan. 2006, Bangkok, Thailand, pp. 1-10.

M13001: Yuriy A. Reznik and Arianne T. Hinds, "Improved Proposal for MPEG Fixed-Point 8×8 IDCT Standard," ISO/IEC JTC1/SC29/WG11 MPEG2006/M13001, Jan. 2006, Bangkok, Thailand, pp. 1-22.

M13256: C-X Zhang and L. Yu, "Improved Fixed-Point DCT/IDCT Implementation Scheme with Low Complexity and High FIdelity," ISO/IEC JTC1/SC29/WG11 MPEG2006/M13256, Apr. 2006, Montreux, Switzerland, pp. 1-6.

M13299: Trac D Tran, Lijie Liu, Pankaj Topiwala. "Improved High-Accuracy Multiplierless DCT/IDCT Based on the Lifting Scheme," ISO/IEC JTC1/SC29/WG11 MPEG2006/M13299, Apr. 2006, Montreux, Switzerland, pp. 1-5.

M13326: Yuriy A. Reznik and Arianne T. Hinds, "Proposed Core Experiement on Exploration on Convergence of Scaled and Non-Scaled IDCT Designs," ISO/IEC JTC1/SC29/WG11 MPEG2006/M13326, Apr. 2006, Montreux, Switzerland, pp. 1-9.

M13375: Michael A. Isnardi, "Description of Sample Bitstrearn for Testing IDCT Linearity," ISO/IEC JTC1/SC29/WG11 MPEG2006/M13375, Apr. 2006, Montreux. Switzerland, pp. 1-8.

MPEG-2 TM5 Encoder / Decoder, Version 1.2, Jul. 19, 1995, MPEG Software Simulation Group, pp. 1-4.

Y.Arai, T. Agui, and M. Nakajima, "A Fast DCT-SQ Scheme for Images", Transactions of the IEICE vol. E 71, No. 11 Nov. 1988, pp. 195-1097.

Hassan EL-Banna et al.; An efficient implementation of the 1D DCT using FPGA technology. Dec. 2003, Microelectronics Proceedings of the 15th International Conference, 278-281.

Hinds, et al.: "On IDCT Exactness, Precision, and Draft Problem," International Organization for Standardization ISO/IEC JTC1 SC29/WG11 Coding of Moving Pictures and Audio, No. M13657, pp. 1-15, Jul. 17, 2006, XP030042326.

ISO/IEC JTC 1/SC 29/WG11 N7815 [23002-1 FDIS] "Information technology—MPEG video technologies—Part 1: Accuracy requirements for implementation of integer-output 8×8 inverse discrete cosine transform," Jan. 20, 2006, pp. 1-18. (resubmitting).

ISO/IEC JTC1/SC29/WG11 N7817 [23002-2 WD1] "Information technology—MPEG Video Technologies—Part 2: Fixed-point 8×8 IDCT and DCT transforms," Jan. 19, 2006, pp. 1-27. (resubmitting).

ISO/IEC JTC1/SC29/WG11N7292 [11172-6 Study on FCD] Information Technology—Coding of Moving Pictures and Associated Audio for Digital Storage Media at up to About 1.5 Mbit/s—Part 6: Specification of Accuracy Requirements for Implementation of Integer Inverse Discrete Cosine Transform, IEEE standard 1180-1190, pp. 1-14, Approved Dec. 6, 1990. (resubmitting).

ITU-T Recommendation H263: Series H: Audiovisual and multimedia systems—Infrastructure of Audiovisual services—coding of moving video—Video Coding for Low Bit Rate Communication, Jan. 13, 2005, pp. 1-226. (resubmitting).

James D. Allen et al.; "The multiply-free chen transform—a rational approach to JPEG"; 1991, Picture Coding Symposium PCS 91; 8.6-1 to 8.6-4, (Earlier than this application Jun. 2006).

(56) References Cited

OTHER PUBLICATIONS

Lee, Ying-Pin et al. "A Cost Effective Architecture for 8×8 two-Dimensional DCT/IDCT Using Direct Method", IEEE Transactions on Circuits and Systems for Video Technology, vol. 7, No. 3, pp. 459-467, Jun. 1997.
Rao, et al.: "Discrete cosine transform: algorithms, advantages, applications," Academic Press Professional, Inc., San Diego, CA, pp. 490, ISBN: 0-12-580203-X, 1990, CH. 3-4, (Earlier than this application Jun. 2006).
Reznik: "On clipping and dynamic range of variables in IDCT designs". ISO/IEC JTC/SC29 WG11 input document MPEG2006/M14004, Oct. 2006, Hangzhou China, pp. 1-8, XP030042672.
Seehyun Kim et al.; "Fixed-point error analysis and wordlength optimization of a distributed arithmetics based 8×8 2D-IDCT architecture"; 1996, Workshop on VLSI signal processing IX; 398-407, (Earlier than this application Jun. 2006).
Taiwanese Search report—096123080—TIPO—Jul. 15, 2010.
Testform.zip file, sent on IDCT reflector [mpeg-vidct@lists.rwth-aachen.de] by Lijie Liu, (Earlier than this application Jun. 2006).
XVID open source implementation of MPEG-4 ASP: http://downloads.xvid.org/downloads/xvidcore-1.1.0.tar.gz, (Apr. 2005).
Zhou, et al..: "IDCT output range before clipping in MPEG video coding," Signal Processing: Image Communication, vol. 11, No. 2, pp. 137-145, Dec. 1997, XP004100330.
International Search Report-PCT/US2007/082291, International Searching Authority-European Patent Office-May 2, 2008.
Written Opinion-PCT/US2007/082291, International Searching Authority-European Patent Office-May 2, 2008.
Bivolarksi L: "Low complexity 1D IDCT for 16-bit parallel architectures" Applications of Digital Signal Processing XXX, Proceedings of SPIE, vol. 6696, Sep. 24, 2007, pp. 669619-1-669619-8, XP002605975.
Bivolarski L et al: "m13993.zip" Screenshot of Content of Compressed File M13993. Zip, Oct. 23, 2006, XP002605952.
Bivolarski L et al: "On implementation of IDCTs on existing 16-bit architectures" ISO/IEC JTC1/SC29/WG11 M13993, Oct. 2006, Hangzhou, China, Oct. 23, 2006, XP030042661.
Bivolarski L: "16-bit fixed-point 8×8 IDCT implementation" ISO/IEC JTC1/SC29/WG11 M13500, Jul. 2006, Klagenfurt, Austria, Jul. 12, 2006, XP030042169.
Bivolarski L: "IDCT16.C . . . txt" C Code Submitted With Contribution Document M13500, Jul. 12, 2006, XP002605950.
Bivolarski L: "m13500.zip" Screenshot of Content of Compressed File M13500.Zip, Jul. 12, 2006, XP002605951.
Ci-Xun Zhang et al: "Extended Results for Fixed-Point 8×8 DCT/IDCT Design and Implementation" ISO/IEC JTC1/SC29/WG11 M12935, Jan. 2006, Bangkok, Thailand, no. M12935, Jan. 19, 2006, XP030041604.
Ci-Xun Zhang et al: "Systematic approach of fixed point 8×8 IDCT and DCT design and implementation" Picture Coding Symposium 2006, Apr. 24-26, 2006, Beijing, China, Apr. 24, 2006, XP030080252.
Ci-Xun Zhang et al:"m12935-idct-high-accuracy. C" Code Submitted With Contribution Document M12935, Jan. 19, 2006, XP002605954.
Ci-Xun Zhang: "m12935.zip" Screenshot of Content of Compressed File M12935.Zip, Jan. 19, 2006, XP002605955.
Jan Richardson, Video Encoding H.264 and MPEG-4—Standards of New Generation, Moscow, Technosfera, 2005, pp. 70-85. (Published before this application Jun. 2006).
Reznik Y et al: "Additional information on IDCT CD candidates and proposed core experiments" ISO/IEC JTC1/SC29/WG11 M14005, Oct. 2006, Hangzhou, China, Oct. 25, 2006, XP030042673.
Reznik Y et al: "Efficient fixed-point approximations of the 8×8 Inverse Discrete Cosine Transform" Applications of Digital Signal Processing XXX, Proceedings of SPIE, vol. 6696, Sep. 24, 2007, pp. 669617-1-669617-17, XP002489240 ISSN: 0277-786X.
Reznik Y et al: "idct Z1.c" C Code Submitted With Contribution Document M13650, Jul. 13, 2006, pp. 4, XP002605956.
Reznik Y et al: "idct_L1.c" C Code Submitted With Contribution Document M14168, Jan. 18, 2007, XP002606534.
Reznik Y et al: "m13650.zip" Screenshot of Content of Compressed File M13650.Zip, Jul. 13, 2006, XP002605957.
Reznik Y et al: "m14005.zip" Screenshot of Content of Compressed File M14005.Zip, Oct. 25, 2006, XP002605953.
Reznik Y et al: "Response to CE on convergence of scaled and non-scaled IDCT architectures" ISO/IEC JTC1/SC29/WG11 M13650, Jul. 2006, Klagenfurt, Austria, Jul. 13, 2006, XP030042319.
Reznik Y: "m14167.zip" Screenshot of Content of Compressed File M14167.Zip, Jan. 10, 2007, XP002606533.
Reznik Y: "Summary of core experiments on fixed-point IDCT/DCT" ISO/IEC JTC1/SC29/WG11 M14167, Jan. 2007, Marrakech, Marocco, Jan. 10, 2007, XP030042823.
Sullivan G: "Standardization of IDCT approximation behavior for video compression: the history and the new MPEG-C parts 1 and 2 standards" Applications of Digital Signal Processing XXX, Proceedings of SPIE, vol. 6696, Sep. 24, 2007, pp. 669611-1-669611-22, XP002489241 ISSN: 0277-786X.
Trac D Tran et al: "FastVDO 16-bis IDCT proposal for CD" ISO/IEC JTC1/SC29/WG11 M13847, Sep. 2006, Hangzhou, China, Sep. 17, 2006, pp. 2, XP030042515.
Trac D Tran et al: "m13847.zip" Screenshot of Content of Compressed File MI3847.Zip, Oct. 17, 2006, XP002605960.
Video Subgroup: ISO-IEC-23002-2_(WD2). doc Working Draft Submitted With Output Document N8255, Jul. 21, 2006, pp. 1-19, XP002605958.
Video Subgroup: "w8255.zip" Screenshot of Content of Compressed File W8255.Zip, Jul. 21, 2006, XP002605959.
Video Subgroup: "Working Draft 2.0 of ISO/IEC 23002-2 Fixed point IDCT and DCT" ISO/IEC JTC1/SC29/WG11 N8255, Jul. 2006, Klagenfurt, Austria, Jul. 21, 2006, XP030014747.
Zhibo Ni et al: "Cross-check of IDCT core experiments" (ISO/Iec JTC1/SC29/WG11 M14168, Jan. 2007, Marrakech, Marocco, Jan. 18, 2007, XP030042824.
Zhibo Ni et al: "m14168.zip" Screenshot of Content of Compressed File M14168.Zip, Jan. 18, 2007, XP002606535.
Hinds, A: "m14531.zip," Screenshots of Content of Compressed File M14531.Zip, Apr. 21, 2007 XP002610524.
Hinds, Arianne T.: "Fixed-Point IDCT Conformance Tests," ISO/IEC JTC1/SC29/WG11, MPEG2007/M14531, IBM, San Jose, USA, (Apr. 21, 2007), XP030043168.
International Search Report and Written Opinion—PCT/US2007/072169—ISA/EPO—Dec. 30, 2010.
Reznik, Y. et al.: "idct-z0a.c," C Code Submitted With Contribution Document M14531, (Apr. 21, 2007), XP002610523.
Reznik, Yuriy: "m14506.zip," Screenshot of Content of Compressed File M14506.Zip, (Apr. 19, 2007), XP002610525.
Reznik, Yuriy: "Summary of Core Experiments on fixed point IDCT/DCT, "ISO/IEC JTC1/SC29/WG11, MPEG2006/14506, San Jose, USA, (Apr. 19, 2007), XP030043143.
Video Subgroup: "23002-2-FCD-software.c," C Code Submitted With Output Document N8983, (May 19, 2007), XP002610521.
Video Subgroup: "Text of ISO/IEC FCD 23002-2: Information technology—MPEG video technologies—Part 2: Fixed-point 8×8 IDCT and DCT," ISO/IEC JTC 1/SC29/WG11, Apr. 27, 2007, San Jose, USA, retrieved (May 19, 2007), XP030015477.
Video Subgroup: "w8983.zip", Screenshot of Content of Compressed File W8983.Zip, (May 19, 2007), XP002610522.
Aiyoshi E., "Handbook of Automatic Control", Ohmsha Ltd., Aug. 27, 1997, 1st ed., pp. 188-194.

\* cited by examiner

EFFICIENT FIXED-POINT APPROXIMATIONS OF FORWARD AND INVERSE DISCRETE COSINE TRANSFORMS

This application claims the benefit of U.S. Provisional Application No. 60/816,697, filed Jun. 26, 2006, U.S. Provisional Application No. 60/841,362, filed Aug. 30, 2006, U.S. Provisional Application No. 60/847,194, filed Sep. 25, 2006, U.S. Provisional Application No. 60/829,669, filed Oct. 16, 2006, U.S. Provisional Application No. 60/869,530, filed Dec. 11, 2006, U.S. Provisional Application No. 60/883,932 filed Jan. 8, 2007, U.S. Provisional Application No. 60/896,778, filed Mar. 23, 2007, and U.S. Provisional Application No. 60/909,335, filed Mar. 30, 2007 the entire content of which are hereby incorporated by reference.

TECHNICAL FIELD

The disclosure relates to computer graphics and multimedia, and particularly to compression of graphics, images, and video information.

BACKGROUND

Many existing image and video coding standards employ compression techniques in order to allow high-resolution images and video to be stored or transmitted as a relatively compact files or data streams. Such coding standards include Joint Photographic Experts Group (JPEG), Moving Pictures Experts Group (MPEG)-1, MPEG-2, MPEG-4 part 2, H.261, H.263, and other image or video coding standards.

In accordance with many of these standards, video frames are compressed using "spatial" encoding. These frames may be original frames (i.e., i-frames) or may be residual frames generated by a temporal encoding process that uses motion compensation. During spatial encoding, frames are broken into equal sized blocks of pixels. For example, an uncompressed frame may be broken into a set of 8×8 blocks of pixels. For each block of pixels, pixel components are separated into matrixes of pixel component values. For example, each block of pixels may be divided into a matrix of Y pixel component values, a matrix of U pixel component values, and a matrix of V pixel component values. In this example, Y pixel component values indicate luminance values and U and V pixel component values represent chrominance values.

Furthermore, during spatial encoding, a forward discrete cosine transform (FDCT) is applied to each matrix of pixel component values in a frame that is being encoded. An ideal one-dimensional FDCT is defined by:

$$t(k) = c(k) \sum_{n=0}^{N-1} s(n) \cos \frac{\pi(2n+1)k}{2N}$$

where s is the array of N original values, t is the array of N transformed values, and the coefficients c are given by $c(0)=\sqrt{1/N}, c(k)=\sqrt{2/N}$ for $1 \leq k \leq N-1$.

An ideal two-dimensional FDCT is defined by the formula:

$$t(i,j) = c(i,j) \sum_{n=1}^{N-1} \sum_{m=0}^{N-1} s(m,n) \cos \frac{\pi(2m+1)i}{2N} \cos \frac{\pi(2n+1)j}{2N}$$

where s is the array of N original values, t is the array of N transformed values, and c(i,j) is given by c(i,j)=c(i)c(j), and with c(k) defined as in the one-dimensional case.

A matrix of coefficients is produced when the block of pixel component values is transformed using the FDCT. This matrix of coefficients may then be quantized and encoded using, for example, Huffman or arithmetic codes. A video bitstream represents the combined result of performing this process on all blocks of color component values in a series of video frames in an uncompressed series of video frames.

An uncompressed video frame may be derived from a video bitstream by reversing this process. In particular, to each matrix of coefficients in the bitstream is decompressed and the decompressed values are de-quantized in order to derive matrixes of transformed coefficients. An inverse discrete cosine transform ("IDCT") is then applied to each matrix of transformed coefficients in order to derive matrixes of pixel component values. An ideal one-dimensional IDCT is defined by:

$$s(n) = \sum_{k=0}^{N-1} c(k) t(k) \cos \frac{\pi(2n+1)k}{2N}$$

where s is the array of N original values, t is the array of N transformed values, and the coefficients c are given by $c(0)=\sqrt{1/N}, c(k)=\sqrt{2/N}$ for $1 \leq k \leq N-1$.

An ideal two-dimensional IDCT is defined by the formula:

$$s(m,n) = \sum_{i=0}^{N-1} \sum_{j=0}^{N-1} c(i,j) t(i,j) \cos \frac{\pi(2m+1)i}{2N} \cos \frac{\pi(2n+1)j}{2N}$$

The resulting matrixes of pixel component values are then reassembled into blocks of pixels and these blocks of pixels are be reassembled to form a decoded frame. If the decoded frame is an i-frame, the frame is now completely decoded. However, if the uncompressed frame is a predictive or a bi-predictive frame, the decoded frame is merely a decoded residual frame. A completed frame is generated by constructing a reconstructed frame using motion vectors associated with the decoded frame and then adding the reconstructed frame to the decoded residual frame.

Under ideal circumstances, no information is lost by using an FDCT to encode or an IDCT to decode a block of pixel component values. Consequently, under these ideal circumstances, a decoded version of a video frame is identical to the original version of the video frame. However, computing an FDCT or an IDCT may be computationally difficult because the computation of FDCTs and IDCTs involve the use of real numbers and significant numbers of multiplication operations. For this reason, real numbers used in FDCTs and IDCTs are frequently approximated using limited precision numbers. Rounding errors result from using limited precision numbers to represent real number values. Furthermore, quantization and dequantization may contribute additional errors.

Errors in the compression and decompression process may result in significant differences between the original uncompressed frame and the final uncompressed frame. For example, colors in the final uncompressed frame may differ from colors in the original uncompressed frame. Furthermore, errors caused by a mismatch between the encoder's implementation of the IDCTs and the decoder's implementation of the IDCT may accumulate during the encoding and decoding of sequences of predicted frames. These accumulated errors are commonly referred to as "IDCT drift".

SUMMARY

Techniques are described to approximate computation of an inverse discrete cosine transform using fixed-point calculations. According to these techniques, matrixes of scaled coefficients are generated by multiplying coefficients in matrixes of encoded coefficients by scale factors. Next, matrixes of biased coefficients are generated by adding a midpoint bias value to a DC coefficient of the matrix of scaled coefficients. Fixed-point arithmetic is then used to apply a transform to the matrixes of biased coefficients. Values in the resulting matrixes are then right-shifted in order to derive matrixes of pixel component values. Matrixes of pixel component values are then combined to create matrixes of pixels. The matrixes of pixels generated by these techniques closely resemble matrixes of pixels decompressed using the ideal inverse discrete cosine transform ("IDCT").

In one aspect, a method comprises scaling each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients. In this method, A=1024, B=1138, C=1730, D=1609, E=1264, F=1922, G=1788, H=2923, I=2718, and J=2528. The method also comprises using repeated applications of a fixed-point scaled one-dimensional transform to transform the matrix of scaled coefficients into a matrix of transformed coefficients. In addition, the method comprises right-shifting transformed coefficients in the matrix of transformed coefficients in order to produce a matrix of adjusted coefficients. Each adjusted coefficient in the matrix of adjusted coefficients approximates a corresponding value in a matrix of values that would be produced by applying an ideal two-dimensional IDCT to the matrix of encoded coefficients. Furthermore, the method comprises displaying an 8×8 block of pixels. Each pixel in the 8×8 block of pixels includes a pixel component value based on an adjusted coefficient in the matrix of adjusted coefficients.

In another aspect, a device comprises a scaling module that scales each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients, wherein A=1024, B=1138, C=1730, D=1609, E=1264, F=1922, G=1788, H=2923, I=2718, and J=2528. The device also comprises an inverse transform module that uses repeated applications of a fixed-point scaled one-dimensional transform to transform the matrix of scaled coefficients into a matrix of transformed coefficients. Furthermore, the device comprises a right-shift module that right-shifts transformed coefficients in the matrix of transformed coefficients in order to produce a matrix of adjusted coefficients. Each adjusted coefficient in the matrix of adjusted coefficients approximates a corresponding value in a matrix of values that would be produced by applying an ideal two-dimensional IDCT to the matrix of encoded coefficients. The device also comprises an output module that outputs an 8×8 block of pixels. Each pixel in the block of pixels includes a pixel component value based on an adjusted coefficient in the matrix of adjusted coefficients.

In another aspect, a device comprises means for scaling coefficients in an 8×8 matrix of encoded coefficients by one of a factor A, a factor B, a factor C, a factor D, a factor E, a factor F, a factor G, a factor H, a factor I, or a factor J in order to produce a matrix of scaled coefficients, wherein A=1024, B=1138, C=1730, D=1609, E=1264, F=1922, G=1788, H=2923, I=2718, and J=2528. In addition, the device comprises means for using repeated applications of a fixed-point scaled one-dimensional transform to transform the matrix of scaled coefficients into a matrix of transformed coefficients. Furthermore, the device comprises means for right-shifting transformed coefficients in the matrix of transformed coefficients in order to produce a matrix of adjusted coefficients. Each adjusted coefficient in the matrix of adjusted coefficients approximates a corresponding value in a matrix of values that would be produced by applying an ideal two-dimensional IDCT to the matrix of encoded coefficients. In addition, the device comprises means for outputting an 8×8 block of pixels. Each pixel in the block of pixels includes a pixel component value based on an adjusted coefficient in the matrix of adjusted coefficients.

In another aspect, the invention is directed to a computer-readable medium containing instructions. The instructions cause a programmable processor to scale each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients, wherein A=1024, B=1138, C=1730, D=1609, E=1264, F=1922, G=1788, H=2923, I=2718, and J=2528. The instructions also cause the programmable processor to use repeated applications a fixed-point scaled one-dimensional transform to transform the matrix of scaled coefficients into a matrix of transformed coefficients. In addition, the instructions cause the programmable processor to right-shift transformed coefficients in the matrix of transformed coefficients in order to produce a matrix of adjusted coefficients. Each adjusted coefficient in the matrix of adjusted coefficients approximates a corresponding value in a matrix of values that would be produced by applying an ideal two-dimensional IDCT to the matrix of encoded coefficients. The instructions also cause the programmable processor to output signals that cause a display unit to display an 8×8 block of pixels. Each pixel in the block of pixels includes a pixel component value based on an adjusted coefficient in the matrix of adjusted coefficients.

In some cases, the computer-readable medium may form part of a computer program product, which may be sold to manufacturers and/or used in a video coding device. The computer program product may include the computer-readable medium, and in some cases, may also include packaging materials.

The details of one or more examples are set forth in the accompanying drawings and the description below. Other features, objects, and advantages of the invention will be apparent from the description and drawings, and from the claims.

DETAILED DESCRIPTION

Figure 1:
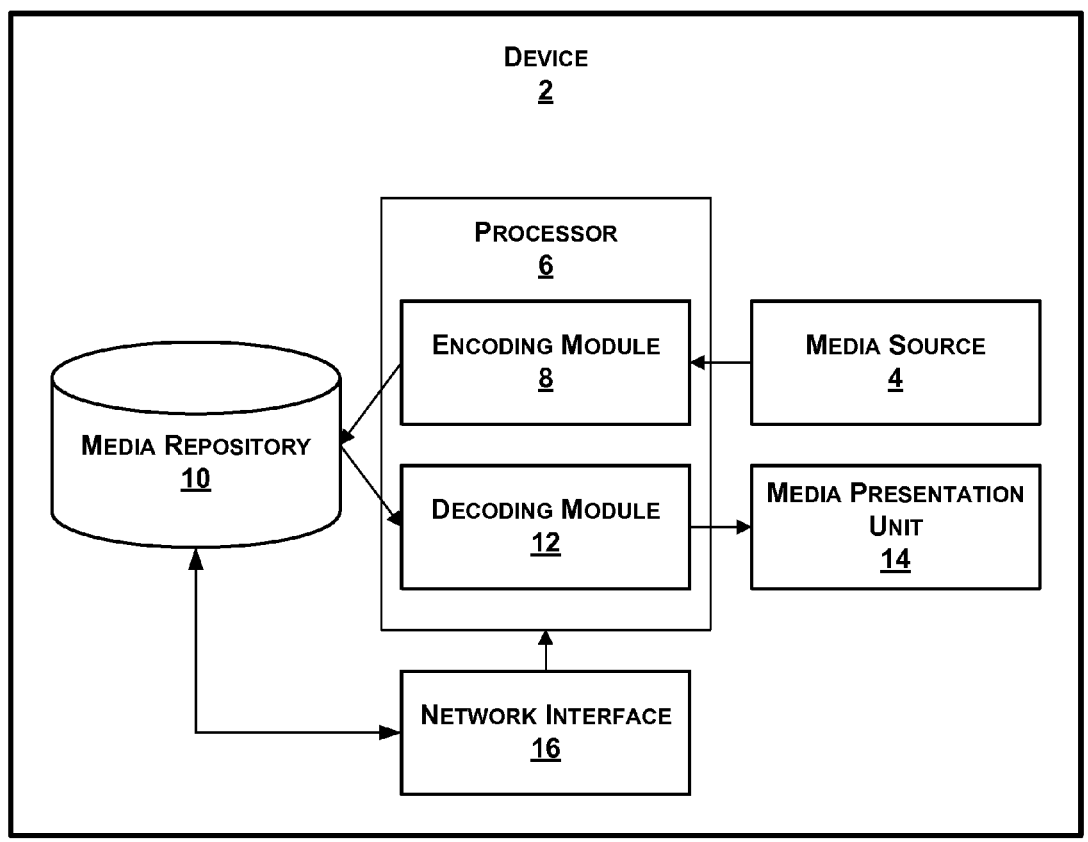
FIG. 1 is a block diagram illustrating an exemplary device that encodes and decodes media files.

FIG. 1 is a block diagram illustrating an exemplary device 2 that encodes and decodes media files. Device 2 may comprise a personal computer, a mobile radiotelephone, a server, a network appliance, a computer integrated into a vehicle, a video gaming platform, a portable video game device, a computer workstation, a computer kiosk, digital signage, a mainframe computer, a television set-top box, a network telephone, a personal digital assistant, a video game platform, a mobile media player, a home media player, digital video projector, a personal media player (e.g., an iPod), or another type of electronic device.

Device 2 may include a media source 4 to generate media data. Media source 4 may comprise a digital video or still photo camera to capture image data. Media source 4 may be built into device 2 or may be attached to device 2 as a peripheral device. Media source 4 may also comprise a microphone to record audio data. Media source 4 may provide media data to a processor 6. Processor 6 may comprise a digital signal processor (DSP), a microprocessor, or some other type of integrated circuit.

When processor 6 receives media data from media source 4, an encoding module 8 may encode the media data. Encoding module 8 may comprise software executed by processor 6. Alternatively, encoding module 8 may comprise specialized hardware within processor 6 that encodes the media data. In still another alternative, encoding module 8 may comprise any combination of software and hardware to encode the media data.

Encoding module 8 may store the encoded media data in a media repository 10. Media repository 10 may comprise flash memory, random access memory, a hard disk drive, or some other type of volatile or non-volatile data storage unit.

A decoding module 12 may retrieve encoded media data from media repository 10. Decoding module 12 may comprise software executed by processor 6. Alternatively, decoding module 12 may comprise specialized hardware within processor 6 that decodes the encoded media data. In still another alternative, decoding module 12 may comprise a combination of software and hardware that collaborate to decode the encoded media data.

A media presentation unit 14 in device 2 may present media data decoded by decoding module 12. For example, media presentation unit 14 may comprise a computer monitor that presents image or video media data. In another example, media presentation unit 14 may comprise an audio output device (e.g., a speaker) that presents audio media data. Media presentation unit 14 may be integrated into device 2 or may be connected via a wired or wireless link to device 2 as a peripheral device.

Device 2 may also comprise a network interface 16. Network interface 16 may facilitate communication between device 2 and a computer network via a wired or wireless link. For example, network interface 16 may facilitate communication between device 2 and a mobile telephone network. Device 2 may receive media files via network interface 16. For example, device 2 may receive photographs, video clips, streaming video (e.g., television, video conference, movies), audio clips (e.g., ringtones, songs, MP3 files), streaming audio (e.g., digital radio stations, voice calls, etc.) through network interface 16. When network interface 16 receives a media file or video bitstream, network interface 16 may store the media file or video bitstream in media repository 10.

A video signal may be described in terms of a sequence of pictures, which include frames (an entire picture), or fields (e.g., a picture that comprises either odd or even lines of a frame). Further, each frame or field may include two or more slices, or sub-portions of the frame or field. As used herein, either alone or in combination with other words, the term "frame" may refer to a picture, a frame, a field or a slice thereof.

When encoding module 8 encodes a series of video frames, encoding module 8 may start by selecting ones of the video frames to be "i-frames." For instance, encoding module 8 may select every eighth frame as an i-frame. I-frames are frames that do not reference other frames. After selecting the i-frames, encoding module 8 uses "spatial encoding" to encode the i-frames. Furthermore, encoding module 8 may use "temporal encoding" to encode the remaining frames.

To use spatial encoding to encode a frame, encoding module 8 may break the frame data into blocks of pixels. For example, encoding module 8 may break the frame data into blocks of pixels that are eight pixels wide and eight pixels high (i.e., each block of pixels contains 64 pixels). Encoding module 8 may then separate pixel component values of the pixels in each block of pixels into separate matrixes of pixel component values. The pixel component values of a pixel are the values that characterize the appearance of the pixel. For example, each pixel may specify a Y pixel component value, a Cr pixel component value, and a Cb pixel component value. The Y pixel component value indicates the luminance of the pixel, the Cr pixel component value indicates the red chrominance of the pixel, and the Cb pixel component value indicates the blue chrominance of the pixel. In this example, when encoding module 8 separates the pixel component values of a block of pixels, encoding module 8 may obtain a matrix of Y pixel component values, a matrix of Cr pixel component values, and a matrix of Cb pixel component values.

After separating the pixel component values into matrixes of pixel component values, encoding module 8 generates matrixes of adjusted coefficients by left-shifting pixel component values in the matrixes of pixel component values. For each matrix of adjusted coefficients, encoding module 8 uses fixed-point arithmetic to repeatedly apply a one-dimensional transform to the matrix of adjusted coefficients, thereby generating matrixes of transformed coefficients. Next, encoding module 8 generates a matrix of scaled coefficients by scaling the matrix of transformed coefficients by a set of scale factors. Each of these scale factors is an integer value. The scale factors have been selected in such a way that factors within the one-dimensional transform may be approximated using simple rational numbers.

Each scaled coefficient in the matrix of scaled coefficients approximates a corresponding value in a matrix of values that would be produced by applying an ideal two-dimensional forward discrete cosine transform ("FDCT") to a corresponding matrix of color component values. An ideal one-dimensional FDCT is defined by:

$$t(k) = c(k) \sum_{n=0}^{N-1} s(n) \cos \frac{\pi(2n+1)k}{2N}$$

where s is the array of N Original values, t is the array of N transformed values, and the coefficients c are given by $$c(0) = \sqrt{1/N}, c(k) = \sqrt{2/N}$$

for $1 \le k \le N-1$.

An ideal two-dimensional FDCT is defined by the formula:

$$t(i, j) = c(i, j) \sum_{n=1}^{N-1} \sum_{m=0}^{N-1} s(m, n) \cos\frac{\pi(2m+1)i}{2N} \cos\frac{\pi(2n+1)j}{2N}$$

where s is the array of N original values, t is the array of N transformed values, and c(i,j) is given by c(i,j)=c(i)c(j), and with c(k) defined as in the one-dimensional case.

After deriving a matrix of scaled coefficients, encoding module 8 generates a matrix of quantized coefficients by quantizing the coefficients in the matrix of scaled coefficients. Quantizing the scaled coefficients may reduce the amount of information associated with high-frequency coefficients in the matrix of scaled coefficients. After generating the matrix of quantized coefficients, encoding module 8 may apply an entropy encoding scheme to the matrix of quantized coefficients. For example, encoding module 8 may apply a Huffman encoding scheme to the quantized coefficients in the matrix of coefficients. When encoding module 8 applies the entropy encoding scheme to each of matrixes of quantized coefficients, encoding module 8 may output the encoded matrixes as a part of a video bitstream.

To use temporal encoding to encode a frame, encoding module 8 may divide the frame into "macroblocks". Depending on the coding standard used, these macroblocks may be of fixed or variable size and may be overlapping or non-overlapping. For example, each macroblock may be a 16×16 block of pixels. For each macroblock in the frame, encoding module 8 may attempt to identify a source macroblock in one or more reference frames. Depending on the coding standard, the reference frames may be i-frames, predictive frames, or bi-predictive frames. If encoding module 8 is able to identify a source macroblock in a reference frame, encoding module 8 records a motion vector for the macroblock. The motion vector includes an x value that indicates the horizontal displacement of the macroblock relative to the identified source macroblock and a y value that indicates the vertical displacement of the macroblock relative to the identified source macroblock. If encoding module 8 is unable to identify a source macroblock for the macroblock, encoding module 8 may not be required to record a motion vector for the macroblock. Next, encoding module 8 generates a "reconstructed" frame. The reconstructed frame contains the frame that would result from moving the macroblocks from the reference frames in accordance with the recorded motion vectors for the current frame. After generating the reconstructed frame, encoding module 8 subtracts pixel component values in each pixel of the reconstructed frame from corresponding pixel component values in corresponding pixels of the current frame, resulting in a "residual" frame. Encoding module 8 may then use an entropy encoding scheme to compress the motion vectors for the macroblocks of the current frame. In addition, encoding module 8 uses the spatial encoding technique described above to compress the residual frame.

Decoding module 12 may perform a similar process as encoding module 8, but in reverse. For instance, in order to perform a spatial decoding process, decoding module 12 may apply an entropy decoding scheme to each encoded matrix of quantized coefficients in an encoded video bitstream. Decoding module 12 may then de-quantize coefficients in each matrix of quantized coefficients, thereby generating a matrix of de-quantized coefficients for each matrix of quantized coefficients. For each matrix of quantized coefficients, decoding module 12 generates a matrix of scaled coefficients by scaling the matrix of quantized coefficients using a set of scale factors. These scale factors may be the same scale factors used in the spatial encoding process discussed above. After generating a matrix of scaled coefficients, decoding module 12 uses fixed-point arithmetic to repeatedly apply a one-dimensional transform to the matrix of quantized coefficients, thereby generating a matrix of transformed coefficients. For example, decoding module 12 may generate a matrix of intermediate coefficients by applying the one-dimensional transform to each row vector in a matrix of scaled coefficients. In this example, decoding module 12 may then generate the matrix of transformed coefficients by applying the one-dimensional transform to each column vector in the matrix of intermediate coefficients. After generating a matrix of transformed coefficients, decoding module 12 generates a matrix of adjusted coefficients by right-shifting the transformed coefficients in the matrix of transformed coefficients.

Adjusted coefficients in the matrix of adjusted coefficients approximate values that would be produced by applying an ideal two-dimensional inverse discrete cosine transform ("IDCT") to the matrix of de-quantized coefficients. The ideal one-dimensional IDCT is defined by the formula:

$$t(k) = c(k) \sum_{n=0}^{N-1} s(n) \cos\frac{\pi(2n+1)k}{2N}$$

where s is the array of N original values, t is the array of N transformed values, and the coefficients c are given by $$c(0) = \sqrt{1/N}, c(k) = \sqrt{1/N}$$

for $1 \leq k \leq N-1$. An ideal two-dimensional IDCT is defined by the formula:

$$s(m, n) = \sum_{i=0}^{N-1} \sum_{j=0}^{N-1} c(i, j) t(i, j) \cos\frac{\pi(2m+1)i}{2N} \cos\frac{\pi(2n+1)j}{2N}$$

These blocks of pixel component values may then be reassembled into blocks of pixels and these blocks of pixels may be reassembled to form the uncompressed video frame.

After generating the matrix of adjusted coefficients, decoding module 12 may then clip the adjusted coefficients in the matrix of adjusted coefficients in order to ensure that the adjusted coefficients are within the permitted range for a pixel component value. Decoding module 12 may then reassemble matrixes of clipped coefficients into blocks of pixels. After reassembling the blocks of pixel component values into blocks of pixels, decoding module 12 may generate an image by reassembling the blocks of pixels.

In order to decode a predictive frame, decoding module 12 may use the spatial decoding technique described above to decode the matrixes of quantized coefficients in the residual image for the predictive frame. In addition, decoding module 12 may use the entropy decoding scheme to decode the motion vectors of the predictive frame. Next, decoding module 12 may generate a reconstructed frame by "moving" macroblocks of the reference frames of the predictive frame in accordance with the motion vectors. After generating the reconstructed frame, decoding module 12 adds pixel component values in each pixel of the decoded residual frame to corresponding pixel component values in corresponding pixels of the reconstructed frame. The result of this addition is the reconstructed predictive frame.

The techniques described in this disclosure may provide several advantages. For example, because these techniques apply fixed-point arithmetic, these techniques may be applied in smaller, less complex devices, such as mobile telephones, personal digital assistants, and personal media players. In addition, these techniques may be applied to formats that include International Telecommunication Union Standardization Sector (ITU-T) recommendations H.261, H.263, H.264, T.81 (JPEG), as well as International Organization for Standardization (ISO)/MEC Moving Pictures Experts Group (MPEG)-1, MPEG-2, and MPEG-4 Part 2 media formats.

Figure 2:
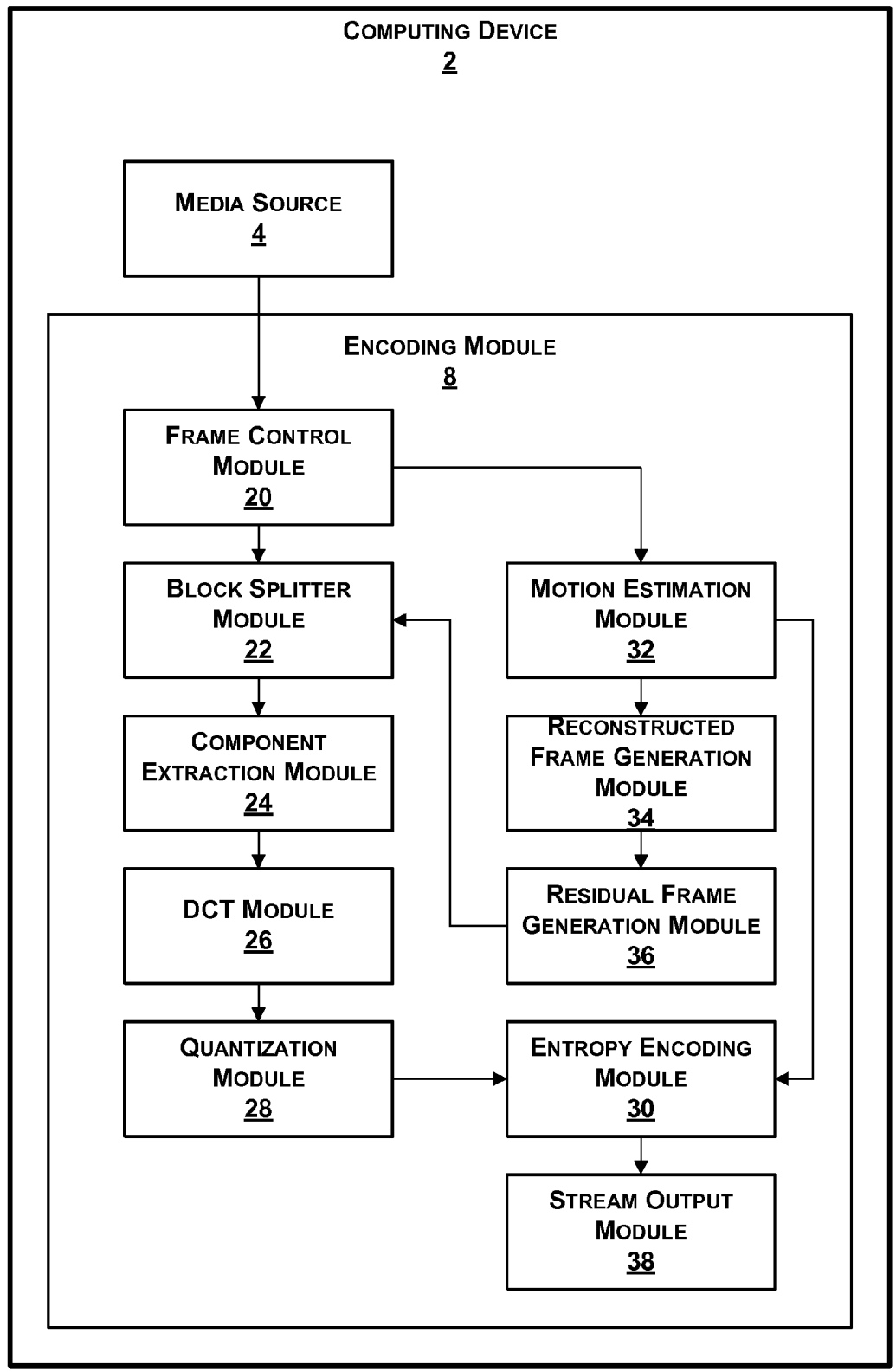
FIG. 2 is a block diagram illustrating exemplary details of an encoding module.

FIG. 2 is a block diagram illustrating example details of encoding module 8. Encoding module 8 may comprise a set of "modules." These modules may comprise subsets of the software instructions of encoding module 8. Alternatively, these modules may comprise firmware hardware such as one or more special-purpose hardware. In another alternative, these modules may comprise software instructions and special-purpose hardware or firmware.

As illustrated in the example of FIG. 2, encoding module 8 includes a frame control module 20 that controls whether encoding module 8 processes a video frame as an i-frame, a predictive frame, or a bi-predictive frame. For instance, when encoding module 8 receives a video frame, frame control module 20 may determine whether a bitstream flag associated with the video frame indicates that the frame is an i-frame, a predictive frame, or a bi-predictive frame. If frame control module 20 determines that the bitstream flag indicates that the frame is an i-frame, frame control module 20 may cause the video frame to be processed by a set of modules that immediately perform spatial encoding on the video frame. On the other hand, if frame control module 20 determines that the frame is a predictive frame or a bi-predictive frame, frame control module 20 may cause the video frame to be processed by a set of modules that perform temporal encoding.

Encoding module 8 includes a series of modules to apply spatial encoding to video frames. These modules include a block splitter module 22, a component extraction module 24, a forward transform module 26, a quantization module 28, and an entropy encoding module 30. Block splitter module 22 may receive unencoded video frames from media source 4, network interface 16, or another source. When block splitter module 22 receives an unencoded video frame, block splitter module 22 may separate the frame into blocks of pixels. Block splitter module 22 may provide blocks of pixels to a component extraction module 24.

When component extraction module 24 receives a block of pixels, component extraction module 24 may convert pixel component values of each pixel into a different color format. For example, component extraction module 24 may convert each pixel from a Red-Green-Blue (RGB) color format to the YCrCb color format. After converting the pixels in the block to the different color format, component extraction module 24 may separate the pixel component values of the pixels in the block into matrixes of pixel component values. For example, component extraction module 24 may extract a matrix of Y values, a matrix of Cr values, and a matrix of Cb values from one block of pixels. The Y values specify the brightness of pixels, Cr values specify red chrominance of pixels, and the Cb values specify blue chrominance of pixels. When component extraction module 24 has extracted the matrixes of pixel component values, component extraction module 24 may provide each of the matrixes separately to a Discrete Cosine Transform (DCT) module 26.

When forward transform module 26 receives a matrix of pixel component values, forward transform module 26 generates a matrix of scaled coefficients. Each coefficient in this matrix of scaled coefficients approximates a coefficient that would be produced by using an ideal forward discrete cosine transform to transform the matrix of pixel component values.

Forward transform module 26 uses fixed-point arithmetic to apply a one-dimensional transform to the matrixes of pixel component values. Using fixed-point arithmetic may be advantageous in some circumstances. For instance, smaller devices, such as mobile telephones might not include a floating point unit required to perform floating point arithmetic. Forward transform module 26 may begin a process of generating the matrix of scaled coefficients by left-shifting each of the pixel component values. For instance, forward transform module 26 may generate a matrix of adjusted coefficients by left-shifting each of the pixel component values by a number of bits of precision (i.e., the number of mantissa bits) of fixed-point representations of numbers that forward transform module 26 uses when applying the one-dimensional transform plus a number of bits of precision removed by scaling the transformed coefficients that result from applying the transform. After left-shifting each of the pixel-component values, forward transform module 26 may perform the transform on each of the row vectors of the matrix of adjusted coefficients. Performing a discrete cosine transform on each of the row vectors of the matrix of adjusted coefficients generates a matrix of intermediate coefficients. Next, forward transform module 26 may perform the transform on each of the column vectors of the matrix of intermediate coefficients. Performing the transform on each of the column vectors of the matrix of intermediate coefficients results in a matrix of transformed coefficients.

After generating the matrix of transformed coefficients, forward transform module 26 scales transformed coefficients at different positions in the matrix of transformed coefficients by different scale factors. As described below, decoding module 12 may use the reciprocals of these scale factors in the application of an inverse transform. When forward transform module 26 has finished scaling the transformed coefficients by the scale factors, forward transform module 26 may output the resulting matrix of scaled coefficients to quantization module 28.

When quantization module 28 receives a matrix of coefficients from forward transform module 26, quantization module 28 may quantize the scaled coefficients. Quantization module 28 may quantize the scaled coefficients in a variety of ways depending on the coding standard being employed. For example, in accordance with the MPEG-4 part 2 standard, quantization module 28 may use the following quantization matrix to quantize coefficients in a matrix of scaled coefficients for an i-frame:

| 8  | 17 | 18 | 19 | 21 | 23 | 25 | 27 |
|----|----|----|----|----|----|----|----|
| 17 | 18 | 19 | 21 | 23 | 25 | 27 | 28 |
| 20 | 21 | 22 | 23 | 24 | 26 | 28 | 30 |
| 21 | 22 | 23 | 24 | 26 | 28 | 30 | 32 |
| 22 | 23 | 24 | 26 | 28 | 30 | 32 | 35 |
| 23 | 24 | 26 | 28 | 30 | 32 | 35 | 38 |
| 25 | 26 | 28 | 30 | 32 | 35 | 38 | 41 |
| 27 | 28 | 30 | 32 | 35 | 38 | 41 | 45 |

Furthermore, in this example, quantization module 28 may use the following quantization matrix to quantize coefficients in a matrix of scaled coefficients for a predictive or bi-predictive frame:

| | | | | | | | |
|--|--|--|--|--|--|--|--|
|16|17|18|19|20|21|22|23|
|17|18|19|20|21|22|23|24|
|18|19|20|21|22|23|24|25|
|19|20|21|22|23|24|26|27|
|20|21|22|23|25|26|27|28|
|21|22|23|24|26|27|28|30|
|22|23|24|26|27|28|30|31|
|23|24|25|27|28|30|31|33|

After quantization module 28 generates a matrix of quantized coefficients, entropy encoding module 30 may compress the matrix of quantized coefficients using an entropy encoding scheme. To compress the matrix of quantized coefficients using an entropy encoding scheme, entropy encoding module 30 may organize the quantized coefficients into a vector by taking a zigzag pattern of the coefficients. In other words, entropy encoding module 30 may arrange all of the quantized coefficients in the two dimensional matrix of quantized coefficients into a one-dimensional vector of quantized coefficients in a predictable. Entropy encoding module 30 may then apply an entropy encoding scheme, such as Huffman coding or arithmetic coding, to the vector of quantized coefficients.

Encoding module 8 also includes one or more modules to perform temporal encoding of video frames. As illustrated in the example of FIG. 2, encoding module 8 includes a motion estimation module 32, a reconstructed frame generation module 34, and a residual frame generation module 36. Motion estimation module 32 attempts to identify a source macroblock in a reference image for each macroblock in a current video frame. Motion estimation module 32 may attempt to identify a source macroblock for a macroblock in the current frame by searching for macroblocks in the reference image that contain similar pixels as the macroblock. Motion estimation module 32 may search areas of different sizes in accordance with different coding standards in order to a identify source macroblock for a macroblock in the current frame. For instance, motion estimation module 32 may search for a source macroblock within an area that is pixels 32 pixels wide by 32 pixels high, with the current macroblock at the center of the search area. When motion estimation module 32 identifies a source macroblock for a macroblock in the current frame, motion estimation module 32 calculates a motion vector for the macroblock in the current frame. The motion vector for the macroblock in the current frame specifies an x value that indicates the difference in horizontal position between the identified source macroblock and the macroblock of the current frame. After motion estimation module 32 has either calculated a motion vector or has been unable to identify a source macroblock for each macroblock in the current frame, motion estimation module 32 may provide the calculated motion vectors for the current frame to reconstructed frame generation module 34.

Reconstructed frame generation module 34 may use the motion vectors and the reference frames to generate a reconstructed frame. Reconstructed frame generation module 34 may generate the reconstructed frame by applying the motion vectors for each macroblock in the current frame to the source macroblocks in the reference frames. In effect, reconstructed frame generation module 34 creates a frame in which the macroblocks of the reference frames have been "moved" to the positions indicated by the corresponding motion vectors of the current frame.

Residual frame generation module 36 may generate the residual frame by subtracting pixel component values in the reconstructed frame from corresponding pixel component values in the current frame. In general, the residual frame includes less information than either the reconstructed frame or the current frame. After residual frame generation module 36 generates the residual frame, residual frame generation module 36 provides the residual frame to block splitter module 22 in order to begin the process of spatially encoding the residual frame. Furthermore, motion estimation module 32 may provide the motion vectors for the current frame to entropy encoding module 30 in order to compress the motion vectors. After the residual frame is spatially encoded and entropy encoding module 30 has encoded the motion vectors, stream output module 38 may format the spatially encoded residual frame and the encoded motion vectors as part of a video bitstream.

Figure 3:
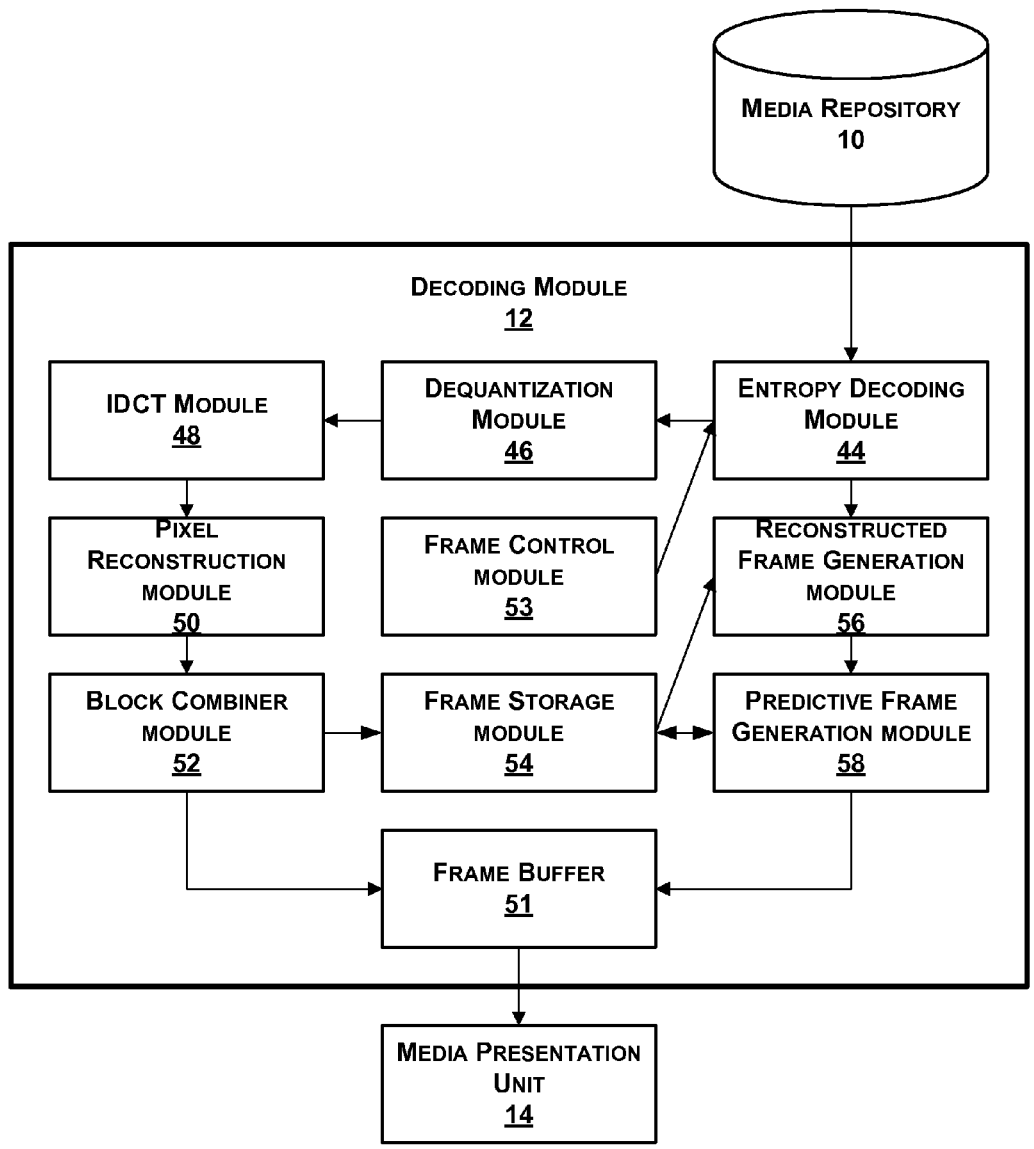
FIG. 3 is a block diagram illustrating exemplary details of a decoding module.

FIG. 3 is a block diagram illustrating exemplary details of decoding module 12. Decoding module 12 may comprise an entropy decoding module 44, a dequantization module 46, an inverse transform module 48, a pixel reconstruction module 50, a frame buffer 51, block combiner module 52, a frame control module 53, a reference frame storage module 54, a reconstructed frame generation module 56, and a predictive frame generation module 58. Some or all of these modules may comprise subsets of the software instructions of decoding module 12. Alternatively, some or all of these modules may comprise special-purpose hardware or firmware. In another alternative, these modules may comprise software instructions and special-purpose hardware or firmware.

When decoding module 12 receives a bitstream containing a video frame, entropy decoding module 44 may apply an entropy decoding scheme to the matrixes of quantized coefficients in the video frame. The bitstream may include a value that indicates to entropy decoding module 44 which entropy decoding scheme to apply the matrixes of quantized coefficients in the bitstream. In addition, entropy decoding module 44 may apply the same or a different entropy decoding scheme to decode the motion vectors of the video frame.

After entropy decoding module 44 applies the entropy decoding scheme to the matrixes of quantized coefficients in the video file, a dequantization module 46 may dequantize the coefficients in each of the matrixes of quantized coefficients. Depending on the coding standard, dequantization module 46 may dequantize the coefficients in a variety of ways. For example, in accordance with the MPEG-4 part 2 standard, dequantization module 46 may use the two quantization matrixes listed above in two different ways. First, dequantization module 46 may use these quantization matrixes to perform H.263-style de-quantization. In H.263-style de-quantization, dequantization module 46 obtains reconstructed coefficients F"[v][u] from quantized values QF[v][u] as follows:

$$|F''[v][u]| = \begin{cases} 0, & \text{if } QF[v][u] = 0, \\ (2 \times |QF[v][u]| + 1) \times \text{quantiser\_scale}, & \text{if } QF[v][u] \neq 0, \text{quantiser\_scale is odd}, \\ (2 \times |QF[v][u]| + 1) \times \text{quantiser\_scale} - 1, & \text{if } QF[v][u] \neq 0, \text{quantiser\_scale is even}. \end{cases}$$

$$F''[v][u]: F''[v][u] = \text{Sign}(QF[v][u]) \times |F''[v][u]|,$$

which involves only one multiplication by quantiser_scale, and

Second, dequantization module 46 may use these quantization matrixes to perform MPEG-1/2-style de-quantization. In MPEG-1/2 style de-quantization, dequantization module 46 uses additional weighting matrices w[w][v][u] where w indicates which weighting matrix is being used:

$$F''[v][u] = \begin{cases} 0, \text{ if } QF[v][u] = 0 \\ ((2 \times QF[v][u] + k) \times W[w][v][u] \times \text{quantiser\_scale})/16, \text{ if } QF[v][u] \neq 0 \end{cases}$$

where:

$$k = \begin{cases} 0 & \text{intra blocks} \\ \text{Sign}(QF[v][u]) & \text{non-intra blocks} \end{cases}$$

As described in detail below, inverse transform module 48 scales each of the dequantized coefficients by specific scale factors and adds a midpoint bias term to the DC coefficient of the resulting matrix of scaled coefficients. The DC coefficient is the coefficient at position (0,0) of the matrix of scaled coefficients. Next, inverse transform module 48 uses repeated applications a fixed-point one-dimensional transform to transform the matrix of scaled coefficients into a matrix of transformed coefficients. After transforming the matrix of scaled coefficients into the matrix of transformed coefficients, inverse transform module 48 right-shifts each transformed coefficient in the matrix of transformed coefficients in order to produce a matrix of adjusted coefficients. Each adjusted coefficient in the matrix of adjusted coefficients approximates a corresponding value in a matrix of values that would be produced by applying an ideal two-dimensional IDCT to the matrix of encoded coefficients. In addition, inverse transform module 48 may clip each of the adjusted coefficients in the matrix of adjusted coefficients in order to produce a matrix of clipped coefficients. The clipped coefficients have values that fall within ranges appropriate for the resulting pixel component value format. For example, the clipped coefficients may have values that fall within the range [−256, 255]. After inverse transform module 48 clips the adjusted coefficients, the resulting clipped values are pixel component values.

After inverse transform module 48 outputs a matrix of pixel component values, pixel reconstruction module 50 may generate a matrix of pixels by combining the matrix of pixel component values with matrixes of pixel component values associated with equivalent positions within a video frame. For example, pixel reconstruction module 50 may receive a matrix of Y pixel component values, a matrix of Cb pixel component values, and a matrix of Cr pixel component values from inverse transform module 48. Each of these three matrixes may include pixel components for a single 8×8 block of pixels. Each of the pixels may include a Y pixel component value, a Cb pixel component value, and a Cr pixel component value. After generating the matrix of pixels, pixel reconstruction module 50 may provide the block of pixels to block combiner module 52.

When block combiner module 52 receives a block of pixels, block combiner module 52 may buffer the block of pixels until block combiner module 52 receives some or all of the blocks of pixels in a video frame. After receiving one or more of the blocks of pixels, block combiner module 52 may combine the blocks of pixels into a video frame and may output the video frame to frame buffer 51. The video frame may be stored in frame buffer 51 until it is displayed by media presentation unit 51. In addition, block combiner module 52 may output the video frame to a frame storage module 54. Video frames in frame storage module 54 may be used as reference frames for the reconstruction of predictive and bi-predictive frames. In addition, video frames in frame storage module 54 may be residual frames that are used in the reconstruction of predictive and bi-predictive frames.

In order to reconstruct a predictive or a bi-predictive frame, decoding module 12 includes reconstructed frame generation module 56. Reconstructed frame generation module 56 receives the decoded motion vectors from entropy decoding module 44. In addition, reconstructed frame generation module 56 retrieves the reference frames of the current frame from frame storage module 54. Reconstructed frame generation module 56 then "moves" macroblocks from their positions in the reference frames into positions indicated by the motion vectors. A reconstructed frame results from moving the macroblocks in this manner. After reconstructed frame generation module 56 generates the reconstructed frame, reconstructed frame generation module 56 provides the reconstructed frame to predictive frame generation module 58.

When predictive frame generation module 58 receives a temporary frame, predictive frame generation module 58 may retrieve from frame storage module 54 a residual frame for the current frame. After retrieving the residual frame, predictive frame generation module 58 may add corresponding color component values in each pixel of the residual frame and the reconstructed frame. A reconstructed video frame results from this addition. Next, predictive frame generation module 58 may output this reconstructed frame to frame buffer 51 for eventual display on media presentation unit 14.

Figure 4:
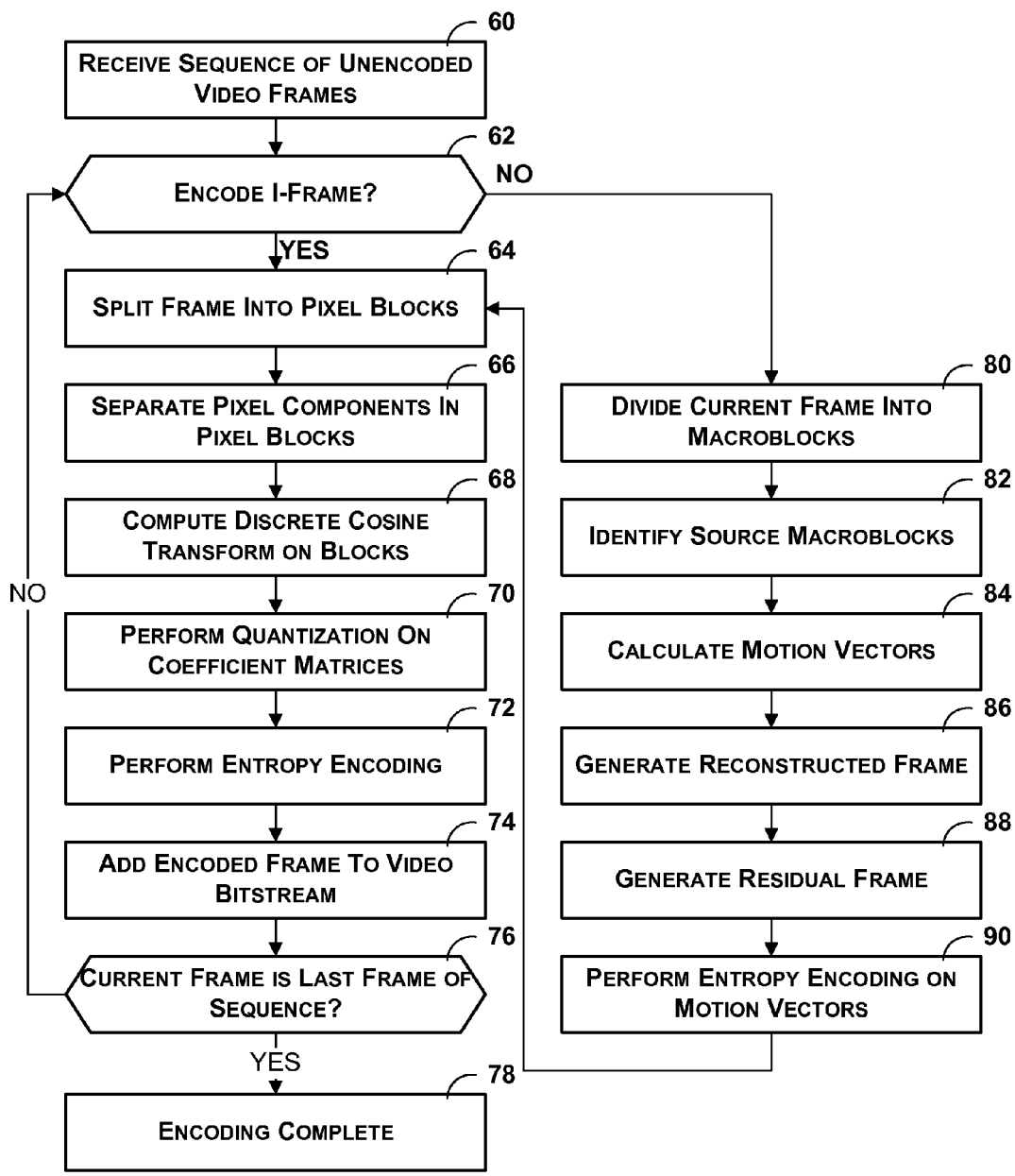
FIG. 4 is a flowchart illustrating an exemplary operation of the encoding module.

FIG. 4 is a flowchart illustrating an example operation of encoding module 8. Although the operation described in FIG. 4 is described in sequential fashion, it should be noted that the operation may be performed in a pipelined fashion.

Initially, encoding module 8 receives a sequence of unencoded video frames (60). For example, encoding module 8 may receive a sequence of unencoded frames in the form of sets of pixels from media source 4. When encoding module 8 receives the sequence of unencoded frames, frame control module 20 in encoding module 8 may determine whether a current frame in the sequence of unencoded frames is to be encoded as an i-frame or as a predictive or bi-predictive frame (62).

If frame control module 20 determines that the current frame is to be encoded as an i-frame, block splitter module 22 in encoding module 8 may split the current frame into blocks of pixels (64). For example, encoding module 8 may split the current frame into 2×2, 4×4, or 8×8 blocks of pixels.

After splitting the current frame into blocks of pixels, component extraction module 24 may separate the pixel component values in each of the blocks of pixels (66). As a result, there may be three blocks of pixel component values for each block of pixels: a block of Y values to represent the brightness of pixels, a block of Cb values to represent the blue chrominance of pixels, and a block of Cr values to represent the red chrominance of pixels.

Forward transform module 26 in encoding module 8 may then generate a matrix of scaled coefficients for each of the matrixes of pixel component values (68). Coefficients in these matrixes of scaled coefficients are approximations of values that would be produced by using an ideal two-dimensional forward discrete cosine transform on respective ones of the matrixes of pixel component values.

After forward transform module 26 generates the matrixes of scaled coefficients for each of the matrixes of pixel components, quantization module 28 in encoding module 8 may quantize the coefficients in each of the matrixes of scaled coefficients (70). Once quantization module 28 has quantized the coefficients in each matrix of scaled coefficients, entropy encoding module 30 may perform an entropy encoding process on each of the matrixes of quantized coefficients (72). For example, encoding module 8 may apply a Huffman encoding scheme or an arithmetic encoding scheme to each matrix of the quantized coefficients. The entropy encoding process further compressed the data. However, entropy encoding processes do not result in the loss of information. After performing the entropy encoding process on each matrix of quantized coefficients, stream output module 38 in encoding module 8 may add the encoded matrixes of quantized coefficients to a bitstream for the sequence of video frames (74). After stream output module 38 adds the encoded matrixes to the bitstream, frame control module 20 may determine whether the current frame was the last video frame of the sequence of frames (76). If the current frame is the last frame of the sequence of frames ("YES" of 76), encoding module 8 has completed the encoding of the sequence of frames (78). On the other hand, if the current frame is not the last frame of the sequence of frames ("NO" of 76), encoding module 8 may loop back and determine whether a new current frame is to be encoded as an i-frame (62).

If the current frame is not to be encoded as an i-frame ("NO" of 62), motion estimation module 32 in encoding module 8 may divide the current frame into a set of macroblocks (80). Next, motion estimation module 32 may attempt to identify a source macroblock in one or more reference frames for each of the macroblocks in the current frame (82). Motion estimation module 32 may then calculate a motion vector for each of the macroblocks in the current frame for which motion estimation module 32 was able to identify a source macroblock (84). After motion estimation module 32 calculates the motion vectors, reconstructed frame generation module 34 uses the motion vectors to generate a reconstructed frame by "moving" the identified macroblocks in the reference frames into positions indicated by the motion vectors (86). Residual frame generation module 36 may then generate a residual frame for the current frame by subtracting the pixel component values in the reconstructed frame from corresponding pixel component values in the current frame (88). After residual frame generation module 36 generates the residual frame, entropy encoding module 30 may use an entropy encoding scheme to encode the motion vectors for the current frame (90). In addition, spatial encoding may be applied to the residual frame by applying steps (66) through (74) to the residual frame.

Figure 5:
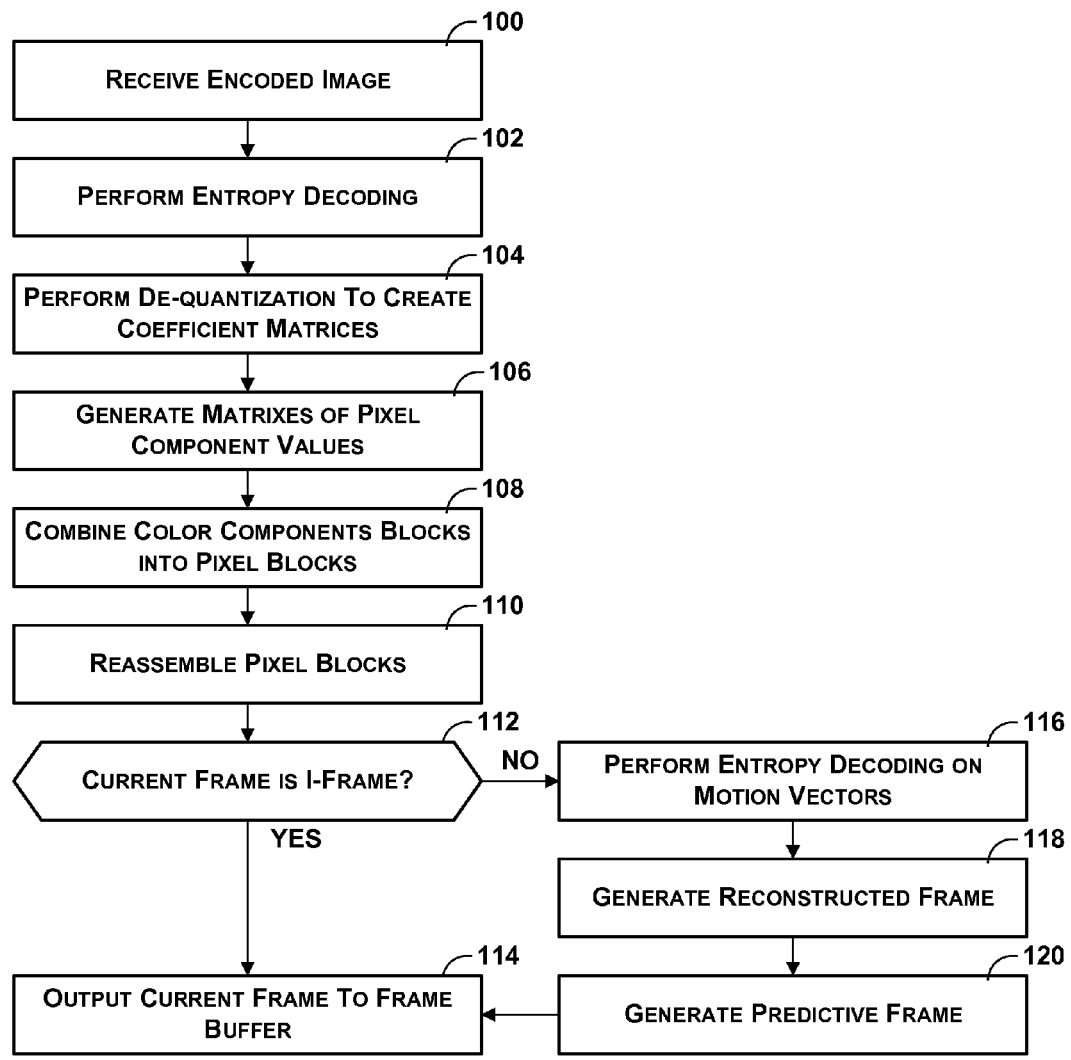
FIG. 5 is a flowchart illustrating an exemplary operation of the decoding module.

FIG. 5 is a flowchart illustrating an exemplary operation of decoding module 12. Although the operation described in FIG. 5 is described in sequential fashion, it should be noted that the operation may be performed in a pipelined fashion.

Initially, decoding module 12 receives an encoded video frame (100). After receiving the encoded video frame, entropy decoding module 44 in decoding module 12 may perform an entropy decoding process on blocks of data within the encoded frame (102). Entropy decoding module 44 may perform an entropy decoding process that is equivalent to the entropy encoding process used to encode the frame. For example, if encoding module 8 uses Huffman encoding to encode the frame, entropy decoding module 44 uses Huffman decoding to decode the frame. As a result of applying the entropy decoding process to each block of data in the frame, entropy decoding module 44 has produced a set of matrixes of quantized coefficients.

Next, dequantization module 46 in decoding module 12 may dequantize the coefficients in each of the matrixes of quantized coefficients (104). After dequantizing each coefficient in the matrixes of quantized coefficients, inverse transform module 48 in decoding module 12 generates matrixes of pixel component values (106). Pixel component values in one of the matrix of pixel component values are approximations of corresponding values that would be produced by transforming one of the matrixes of quantized coefficients using an ideal two-dimensional inverse discrete cosine transform.

When inverse transform module 48 has computed a matrix of pixel component values for each of the matrixes of coefficients, pixel reconstruction module 50 in decoding module 12 may combine appropriate matrixes of pixel component values in order to create blocks of pixels (108). For example, decoding module 12 may combine a block of Y values with an associated block of Cr values and an associated block of Cb values in order to create a block of YCrCb pixels. After pixel reconstruction module 50 has created the blocks of pixels, block combiner module 52 may recombine the blocks of pixels into a video frame (110).

Next, frame control module 53 in decoding module 12 may determine whether the current frame is a i-frame (114). If the current frame is an i-frame ("YES" of 114), block combiner module 52 may output the video frame to frame buffer 51 (114). On the other hand, if the current frame is not an i-frame (i.e., the current frame is a predictive or bi-predictive frame) ("NO" of 114), entropy decoding module 44 uses an entropy decoding scheme to decode the motion vectors of the current frame (116). Next, reconstructed frame generation module 56 uses the decoded motion vectors and one or more reference frames in frame storage module 54 to generate a reconstructed frame (118). Predictive frame generation module 58 may then use the reconstructed frame and the frame generated by block combiner module 52 to generate a reconstructed frame (120).

Figure 6:
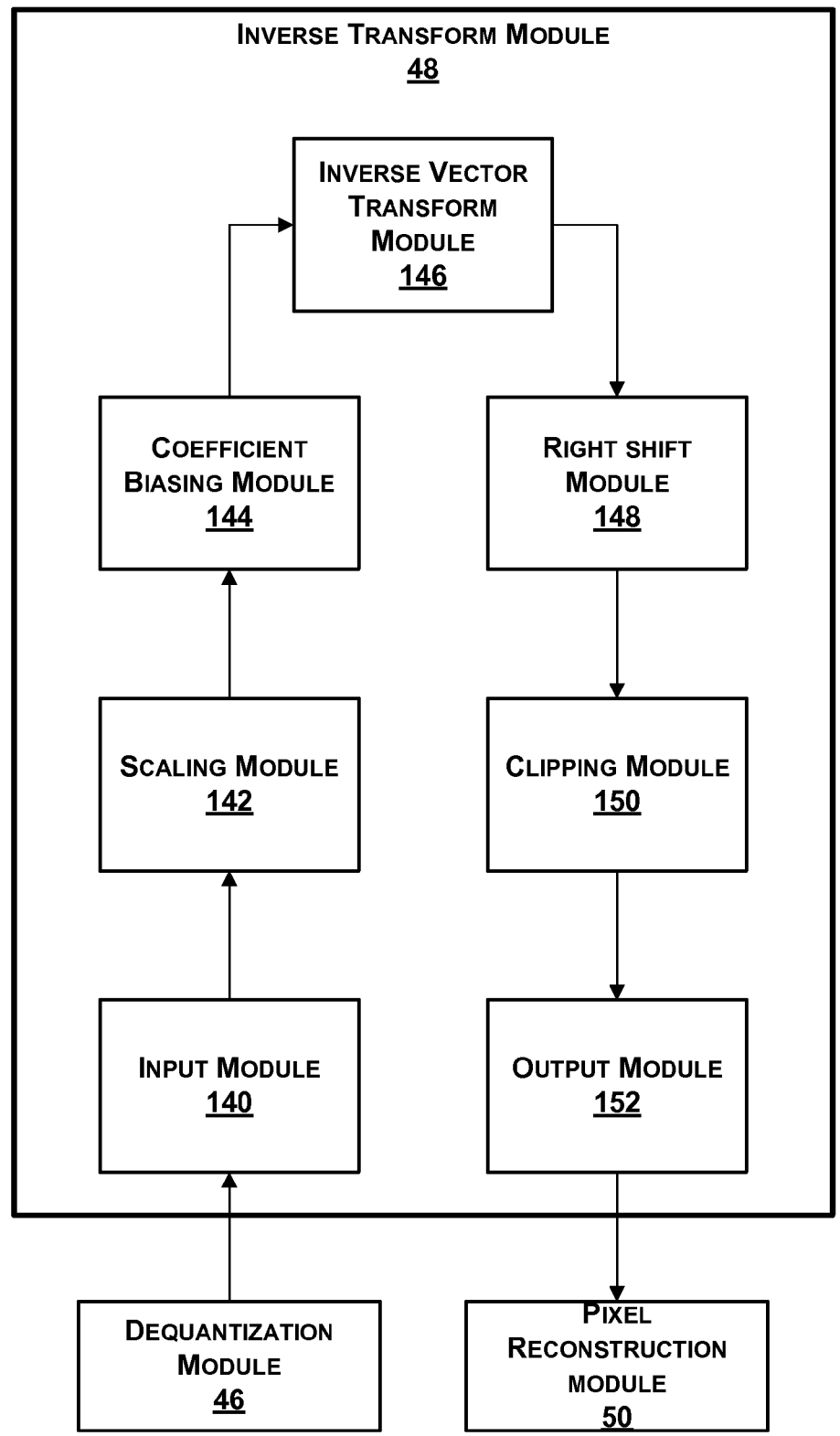
FIG. 6 is a block diagram illustrating exemplary details of an inverse discrete cosine transform ("IDCT") module.

FIG. 6 is a block diagram illustrating exemplary details of inverse transform module 48. As illustrated in the example of FIG. 6, inverse transform module 48 may comprise an input module 140. Input module 140 may receive a matrix of coefficients from dequantization module 46. For example, input module 140 may receive a pointer that indicates a location in a memory module of device 2 that stores the matrix of coefficients. Alternatively, input module 140 may include internal data structures that store the matrix of coefficients.

When input module 140 receives a matrix of coefficients, input module 140 may provide the matrix of coefficients to a scaling module 142 in inverse transform module 48. Scaling module 142 may perform operations that generate values that approximate scaling coefficients in the matrix of coefficients by scale factors at equivalent positions in a matrix of scale factors. For example, scaling module 142 may perform multiplication operations to generate values that approximate scaling coefficients in the matrix of coefficients by scale factors at equivalent positions in a matrix of scale factors. In another example, scaling module 142 may perform one or more addition and shift operations. Each of these scale factors may be an 8-bit integer value. When each of the scale factors is an 8-bit integer, the dynamic range of values produced during the transform is reduced.

After scaling module 142 generates the matrix of scaled coefficients, coefficient biasing module 144 may generate a matrix of biased coefficients by adding a midpoint bias value to the DC coefficient of the matrix of scaled coefficients. As discussed above, the DC coefficient of the matrix is typically the coefficient at the top left position of the matrix. In general, the DC coefficient represents a mean value of the other coefficients in the matrix.

In order to add a sign-adaptive bias value to the DC coefficient in a 16-bit processor, coefficient biasing module 144 may use the following formula:

$$DC\_coefficient = DC\_coefficient + (1 << (P+2)).$$

In this formula, the term $(1 << (P+2))$ is added to provide midpoint bias. P is a constant referring to the number of fixed-point mantissa bits (i.e., bits to the right of the radix point) used in an transform applied by an inverse vector transform module 146. The number 2 is added to P because right-shift module 148 may right-shift all coefficients by (P+3), where the number '3' comes from the bits of precision added by performing the transform. To elaborate this point, if a number x is generated by left-shifting 1 by (P+2) and a number z is generated by right-shifting x by (P+3), $z=\frac{1}{2}$. (Otherwise stated, $2^{P+2}/2^{P+3} = 2^0/2^1 = \frac{1}{2}$). Thus, adding $(1<<(P+2))$ to the DC coefficient is equivalent to adding $(1<<(P+3))/2$ to the DC coefficient.

After coefficient biasing module 144 generates the matrix of biased coefficients, inverse vector transform module 146 may generate a matrix of intermediate values by applying a fixed-point scaled one-dimensional transform to each row vector of the matrix of biased coefficients. Next, inverse vector transform module 146 may compute a matrix of transformed coefficients by applying the fixed-point scaled one-dimensional transform to each column vector of the matrix of intermediate values. An exemplary operation to apply the fixed-point scale one dimensional transform to a vector of scaled coefficients is presented in FIG. 10B below.

After inverse vector transform module 146 generates the matrix of transformed coefficients, right-shift module 148 may generate a matrix of adjusted coefficients by right-shifting each of the coefficients in the matrix of transformed coefficients by a number of positions equal to the number of bits added during application of the transform and during scaling. For example, if applying the transform results in an additional three bits and scaling the coefficients adds an additional ten bits, right-shift module 108 may right-shift each of the coefficients by thirteen (3+10) positions.

After right-shift module 148 generates the matrix of adjusted coefficients, a clipping module 150 may generated a matrix of clipped coefficients by "clipping" the coefficients in the matrix of adjusted coefficients in order to restrict the coefficients to a maximum allowable range of pixel component values. For example, a typical pixel component value may range from −256 to 255. If the matrix of adjusted coefficients were to include a coefficient equal to 270, clipping module 150 would restrict this coefficient to the maximum allowable range by reducing the coefficient to 255. After clipping module 150 finishes clipping the coefficients, these coefficients may represent pixel component values. When clipping module 150 finishes clipping the coefficients in the matrix, clipping module 150 may provide the matrix of clipped coefficients to an output module 152.

When output module 152 receives a matrix of clipped coefficients (which are now pixel component values), output module 152 may output the matrix of pixel component values to pixel reconstruction module 50.

Figure 7:
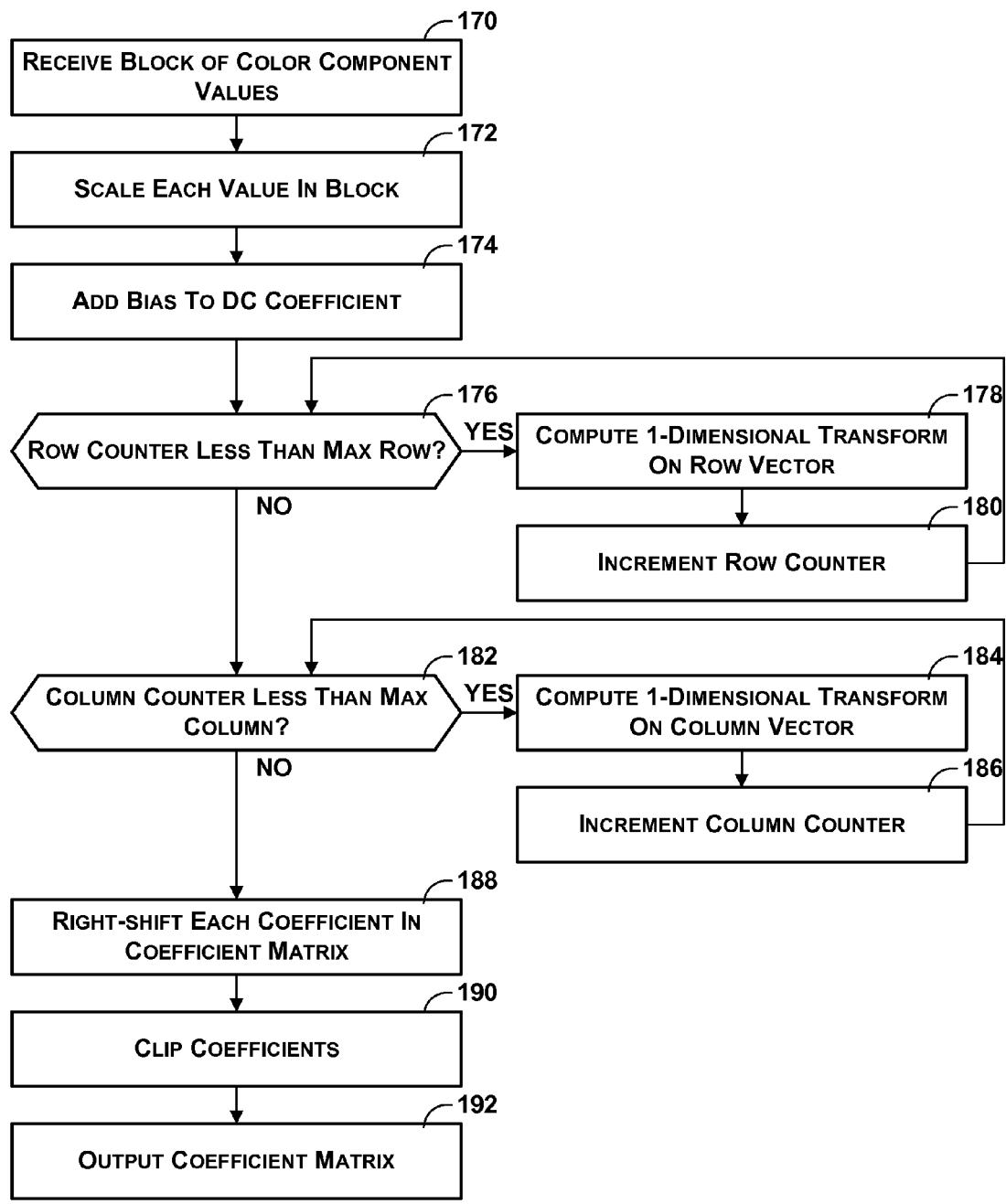
FIG. 7 is a flowchart illustrating an exemplary operation of the inverse transform module.

FIG. 7 is a flowchart illustrating an exemplary operation of inverse transform module 146. Initially, input module 140 receives a matrix of coefficients (170). When input module 140 receives the matrix of coefficients, scaling module 142 may scale each value in the matrix of coefficients. (172). For example, scaling module 142 may perform operations that multiply each coefficient in the matrix of coefficients by equivalently positioned values in a matrix of scale factors.

After scaling each coefficient in the matrix of coefficients, coefficient biasing module 144 may add a midpoint bias value to the DC coefficient of the matrix of coefficients (174). After coefficient biasing module 144 adds the bias value to the DC coefficient of the matrix, inverse vector transform module 146 may determine whether a row counter is less than a maximum row counter (176). Initially, the row counter may be set to zero. The maximum row counter may be a static value that is equal to the number of rows in the matrix of coefficients. For example, if the matrix of coefficients includes eight rows, maximum row counter is equal to eight.

If the row counter is less than the maximum row counter ("YES" of 176), inverse vector transform module 146 may compute a fixed-point scaled one-dimensional transform on a row vector of the matrix of coefficients indicated by the row counter (178). When inverse vector transform module 146 computes the transform on a row vector of the matrix of coefficients, inverse vector transform module 146 may replace the original coefficients in the row vector of coefficients with a vector of intermediate coefficients. After inverse vector transform module 146 computes the transform on a row vector of the matrix of coefficients, inverse vector transform module 146 may increment the row counter (180). Inverse vector transform module 146 may then loop back and again determine whether the row counter is less than the maximum row counter (176).

If the row counter is not less than (i.e., is greater than or equal to) the maximum row counter ("NO" of 176), inverse vector transform module 146 may determine whether a column counter is less than a maximum column counter (182). Initially, the column counter may be set to zero. The maximum column counter may be a static value that is equal to the number of columns in the matrix of coefficients. For example, if the matrix of coefficients includes eight columns, the maximum column counter is equal to eight.

If the column counter is less than the maximum column counter ("YES" of 182), inverse vector transform module 146 may compute a one-dimensional transform on a column vector of the matrix of intermediate coefficients indicated by the column counter (184). When inverse transform module 34 computes the transform on a column vector of intermediate coefficients, inverse transform module 34 replaces the intermediate coefficients in the column vector with a vector of transformed coefficients.

After inverse vector transform module 146 computes the transform on a column vector of the matrix of coefficients, inverse vector transform module 146 may increment the column counter (186). Inverse vector transform module 146 may then loop back and again determine whether the column counter is less than the maximum column counter (182).

If the column counter is not less than (i.e., is greater than or equal to) the maximum column counter ("NO" of 182), right-shift module 148 may right-shift each of the transformed coefficients in the matrix (188). When right-shift module 148 right-shifts a coefficient, right-shift module 148 may shift the coefficient to the right by a certain number of positions. The result of right-shifting each of the second intermediate coefficients in the matrix is a matrix of adjusted values. After right-shift module 148 has right-shifted each of the transformed coefficients, clipping module 150 may clip the adjusted coefficients in order to ensure that the adjusted coefficients are within an appropriate range for pixel component values (190). For instance, clipping module 150 may clip the adjusted coefficients in order to ensure that the adjusted coefficients are within the range −256 to 255. When clipping module 150 finishes clipping the adjusted coefficients, output module 152 may output the resulting matrix of pixel component values (192).

Figure 8:
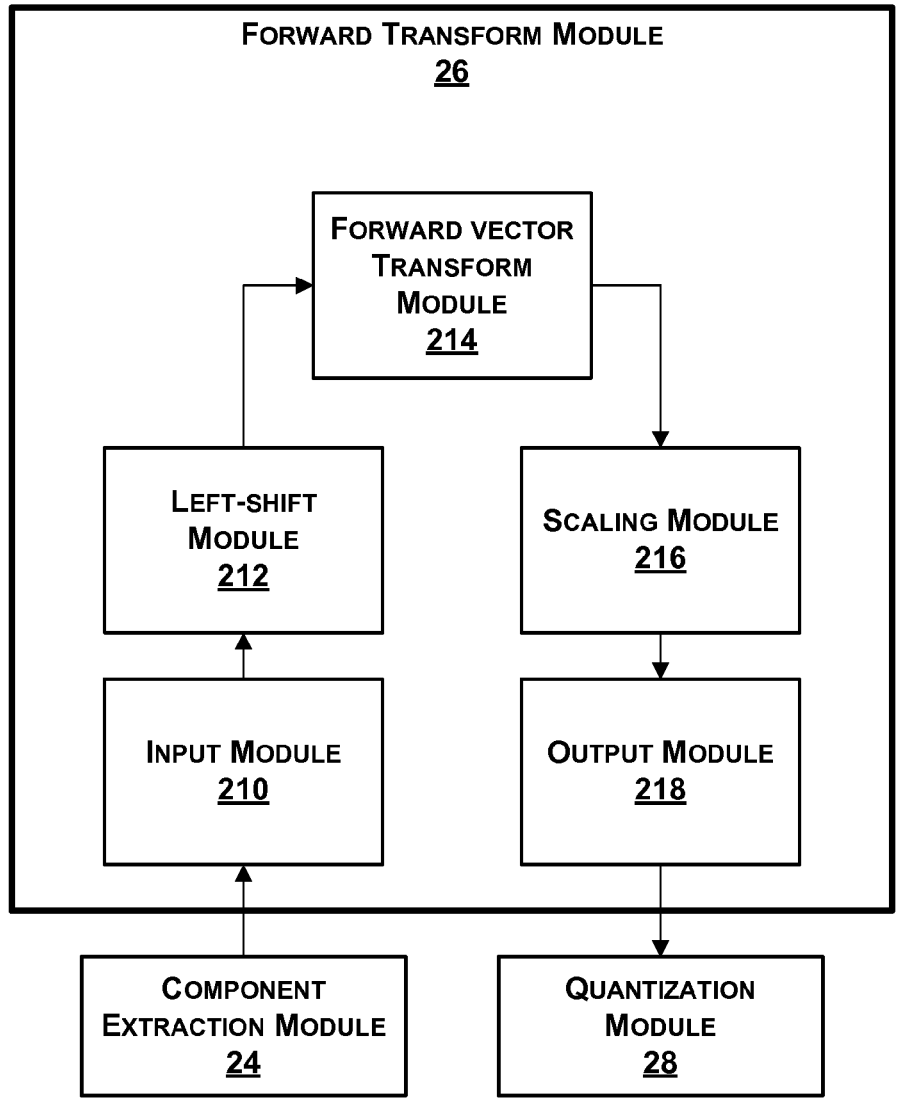
FIG. 8 is a block diagram illustrating exemplary details of a forward discrete cosine transform ("FDCT") module.

FIG. 8 is a block diagram illustrating exemplary details of forward transform module 26. As illustrated in the example of FIG. 8, forward transform module 26 comprises an input module 210 that receives a matrix of pixel component values from component extraction module 24. When input module 210 receives a matrix of pixel component values, input module 210 may provide the matrix of pixel component values to a left-shift module 212. Left-shift module 212 may shift all of the pixel component values in the matrix of pixel component values to the left by the number of mantissa bits used in values that a forward vector transform module 214 uses while performing the forward transform minus the number of mantissa bits removed by performing the forward transform. For example, if ten mantissa bits are used in values while performing the forward transform and three mantissa bits are removed by performing the forward discrete cosine transform, left-shift module 212 may shift the pixel component values to the left by seven positions. In another example, if three mantissa bits are used in values while performing the forward transform and three mantissa bits are removed by performing the forward transform, left-shift module 212 may shift the pixel component values to the left by zero positions.

After left-shift module 212 shifts the pixel component values, forward vector transform module 214 may apply a forward transform to each column vector in the matrix of pixel component values in order to produce a matrix of intermediate values. Next, forward vector transform module 214 may apply the forward transform to each row vector in the matrix of intermediate values in order to produce a matrix of transformed coefficients. When forward vector transform module 214 applies the forward transform to a vector, forward vector transform module 214 may apply the forward transform described in FIG. 11, below. Note that the transform described in FIG. 11, below is a reverse of the transform described in FIG. 10A.

After forward vector transform module 214 produces the matrix of transformed coefficients, a scaling module 216 may apply scaling factors to each transformed coefficient in the matrix of transformed coefficients. Scaling module 216 may apply reciprocals of the scaling factors used by scaling module 142 in inverse transform module 48. For instance, if scaling module 142 scales the coefficients by shifting the coefficients to the left by three positions, scaling module 216 may scale the transformed values by shifting the transformed values to the right by three positions. In another example, if scaling module 142 scales the coefficients by multiplying the coefficients by individual scale factors in a matrix of scale factors, scaling module 216 may scale the transformed values by multiplying the transformed values by scale factors in the matrix of scale factors and then shifting the resulting values to the right by a magnitude. In order to decrease rounding errors, scaling module 216 may add a midpoint bias value to each of the transformed values after multiplying the transformed values by the scale factors. For instance, scaling module 216 may use the following equation to generate a matrix of scaled coefficients:

$$F[v][u]=(F'[v][u]*S[v][u]+(1<<19)-((F'[v][u]>=0)?0:1))>>20$$

where v=0 . . . 7, u=0 . . . 7; where S[v][u] is an entry in the matrix of scale factors, F is the matrix of scaled coefficients, and F' is the matrix of transformed coefficients.

After scaling module 216 generates the matrix of scaled coefficients, an output module 218 may output the matrix of coefficients to quantization module 28.

Figure 9:
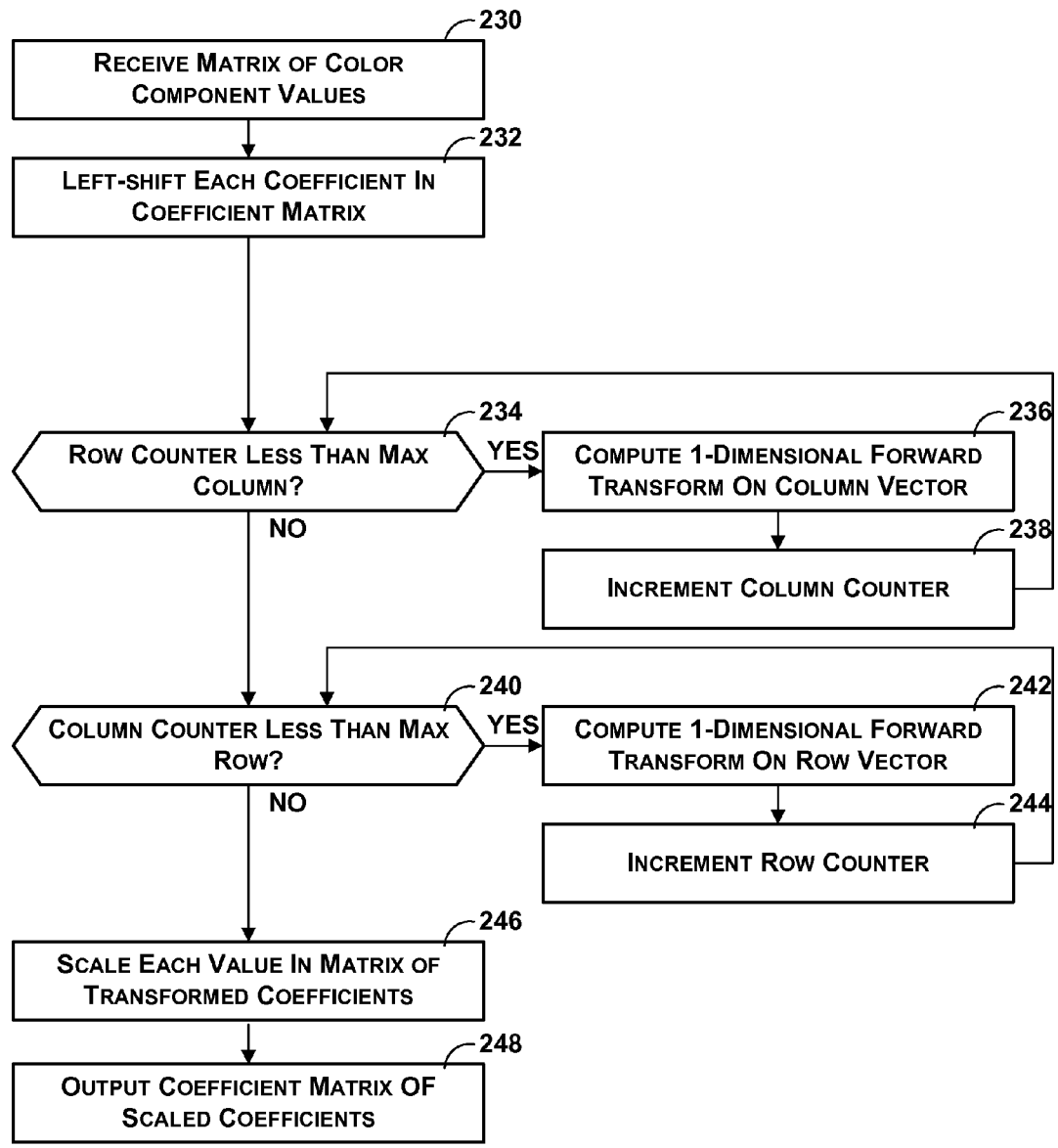
FIG. 9 is a flowchart illustrating an exemplary operation of the forward vector transform module.

FIG. 9 is a flowchart illustrating an exemplary operation of forward transform module 26. Initially, input module 210 receives a matrix of pixel component values (230). When input module 210 receives the matrix of pixel component values, left-shift module 212 may generate a matrix of adjusted coefficients by upshifting each value in the matrix of pixel component values (232). For example, left-shift module 212 may shift all of the coefficients to the left by ten positions. In this example, left-shift module 212 may shift all of the coefficients to the right by ten positions because forward vector transform module 214 may use fixed point arithmetic in which numbers are encoded using ten bits in the fractional portion. Thus, by shifting the coefficients to the left by ten positions, left-shift module 212 effectively converts the pixel component values into fixed-point numbers with ten mantissa bits.

After left-shifting each pixel component value in the matrix of adjusted values, forward vector transform module 214 may determine whether a column counter is less than a maximum row counter (234). Initially, the column counter may be set to zero. The maximum column counter may be a static value that is equal to the number of columns in the matrix of adjusted coefficients. For example, if the matrix of adjusted coefficients includes eight columns, maximum column counter is equal to eight.

If the column counter is less than the maximum column counter ("YES" of 234), forward vector transform module 214 may compute a one-dimensional forward transform on a column vector indicated by the column counter (236). When forward vector transform module 214 computes the forward transform on a column vector of the matrix of adjusted coefficients, forward vector transform module 214 replaces the original adjusted coefficients in the column vector with intermediate coefficients. After forward vector transform module 214 computes the forward transform on a column vector of the matrix of adjusted coefficients, forward vector transform module 214 may increment the column counter (238). Forward vector transform module 214 may then loop back and again determine whether the column counter is less than the maximum column counter (234).

If the column counter is not less than (i.e., is greater than or equal to) the maximum column counter ("NO" of 234), forward vector transform module 214 may determine whether a row counter is less than a maximum row counter (240). Initially, the row counter may be set to zero. The maximum row counter may be a static value that is equal to the number of row vectors in the matrix of coefficients. For example, if the matrix of coefficients includes eight rows, the maximum row counter is equal to eight.

If the row counter is less than the maximum row counter ("YES" of 240), forward vector transform module 214 may compute a one-dimensional discrete cosine transform on a row vector indicated by the row counter (242). Because forward vector transform module 214 has already computed the forward transform on the row vectors of the matrix, the matrix of coefficients now contains intermediate coefficients. When forward vector transform module 214 computes the forward transform on a row vector of intermediate coefficients, forward vector transform module 214 replaces the intermediate coefficients in the column vector with transformed coefficients.

After forward vector transform module 214 computes the discrete cosine transform on a row vector of the matrix of coefficients, forward vector transform module 214 may increment the row counter (244). Forward vector transform module 214 may then loop back and again determine whether the row counter is less than the maximum row counter (240).

If the row counter is not less than (i.e., is greater than or equal to) the maximum row counter ("NO" of 240), scaling module 216 may scale each transformed coefficient in the matrix of transformed coefficients (246). When scaling module 216 scales a coefficient, scaling module 216 may shift the coefficient to the right by a certain number of positions. After scaling module 216 has scaled each of the transformed coefficients, output module 218 may output the resulting matrix of scaled coefficients (248).

Figure 10A:
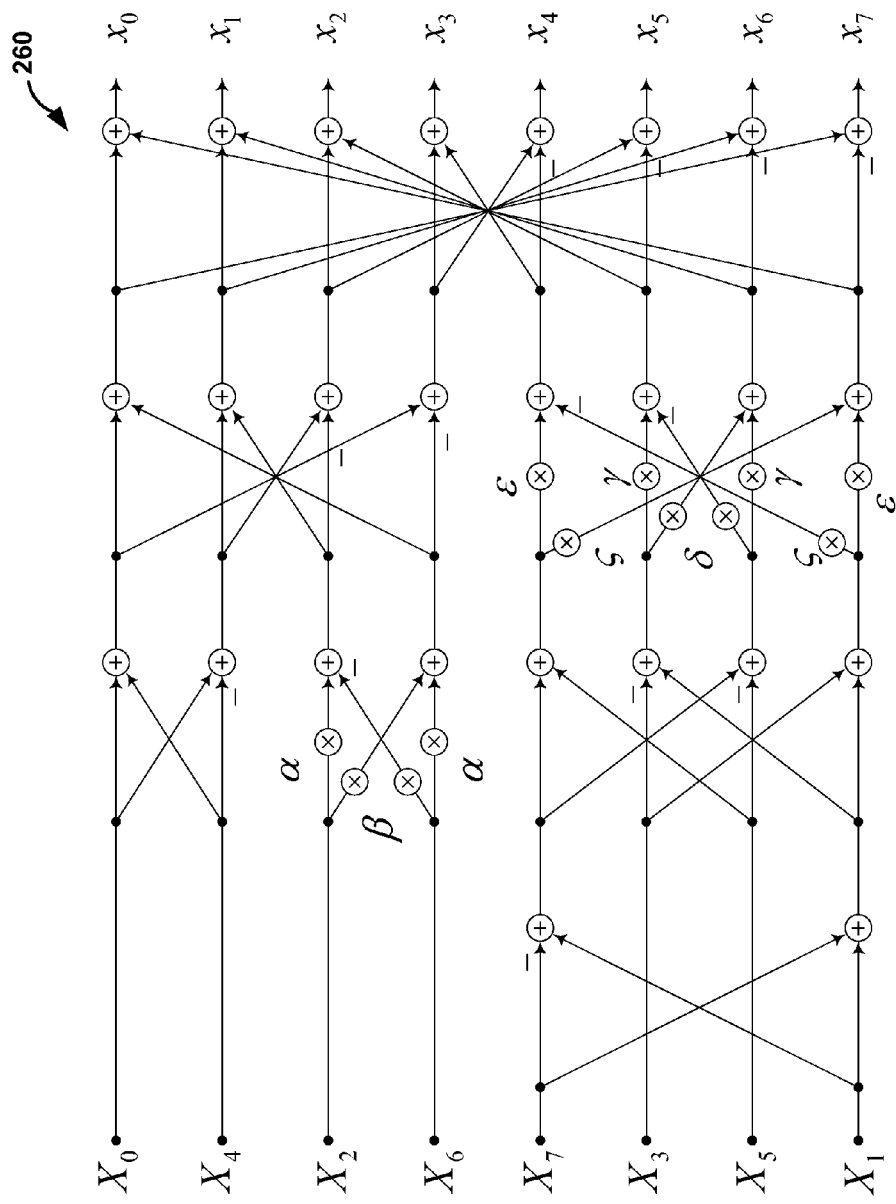
FIG. 10A is a flow diagram illustrating an exemplary one-dimensional transform.

FIG. 10A is a flow diagram illustrating an exemplary one-dimensional transform 260. In FIG. 10A, the values $X_0$, $X_1$, $X_2$, $X_3$, $X_4$, $X_5$, $X_6$, and $X_7$ represent input coefficients and values $x_0, x_1, x_2, x_3, x_4, x_5, x_6$, and $x_7$ represent output values of transform 260. The value associated with a line after a circle that encompasses a "+" symbol is the result of adding the values associated with the arrows that points into the circle. The value associated with a line after a circle that encompasses an "×" symbol is the result of multiplying the coefficient positioned next to the circle and values associated with the lines that pass through the circles. The symbol "−" next to an arrow represents a negation of the value associated with the arrow. For example, if the value "10" is associated with an arrow before a "−" symbol, the value "−10" is associated with the arrow after the "−" symbol.

Transform 260 uses fourteen multiplications by seven unique irrational factors. For convenience this disclosure refers to these unique irrational factors as $\alpha, \beta, \gamma, \delta, \epsilon, \xi$ and $\eta$. In transform 260, $\alpha = \sqrt{2}\cos(3\pi/8)$, $\beta = \sqrt{2}\sin(3\pi/8)$, $\gamma = \cos(\pi/16)$, $\delta = \sin(\pi/16)$, $\epsilon = \cos(3\pi/16)$, $\xi = \sin(3\pi/16)$, and $\eta = \sqrt{2}$. Note that $\alpha, \beta, \gamma, \delta, \epsilon, \xi$, and $\eta$ are all irrational numbers. Because $\alpha, \beta, \gamma, \delta, \epsilon, \xi$, and $\eta$ are irrational numbers, tolerably accurate representations of $\alpha, \beta, \gamma, \delta, \epsilon, \xi$, and $\eta$ may require a relatively large number of bits. Consequently, compliance with the requirements of typical coding standards might not be possible when using fixed-point numbers with relatively small numbers of mantissa bits to compute transform 260. Furthermore, because $\alpha, \beta, \gamma, \delta, \epsilon, \xi$, and $\eta$ are irrational numbers, it might not be possible to reduce multiplications by $\alpha, \beta, \gamma, \delta, \epsilon, \xi$, and $\eta$ to sequences of shift operations, addition operations, and or subtraction operations.

Figure 10B:
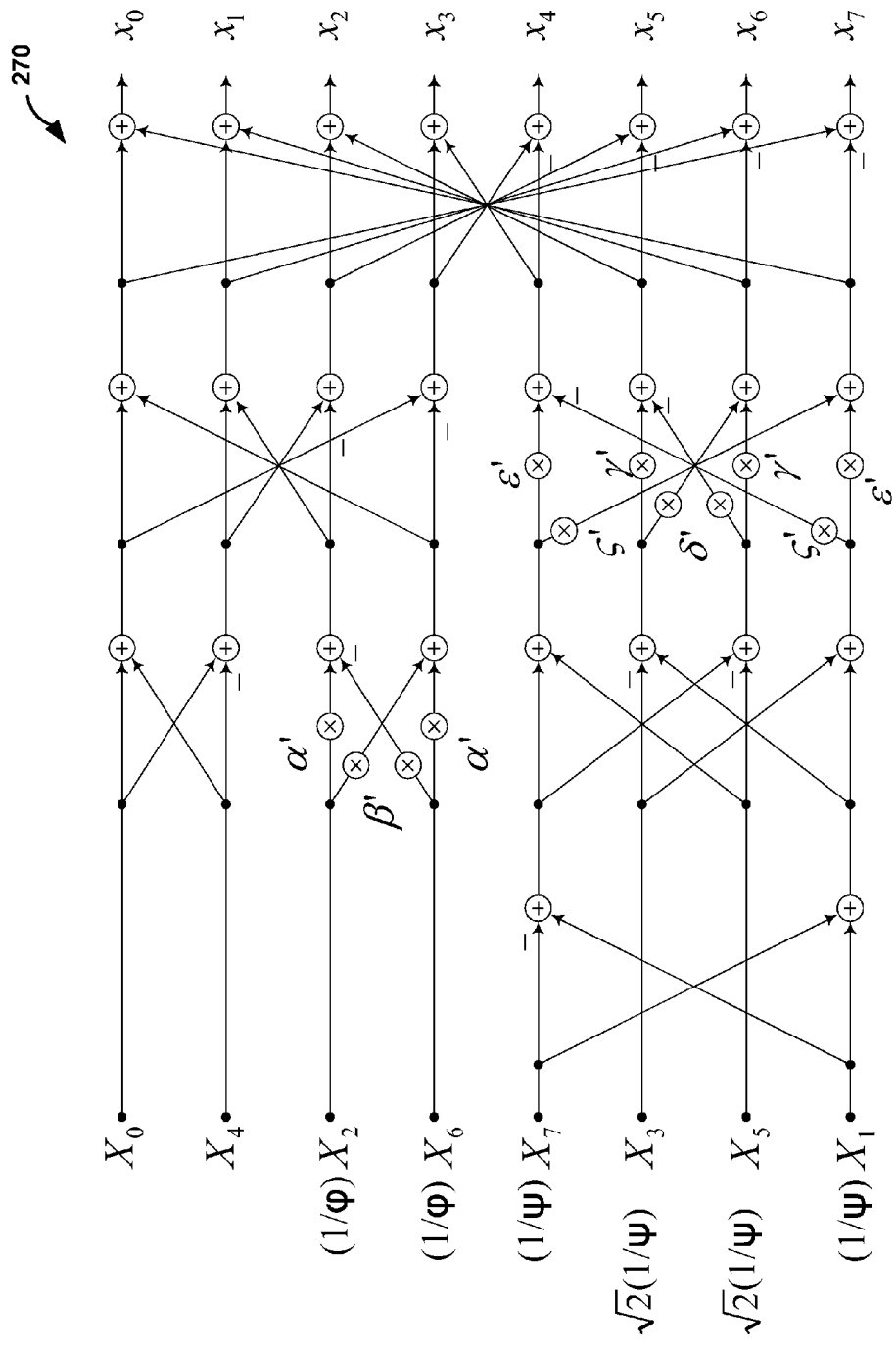
FIG. 10B is a flow diagram illustrating an exemplary scaled one-dimensional transform.

FIG. 10B is a flow diagram illustrating an exemplary one-dimensional scaled transform 270. Transform 270 is a scaled version of transform 260. In transform 270, the value $\eta$ has been factored out of transform 260, a value $(1/\psi)$ has been factored out of values $\gamma, \delta, \epsilon$, and $\xi$ of transform 260, and a value $(1/\phi)$ has been factored out of values $\alpha$ and $\beta$ of transform 260. When $(1/\psi)$ and $(1/\phi)$ are factored out of these coefficients, the following vector represents values by which $X_0$-$X_7$ are multiplied prior to transform 270:

$$<1, (1/\psi), (1/\phi), (\sqrt{2}/\psi), 1, (\sqrt{2}/\psi), (1/\phi), (1/\psi)>.$$

The values of $\alpha, \beta, \gamma, \delta, \epsilon, \xi$ and $\eta$ may change when $(1/\psi)$ and $(1/\psi)$ are factored out of $\alpha, \beta, \gamma, \delta, \epsilon$, and $\xi$. For purposes of convenience, the values $\alpha, \beta, \gamma, \delta, \epsilon$, and $\xi$ after $(1/\psi)$ and $(1/\phi)$ are factored out are referred to as $\alpha', \gamma', \delta', \epsilon'$, and $\xi'$. For example, when $\psi=1.352708058$ and $\phi=0.959700091$, $\alpha' \approx 133/256$, $\beta' \approx 321/256$, $\gamma' \approx 679/512$, $\delta' \approx 135/512$, $\epsilon' \approx 4605/4096$, and $\xi' \approx 1539/2048$.

Values $\alpha', \beta', \gamma', \delta', \epsilon'$, and $\xi'$ may be selected in various ways such that they would approximate products of $\alpha, \beta, \gamma, \delta, \epsilon$, and $\xi$ by corresponding factors $\psi$ or $\phi$. In general, the values of factors $\psi$ and $\phi$ and values $\alpha', \beta', \gamma', \delta', \epsilon', \xi'$ may be selected without changing the overall design of transform 270. Finding good values of these factors may represent a complex optimization problem that might yield multiple solutions with different complexity/precision tradeoffs. For instance, multiplications by some values of $\alpha', \beta', \gamma', \delta', \epsilon'$, and $\xi'$ may be more convenient to calculate than others. Furthermore, the values of $\psi$ and $\phi$ may be important because they serve as the basis for scale factors, and some scale factors may be more convenient to calculate than others. For example, multiplications by a first set values for $\alpha', \beta', \gamma', \delta', \epsilon'$, and $\xi'$ may approximated by a series of addition operations and shift operations that are shorter a series of addition operations and shift operations for a different set of values for $\alpha', \gamma', \gamma', \delta', \epsilon'$, and $\xi'$. For instance, when $\psi=1.352708058$ and $\phi=0.959700091$, $\gamma'$ may be approximated as 679/512. Three shift operations and three addition operations may be required to approximate a multiplication by 679/512. Furthermore, when $\psi=1.1810842$ and $\phi=0.801251953$, $\gamma'$ may be approximated as 18981/16384. Four shift operations and four addition operations may be required to approximate a multiplication by 18981/16384.

A matrix of scale factors may be computed by multiplying the transpose of the vector $<1, (1/\psi), (1/\phi), (\sqrt{2}/\psi), 1, (\sqrt{2}/\psi), (1/\phi), (1/\psi)>$ by the same vector. This results in an 8×8 matrix of values:

| A | B | C | D | A | D | C | B |
| B | E | F | G | B | G | F | E |
| C | F | H | I | C | I | H | F |
| D | G | I | J | D | J | I | G |
| A | B | C | D | A | D | C | B |
| D | G | I | J | D | J | I | G |
| C | F | H | I | C | I | H | F |
| B | E | F | G | B | G | F | E |

In this matrix of scale factors, $A=1*1$, $B=1*1/(\sqrt{2}/\psi)$, $C=1*1/\phi$, $D=1*(\sqrt{2}/\psi)$, $E=(1/\psi)^2$, $F=(1/\psi)*(1/\phi)$, $G=(1/\psi)*(\sqrt{2}/\psi)$, $H=(1/\phi)^2$, $I=(1/\phi)*(\sqrt{2}/\psi)$, and $J=(\sqrt{2}/\psi)*(\sqrt{2}/\psi)$.

Because the scale factors are multiplied with the coefficients prior to the application of the transform, the scale factors A, B, C, D, E, F, G, H, I, and J may be left-shifted by P positions, where P is a constant referring to a number of fixed-point mantissa bits (i.e., bits to the right of the radix point) used in an transform. This effectively converts the original coefficients into fixed-point numbers that have P mantissa bits. In other words, each of the coefficients in the matrix is multiplied by $2^P$. The resulting values may then be approximated by integer values. Thus, A, B, C, D, E, F, G, H, I, and J in the above matrix may be replaced with $A' \approx 2^P$, $B' \approx (\sqrt{2}/\psi)*2^P$, $C' \approx 1/\phi*2^P$, $D' \approx (\sqrt{2}/\psi)*2^P$, $E' \approx (1/\psi)^2*2^P$, $F' \approx (1/\psi)*(1/\phi)*2^P$, $G' \approx (1/\psi)*(\sqrt{2}/\psi)*2^P$, $H' \approx (1/\phi)^2*2^P$, $I' \approx (1/\phi)*(\sqrt{2}/\phi)*2^P$, and $J' \approx (\sqrt{2}/\psi)*(\sqrt{2}/\psi)*2^P$.

For example, let $\psi=1.352708058$, let $\phi=0.959700091$, and let P=10. Given these values of $\psi$, $\phi$, and P, the scale factors $A'=1024$, $B'=757$, $C'=1067$, $D'=1071$, $E'=560$, $F'=789$, $G'=792$, $H'=1112$, $I'=1116$, and $J'=1120$ may be selected. Thus, the following matrix of scale factors may result:

| 1024 | 757 | 1067 | 1071 | 1024 | 1071 | 1067 | 757 |
| 757  | 560 | 789  | 792  | 757  | 792  | 789  | 560 |
| 1067 | 789 | 1112 | 1116 | 1067 | 1116 | 1112 | 789 |
| 1071 | 792 | 1116 | 1120 | 1071 | 1120 | 1116 | 792 |
| 1024 | 757 | 1067 | 1071 | 1024 | 1071 | 1067 | 757 |
| 1071 | 792 | 1116 | 1120 | 1071 | 1120 | 1116 | 792 |
| 1067 | 789 | 1112 | 1116 | 1067 | 1116 | 1112 | 789 |
| 757  | 560 | 789  | 792  | 757  | 792  | 789  | 560 |

The following tables summarize exemplary scale factors and values of α', β', γ', δ', ε', and ξ' with transform 270.

TABLE 1

Constant factors approximations used in algorithm A.

| Factor | Value | Algorithms: x = x * [A, ..., J] >> 2; x = x * [α, γ, ε]; y = x * [β, δ, ζ]; | Complexity Adds | Shifts | Times used |
|---|---|---|---|---|---|
| A' | 2048 | (x * A') = (x << 9). | 0 | 1 | 4 |
| B' | 1703 | x2 = −x + (x << 6), x3 = x2 + (x2 << 3), x4 = (x + x3) << 1, (x * B') = (x3 + x4) >> 2; | 4 | 4 | 8 |
| C' | 2676 | x2 = −x + (x << 3), x3 = −x + (x2 << 5), (x * C') = x3 + (x3 << 1); | 3 | 3 | 8 |
| D' | 2408 | x2 = x + (x << 5), x3 = x2 << 1, x4 = x + x3, (x * D') = x3 + (x4 << 3); | 3 | 3 | 8 |
| E' | 1416 | x2 = x << 4, x3 = x2 << 3, x4 = x3 − x2, x5 = x + x4, (x * E') = x3 + (x5 << 1); | 3 | 3 | 4 |
| F' | 2225 | x2 = x << 5, x3 = x + (x2 << 2), x4 = x3 << 4, x5 = x2 + x3, (x * F') = (x4 + x5) >> 2; | 3 | 4 | 8 |
| G' | 2003 | x2 = x << 4, x3 = x2 − x, x4 = −x3 + (x2 << 5), (x * G') = (x3 >> 2) + x4; | 3 | 3 | 8 |
| H' | 3496 | x2 = x << 3, x3 = x2 − x, x4 = x3 << 1, x5 = x2 + x4, (x * H') = −x5 + (x4 << 6); | 3 | 3 | 4 |
| I' | 3147 | x2 = x << 9, x3 = −x + (x << 4), x4 = x2 + x3, x5 = x2 + x4, (x * I') = (x5 >> 2) + x4; | 4 | 3 | 8 |
| J' | 2832 | x2 = x << 2, x3 = x2 − x, x4 = x3 << 6, x5 = x2 + x4, (x * J') = x5 + (x2 << 7); | 3 | 3 | 4 |
| α' | 53/128 | (x * β') = x, | 3 | 3 | 2 |
| β' | 1 | x2 = x >> 2, x3 = x + x2, x4 = x2 − x, (x * α') = (x3 >> 5) − (x4 >> 1); | | | |
| γ' | 151/128 | x2 = x − (x >> 4), | 3 | 3 | 2 |
| δ' | 15/32 | x3 = x2 + (x >> 7), (x * δ') = x2 >> 2; (x * γ') = y + x3; | | | |
| ε' | 1 | (x * ε') = x | 3 | 3 | 2 |
| ζ' | 171/256 | x2 = (x >> 3) − x; x3 = x + (xc >> 3); (x * ζ') = x3 − (x3 >> 2); | | | |
| Complexity of scaled 1D transform: | | | 44 | 18 | |
| Total complexity of 2D scaling: | | | 196 | 200 | |
| Complexity of a complete 2D transform: | | | 901 | 552 | |

TABLE 2

Constant factors approximations used in Algorithm B.

| Factor | Value | Algorithms: x = x * [A, ..., J, α, γ, ε]; y = x * [β, δ, ζ]; | Complexity Adds | Shifts | Times used |
|---|---|---|---|---|---|
| A' | 1024 | (x * A') = x << 10; | 0 | 1 | 4 |
| B' | 757 | x2 = −x + (x << 6), x3 = (x2 << 2), x4 = (x3 << 1), (x * B') = x + x3, x = x4 + x5; | 3 | 3 | 8 |
| C' | 1067 | x2 = −x + (x << 6), x3 = −x + (x2 << 2), (x * C') = x3 << 2, x = x2 + x4; | 3 | 3 | 8 |
| D' | 1071 | x2 = x << 6, x3 = x2 − x, (x * D') = x3 + (x3 << 4); | 2 | 2 | 8 |
| E' | 560 | x2 = x << 5, x3 = x + x2, x4 = x3 << 4, (x * E') = x2 + x4; | 2 | 2 | 4 |
| F' | 789 | x2 = x << 3, x3 = x2 − x, x4 = x3 + (x2 << 5), (x * F') = x4 + (x4 << 1); | 3 | 3 | 8 |
| G' | 792 | x2 = x + (x << 5), x3 = x2 << 1, x4 = x2 + x3, (x * G') = x4 << 3; | 2 | 3 | 8 |
| H' | 1112 | x2 = x << 4, x3 = x2 − x, x4 = x2 + x3, x5 = x3 + (x4 << 2), (x * H') = x5 << 3; | 3 | 3 | 4 |
| I' | 1116 | x2 = −x + (x << 5), x3 = x2 << 3, x4 = x2 + x3, (x * I') = x4 << 2; | 2 | 3 | 8 |
| J' | 1120 | x2 = −x + (x << 3), x3 = x2 + (x2 << 2), (x * J') = x3 << 5; | 2 | 3 | 4 |
| α' | 133/256 | x2 = x >> 2, | 3 | 4 | 2 |
| β' | 321/256 | x3 = x + x2, x4 = x + (x3 >> 5), (x * α') = (x4 >> 1); (x * β') = x3 − (−x2 >> 6); | | | |
| γ' | 679/512 | x2 = x >> 4, | 3 | 3 | 2 |
| δ' | 135/512 | x3 = x >> 9, x4 = x + x2, (x * δ') = −x3 + (x4 >> 2); (x * γ') = x4 + (x * δ'); | | | |
| ε' | 4605/4096 | x2 = x + (x >> 1), | 3 | 4 | 2 |
| ζ' | 1539/2048 | x3 = x2 + (x2 >> 9), −(x * ζ') = −x3 >> 1; (x * ε') = x2 − (y >> 1); | | | |
| Complexity of scaled 1D transform: | | | 44 | 22 | |
| Total complexity of 2D scaling: | | | 148 | 172 | |
| Complexity of 2D transform w/o scaling: | | | 704 | 352 | |
| Complexity of a complete 2D transform: | | | 852 + 1 | 524 + 64 | |

TABLE 3

Constant factors approximations used in Algorithm C.

| Factor | Value | Algorithms: x = x * [A, ..., J, α, γ, ε]; y = x * [β, δ, ζ]; | Complexity Adds | Shifts | Times used |
|---|---|---|---|---|---|
| A' | 1024 | (x * A') = x << 10; | 0 | 1 | 4 |
| B' | 1138 | x2 = x1 << 1, x3 = x2 << 3, x4 = x2 + x3, | 3 | 3 | 8 |

TABLE 3-continued

Constant factors approximations used in Algorithm C.

| Factor | Value | Algorithms:<br>x = x * [A, ..., J, α, γ, ε];<br>y = x * [β, δ, ζ]; | Complexity | | Times used |
|---|---|---|---|---|---|
| | | | Adds | Shifts | |
| C' | 1730 | x5 = x3 − x2,<br>(x * B') = (x4 << 6) − x5;<br>x2 = x1 << 1,<br>x3 = x1 + x2,<br>x4 = x3 << 3,<br>x5 = x3 + x4,<br>(x * C') = x2 + (x5 << 6); | 3 | 3 | 8 |
| D' | 1609 | x2 = x1 << 3,<br>x3 = x2 << 1,<br>x4 = x1 + x2,<br>x5 = x3 + x4,<br>(x * D') = x4 + (x5 << 6); | 3 | 3 | 8 |
| E' | 1264 | x2 = x1 << 2,<br>x3 = x2 << 2,<br>x4 = x2 + x3,<br>x5 = x4 << 6,<br>(x * E') = x5 − x3; | 2 | 3 | 4 |
| F' | 1922 | x2 = x1 << 1,<br>x3 = x2 << 3,<br>x4 = −x1 + x3,<br>x5 = x4 << 7,<br>(x * F') = x2 + x5; | 2 | 3 | 8 |
| G' | 1788 | x2 = x1 << 2<br>x3 = x2 << 1,<br>x4 = x3 − x1,<br>x5 = x4 << 8,<br>(x * G') = x5 − x2; | 2 | 3 | 8 |
| H' | 2923 | x2 = x1 << 1,<br>x3 = x1 + x2,<br>x4 = (x3 << 3) − x1,<br>x5 = x4 − x2,<br>(x * H') = (x4 << 7) − x5; | 4 | 3 | 4 |
| I' | 2718 | x2 = x1 << 1,<br>x3 = x2 << 1,<br>x4 = x1 + x3,<br>x5 = x4 + (x4 << 4),<br>(x * I') = (x5 << 5) − x2; | 3 | 4 | 8 |
| J' | 2528 | x2 = x1 << 2,<br>x3 = x1 + x2,<br>x4 = x3 << 4,<br>x5 = x4 − x1,<br>(x * J') = x5 << 5; | 2 | 3 | 4 |
| α' | 41/128 | x2 = x + (x >> 5);<br>x3 = x2 >> 2;<br>(x * α') = x3 + (x >> 4);<br>(x * β') = x2 − x3; | 3 | 3 | 2 |
| β' | 99/128 | | | | |
| γ' | 113/128 | x2 = (x >> 3) − (x >> 7);<br>x3 = x2 − (x >> 11);<br>(x * δ') = x2 + (x3 >> 1);<br>(x * γ') = x − x2; | 4 | 4 | 2 |
| δ' | 719/4096 | | | | |
| ε' | 1533/2048 | x2 = (x >> 9) − x;<br>(x * ζ') = x >> 1;<br>(x * ε') = (x2 >> 2) − x2; | 2 | 3 | 2 |
| ζ' | 1/2 | | | | |
| Complexity of a scaled 1D transform: | | | 44 | 20 | |
| Total complexity of 2D scaling: | | | 160 | 192 | |
| Complexity of a complete 2D transform: | | | 865 | 576 | |

To illustrate how IDCT module 48 may use the scale factors, constant values, and algorithms provided in the above tables, consider Table 3 above. To apply an inverse discrete cosine transform using the values in Table 3, input module 140 in IDCT module 48 may receive an 8×8 matrix of coefficients. Next, scaling module 142 scales a coefficient at position [0,0] of the matrix by a factor A; scales a coefficient at position [0,1] of the matrix by a factor B; scales a coefficient at position [0,2] of the matrix by a factor C; scales a coefficient at position [0,3] of the matrix by a factor D; scales a coefficient at position [0,4] of the matrix by the factor A; scales a coefficient at position [0,5] of the matrix by the factor D; scales a coefficient at position [0,6] of the matrix by the factor C; scales a coefficient at position [0,7] of the matrix by the factor B; scales a coefficient at position [1,0] of the matrix by the factor B; scales a coefficient at position [1,1] of the matrix by a factor E; scales a coefficient at position [1,2] of the matrix by a factor F; scales a coefficient at position [1,3] of the matrix by a factor G; scales a coefficient at position [1,4] of the matrix by the factor B; scales a coefficient at position [1,5] of the matrix by the factor G; scales a coefficient at position [1,6] of the matrix by the factor F; scales a coefficient at position [1,7] of the matrix by the factor E; scales a coefficient at position [2,0] of the matrix by the factor C; scales a coefficient at position [2,1] of the matrix by the factor F; scales a coefficient at position [2,2] of the matrix by a factor H; scales a coefficient at position [2,3] of the matrix by a factor I; scales a coefficient at position [2,4] of the matrix by the factor C; scales a coefficient at position [2,5] of the matrix by the factor I; scales a coefficient at position [2,6] of the matrix by the factor H; scales a coefficient at position [2,7] of the matrix by the factor F; scales a coefficient at position [3,0] of the matrix by the factor D; scales a coefficient at position [3,1] of the matrix by the factor G; scales a coefficient at position [3,2] of the matrix by the factor I; scales a coefficient at position [3,3] of the matrix by the factor J; scales a coefficient at position [3,4] of the matrix by the factor D; scales a coefficient at position [3,5] of the matrix by the factor J; scales a coefficient at position [3,6] of the matrix by the factor I; scales a coefficient at position [3,7] of the matrix by the factor G; scales a coefficient at position [4,0] of the matrix by the factor A; scales a coefficient at position [4,1] of the matrix by the factor B; scales a coefficient at position [4,2] of the matrix by the factor C; scales a coefficient at position [4,3] of the matrix by the factor D; scales a coefficient at position [4,4] of the matrix by the factor A; scales a coefficient at position [4,5] of the matrix by the factor D; scales a coefficient at position [4,6] of the matrix by the factor C; scales a coefficient at position [4,7] of the matrix by the factor B; scales a coefficient at position [5,0] of the matrix by the factor D; scales a coefficient at position [5,1] of the matrix by the factor G; scales a coefficient at position [5,2] of the matrix by the factor I; scales a coefficient at position [5,3] of the matrix by the factor J; scales a coefficient at position [5,4] of the matrix by the factor D; scales a coefficient at position [5,5] of the matrix by the factor J; scales a coefficient at position [5,6] of the matrix by the factor I; scales a coefficient at position [5,7] of the matrix by the factor G; scales a coefficient at position [6,0] of the matrix by the factor C; scales a coefficient at position [6,1] of the matrix by the factor F; scales a coefficient at position [6,2] of the matrix by a factor H; scales a coefficient at position [6,3] of the matrix by a factor I; scales a coefficient at position [6,4] of the matrix by the factor C; scales a coefficient at position [6,5] of the matrix by the factor I; scales a coefficient at position [6,6] of the matrix by the factor H; scales a coefficient at position [6,7] of the matrix by the factor F; scales a coefficient at position [7,0] of the matrix by the factor B; scales a coefficient at position [7,1] of the matrix by a factor E; scales a coefficient at position [7,2] of the matrix by a factor F; scales a coefficient at position [7,3] of the matrix by a factor G; scales a coefficient at position [7,4] of the matrix by the factor B; scales a coefficient at position [7,5] of the matrix by the factor G; scales a coefficient at position [7,6] of the matrix by the factor F; and scales a coefficient at position [7,7] of the matrix by the factor E. When scaling module 142 scales these coefficients, scaling module 142 may use the values A=1024, B=1138, C=1730, D=1609, E=1264, F=1922, G=1788, H=2923, I=2718, and J=2528, as specified in Table 6. These scaled coefficients constitute a matrix of scaled coefficients.

After scaling module 142 scales the coefficients, inverse transform module 146 may apply a transform to each row vector of the matrix of scaled coefficients to produce a matrix of intermediate coefficients and apply the transform to each column vector of the matrix of intermediate coefficients to produce a matrix of transformed coefficients. Inverse transform module 146 may apply the transform to a row vector or a column vector by: calculating a value $x_0'$ by adding $x_0$ and $x_4$; calculating a value $x_4'$ by adding $x_0$ and $-x_4$; calculating a value $(x_2*\alpha)$ by multiplying $x_2$ by a value $\alpha$; calculating a value $(x_6*\beta)$ by multiplying $x_6$ by a value $\beta$; calculating a value $(x_2*\beta)$ by multiplying $x_2$ by the value $\beta$; calculating a value $(x_6*\alpha)$ by multiplying $x_6$ by a value $\alpha$; calculating a value $x_2'$ by adding $(x_2*\alpha)$ and $-(x_6*\beta)$; calculating a value $x_6'$ by adding $(x_6*\alpha)$ and $(x_2*\beta)$; calculating a value $x_0''$ by adding $x_0'$ and $x_6'$; calculating a value $X_4''$ by adding $x_4'$ and $x_2'$; calculating a value $x_2''$ by adding $X_4'$ and $-x_2'$; calculating a value $x_6''$ by adding $x_0'$ and $-x_6'$; calculating a value $x_7'$ by adding $x_1$ and $-x_7$; calculating a value $x_1'$ by adding $x_1$ and $x_7$; calculating a value $x_3'$ by multiplying $x_3$ and square root of two; calculating a value $x_5'$ by multiplying $x_5$ and square root of two; calculating a value $x_7''$ by adding $x_7'$ and $x_5'$; calculating a value $x_3''$ by adding $x_1'$ and $-x_3'$; calculating a value $x_5''$ by adding $x_7'$ and $-x_5'$; calculating a value $x_1''$ by adding $x_3'$ and $x_1'$; calculating a value $(x_7''*\epsilon)$ by multiplying $x_7''$ and a value $\epsilon$; calculating a value $(x_7''*\xi)$ by multiplying $x_7''$ and a value $\xi$; calculating a value $(x_3''*\gamma)$ by multiplying $x_3''$ and a value $\gamma$; calculating a value $(x_3''*\delta)$ by multiplying $x_3''$ and a value $\delta$; calculating a value $(x_5''*\delta)$ by multiplying $x_5''$ and the value $\delta$; calculating a value $(x_5''*\gamma)$ by multiplying $x_5''$ and the value $\gamma$; calculating a value $(x_1''*\xi)$ by multiplying $x_1''$ and the value $\xi$; calculating a value $(x_1''*\epsilon)$ by multiplying $x_1''$ and the value $\epsilon$; calculating a value $x_7'''$ by adding $(x_7''*\epsilon)$ and $-(x_1''*\xi)$; calculating a value $x_3'''$ by adding $(x_3''*\gamma)$ and $-(x_5''*\delta)$; calculating a value $x_5'''$ by adding $(x_5''*\gamma)$ and $(x_3''*\delta)$; calculating a value $x_1'''$ by adding $(x_1''*\epsilon)$ and $(x_7''*\xi)$; calculating a value $X_0$ by adding $x_7'''$ and $x_0''$; calculating a value $X_1$ by adding $x_4''$ and $x_5'''$; calculating a value $X_2$ by adding $x_2''$ and $x_3'''$; calculating a value $X_3$ by adding $x_6''$ and $x_7'''$; calculating a value $X_4$ by adding $x_6''$ and $-x_1'''$; calculating a value $X_5$ by adding $x_2''$ and $-x_3'''$; calculating a value $X_6$ by adding $x_4''$ and $-x_5'''$; calculating a value $X_7$ by adding $x_0''$ and $-x_1'''$, wherein $x_0, x_1, x_2, x_3, x_4, x_5, x_6, x_7$ are coefficients in a row vector or a column vector and $X_1, X_2, X_3, X_4, X_5, X_6$, and $X_7$ are output values of the transform. When performing these calculations, inverse transform module 146 uses the fractional values $\alpha=41/128$, $\beta=99/128$, $\gamma=1533/2048$, $\delta=1/2$, $\epsilon=113/128$, and $\xi=719/4096$, products by which are computed by multiplier-less algorithms as specified in Table 3.

The following code contains an exemplary C-language implementation of transform 270:

```
/* Define the scaling factors values */
#define A   1024
#define B   1138
#define C   1730
#define D   1609
#define E   1264
#define F   1922
#define G   1788
#define H   2923
#define I   2718
#define J   2528
/* Define the matrix of scaling factors */
static int scale [8*8] = {
    A, B, C, D, A, D, C, B,
    B, E, F, G, B, G, F, E,
    C, F, H, I, C, I, H, F,
    D, G, I, J, D, J, I, G,
    A, B, C, D, A, D, C, B,
    D, G, I, J, D, J, I, G,
    C, F, H, I, C, I, H, F,
    B, E, F, G, B, G, F, E
};
void scaled_1d_idct (int *, int *);
void idct (short *P)
{
    int block[8*8], block2[8*8], i;
    /* Scale each of the input coefficients */
    for (i=0; i<64; i++)
        block[i] = scale[i] * P[i];
    /* Add bias to the DC coefficient */
    block[0] += 1 << 12;
    /* Apply the vector inverse discrete cosine transform to
    each row and column of the block. */
    for (i=0; i<8; i++)
        scaled_1d_idct (block + i*8, block2 + i);
    for (i=0; i<8; i++)
        scaled_1d_idct (block2 + i*8, block + i);
    /* Right-shift each of the transformed coefficients */
    for (i=0; i<64; i++)
        P[i] = block[i] >> 13;
}
#define mul_1(y,z)
    {
        int y2, y3;
        y2 = (y >> 3) - (y >> 7);
        y3 = y2 - (y >> 11);
        z  = y2 + (y3 >> 1);
        y  = y - y2;
    }
#define mul_2(y,z)
    {
        int y2;
        y2 = (y >> 9) - y;
        z  = y >> 1;
        y  = (y2 >> 2) - y2;
    }
#define mul_3(y,z)
    {
        int y2, y3;
        y2 = y + (y >> 5);
        y3 = y2 >> 2;
        y  = y3 + (y >> 4);
        z  = y2 - y3;
    }
void scaled_1d_idct (int *in, int *out)
{
    int x0, x1, x2, x3, x4, x5, x6, x7, xa, xb;
    x1 = in[1];
    x3 = in[3];
    x5 = in[5];
    x7 = in[7];
    xa = x1 + x7;
    xb = x1 - x7;
    x1 = xa + x3;
    x3 = xa - x3;
    x7 = xb + x5;
    x5 = xb - x5;
    mul_1(x3, xa);
    mul_1(x5, xb);
    x3 = x3 - xb;
    x5 = x5 + xa;
    mul_2(x1, xa);
    mul_2(x7, xb);
    x1 = x1 + xb;
    x7 = x7 - xa;
    x0 = in[0];
    x2 = in[2];
    x4 = in[4];
    x6 = in[6];
    mul_3(x2, xa);
    mul_3(x6, xb);
    x2 = x2 - xb;
    x6 = x6 + xa;
    xa = x0 + x4;
    xb = x0 - x4;
```

-continued

```
        x0 = xa + x6;
        x6 = xa - x6;
        x4 = xb + x2;
        x2 = xb - x2;
        out[0*8] = x0 + x1;
        out[1*8] = x4 + x5;
        out[2*8] = x2 + x3;
        out[3*8] = x6 + x7;
        out[4*8] = x6 - x7;
        out[5*8] = x2 - x3;
        out[6*8] = x4 - x5;
        out[7*8] = x0 - x1;
    }
    void scaled_1d_fdct (int *, int *);
    void fdct (short *P)
    {
        int block[8*8], block2[8*8], i;
        for (i=0; i<64; i++)
            block[i] = P[i] << 7;
        for (i=0; i<8; i++)
            scaled_1d_fdct (block + i, block2 + i*8);
        for (i=0; i<8; i++)
            scaled_1d_fdct (block2 + i, block + i*8);
        for (i=0; i<64; i++)
            P[i] = (block[i] * scale[i] + 0x7FFFF - (block[i]>>31)) >> 20;
    }
    void scaled_1d_fdct (int *in, int *out)
    {
        int x0, x1, x2, x3, x4, x5, x6, x7, xa, xb;
        x0 = in[0*8] + in[7*8];
        x1 = in[0*8] - in[7*8];
        x4 = in[1*8] + in[6*8];
        x5 = in[1*8] - in[6*8];
        x2 = in[2*8] + in[5*8];
        x3 = in[2*8] - in[5*8];
        x6 = in[3*8] + in[4*8];
        x7 = in[3*8] - in[4*8];
        mul_1(x3, xa);
        mul_1(x5, xb);
        x3 = x3 + xb;
        x5 = x5 - xa;
        mul_2(x1, xa);
        mul_2(x7, xb);
        x1 = x1 - xb;
        x7 = x7 + xa;
        xa = x1 + x3;
        x3 = x1 - x3;
        xb = x7 + x5;
        x5 = x7 - x5;
        x1 = xa + xb;
        x7 = xa - xb;
        xa = x0 + x6;
        x6 = x0 - x6;
        xb = x4 + x2;
        x2 = x4 - x2;
        x0 = xa + xb;
        x4 = xa - xb;
        mul_3(x2, xa);
        mul_3(x6, xb);
        x2 = xb + x2;
        x6 = x6 - xa;
        out[0] = x0;
        out[1] = x1;
        out[2] = x2;
        out[3] = x3;
        out[4] = x4;
        out[5] = x5;
        out[6] = x6;
        out[7] = x7;
    }
```

Figure 11:
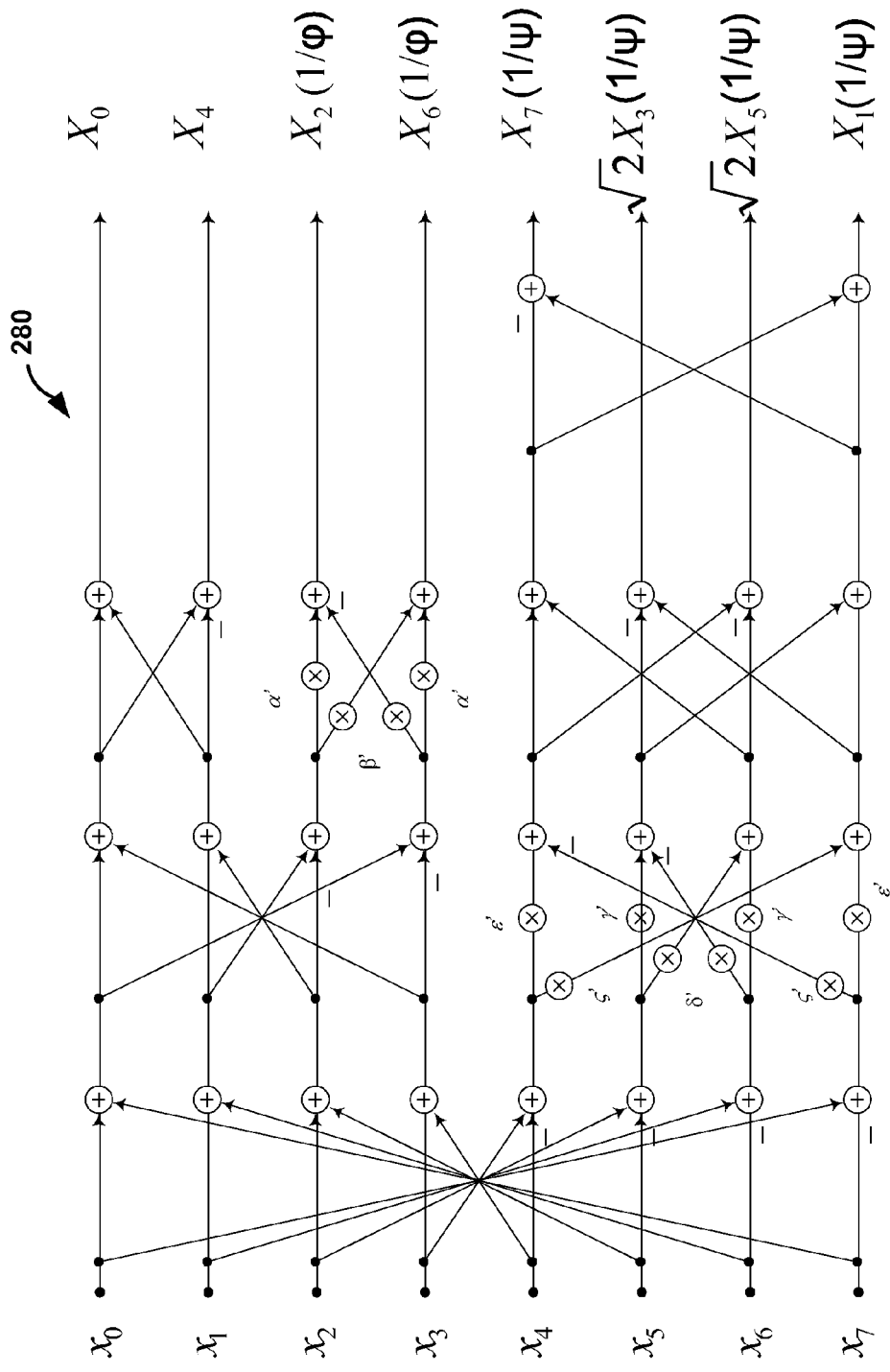
FIG. 11 is a flow diagram illustrating an exemplary scaled one-dimensional transform used by the inverse transform module.

FIG. 11 is a flow diagram illustrating an exemplary scaled transform 280 used by forward transform module 214. In FIG. 11, the values $X_0$, $X_1$, $X_2$, $X_3$, $X_4$, $X_5$, $X_6$, and $X_7$ represent output coefficients and values $x_0$, $x_1$, $x_2$, $x_3$, $x_4$, $x_5$, $x_6$, and $x_7$ represent input values. The value associated with a line after a circle that encompasses a "+" symbol is the result of adding the values associated with the arrows that points into the circle. The value associated with a line after a circle that encompasses an "×" symbol is the result of multiplying the coefficient positioned next to the circle and values associated with the lines that pass through the circles. The symbol "−" next to an arrow represents a negation of the value associated with the arrow. For example, if the value "10" is associated with an arrow before a "−" symbol, the value "−10" is associated with the arrow after the "−" symbol. Furthermore, it should be noted that the techniques described above to reduce rounding error using negatived coefficients and subtraction may be used in algorithm 190.

In transform 280, the output values $X_0$ through $X_7$ are multiplied by the factors 1, $\phi$, $\phi$, $\psi$, $\sqrt{2}\psi$, $\sqrt{2}\psi$, and $\psi$, respectively. Notice that these factors are the reciprocals of the values factored out of $\alpha'$, $\beta'$, $\gamma'$, $\delta'$, $\epsilon'$, and $\xi'$ in transform 270.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

The invention claimed is:

1. A method comprising:
   scaling each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients,
   wherein A=1024, B=1138, C=1730, D=1609, E=1264, F=1922, G=1788, H=2923, I=2718, and J=2528;
   using repeated applications of a fixed-point scaled one-dimensional transform to transform the matrix of scaled coefficients into a matrix of transformed coefficients;
   right-shifting transformed coefficients in the matrix of transformed coefficients in order to produce a matrix of adjusted coefficients;

wherein each adjusted coefficient in the matrix of adjusted coefficients approximates a corresponding value in a matrix of values that would be produced by applying an ideal two-dimensional inverse discrete cosine transform ("IDCT") to the matrix of encoded coefficients;

displaying an 8×8 block of pixels, wherein each pixel in the 8×8 block of pixels includes a pixel component value based on an adjusted coefficient in the matrix of adjusted coefficients.

2. The method of claim 1, wherein repeatedly applying the fixed-point scaled one-dimensional transform comprises:

applying the fixed-point scaled one-dimensional transform to each row vector of the matrix of scaled coefficients to produce a matrix of intermediate coefficients; and applying the fixed-point scaled one-dimensional transform to each column vector of the matrix of intermediate coefficients to produce a matrix of transformed coefficient.

3. The method of claim 1, wherein displaying the 8×8 block of pixels comprises displaying the 8×8 block of pixels as part of a video frame, in a video sequence.

4. The method of claim 1, wherein displaying the 8×8 block of pixels comprises displaying the 8×8 block of pixels as part of a still image.

5. The method of claim 1, wherein scaling coefficients in the matrix of coefficients comprises:

scaling a coefficient at position [0,0] of the matrix of encoded coefficients by the factor A;

scaling a coefficient at position [0,1] of the matrix of encoded coefficients by the factor B;

scaling a coefficient at position [0,2] of the matrix of encoded coefficients by the factor C;

scaling a coefficient at position [0,3] of the matrix of encoded coefficients by the factor D;

scaling a coefficient at position [0,4] of the matrix of encoded coefficients by the factor A;

scaling a coefficient at position [0,5] of the matrix of encoded coefficients by the factor D;

scaling a coefficient at position [0,6] of the matrix of encoded coefficients by the factor C;

scaling a coefficient at position [0,7] of the matrix of encoded coefficients by the factor B;

scaling a coefficient at position [1,0] of the matrix of encoded coefficients by the factor B;

scaling a coefficient at position [1,1] of the matrix of encoded coefficients by the factor E;

scaling a coefficient at position [1,2] of the matrix of encoded coefficients by the factor F;

scaling a coefficient at position [1,3] of the matrix of encoded coefficients by the factor G;

scaling a coefficient at position [1,4] of the matrix of encoded coefficients by the factor B;

scaling a coefficient at position [1,5] of the matrix of encoded coefficients by the factor G;

scaling a coefficient at position [1,6] of the matrix of encoded coefficients by the factor F;

scaling a coefficient at position [1,7] of the matrix of encoded coefficients by the factor E;

scaling a coefficient at position [2,0] of the matrix of encoded coefficients by the factor C;

scaling a coefficient at position [2,1] of the matrix of encoded coefficients by the factor F;

scaling a coefficient at position [2,2] of the matrix of encoded coefficients by the factor H;

scaling a coefficient at position [2,3] of the matrix of encoded coefficients by the factor I;

scaling a coefficient at position [2,4] of the matrix of encoded coefficients by the factor C;

scaling a coefficient at position [2,5] of the matrix of encoded coefficients by the factor I;

scaling a coefficient at position [2,6] of the matrix of encoded coefficients by the factor H;

scaling a coefficient at position [2,7] of the matrix of encoded coefficients by the factor F;

scaling a coefficient at position [3,0] of the matrix of encoded coefficients by the factor D;

scaling a coefficient at position [3,1] of the matrix of encoded coefficients by the factor G;

scaling a coefficient at position [3,2] of the matrix of encoded coefficients by the factor I;

scaling a coefficient at position [3,3] of the matrix of encoded coefficients by the factor J;

scaling a coefficient at position [3,4] of the matrix of encoded coefficients by the factor D;

scaling a coefficient at position [3,5] of the matrix of encoded coefficients by the factor J;

scaling a coefficient at position [3,6] of the matrix of encoded coefficients by the factor I;

scaling a coefficient at position [3,7] of the matrix of encoded coefficients by the factor G;

scaling a coefficient at position [4,0] of the matrix of encoded coefficients by the factor A;

scaling a coefficient at position [4,1] of the matrix of encoded coefficients by the factor B;

scaling a coefficient, at position [4,2] of the matrix of encoded coefficients by the factor C;

scaling a coefficient at position [4,3] of the matrix of encoded coefficients by the factor D;

scaling a coefficient at position [4,4] of the matrix of encoded coefficients by the factor A;

scaling a coefficient at position [4,5] of the matrix of encoded coefficients by the factor D;

scaling a coefficient at position [4,6] of the matrix of encoded coefficients by the factor C;

scaling a coefficient at position [4,7] of the matrix of encoded coefficients by the factor B;

scaling a coefficient at position [5,0] of the matrix of encoded coefficients by the factor D;

scaling a coefficient at position [5,1] of the matrix of encoded coefficients by the factor G;

scaling a coefficient at position [5,2] of the matrix of encoded coefficients by the factor I;

scaling a coefficient at position [5,3] of the matrix of encoded coefficients by the factor J;

scaling a coefficient at position [5,4] of the matrix of encoded coefficients by the factor D;

scaling a coefficient at position [5,5] of the matrix of encoded coefficients by the factor J;

scaling a coefficient at position [5,6] of the matrix of encoded coefficients by the factor I;

scaling a coefficient at position [5,7] of the matrix of encoded coefficients by the factor G;

scaling a coefficient at position [6,0] of the matrix of encoded coefficients by the factor C;

scaling a coefficient at position [6,1] of the matrix of encoded coefficients by the factor F;

scaling a coefficient at position [6,2] of the matrix of encoded coefficients by the factor H;

scaling a coefficient at position [6,3] of the matrix of encoded coefficients by the factor I;

scaling a coefficient at position [6,4] of the matrix of encoded coefficients by the factor C;

scaling a coefficient at position [6,5] of the matrix of encoded coefficients by the factor I;
scaling a coefficient at position [6,6] of the matrix of encoded coefficients by the factor H;
scaling a coefficient at position [6,7] of the matrix of encoded coefficients by the factor F;
scaling a coefficient at position [7,0] of the matrix of encoded coefficients by the factor B;
scaling a coefficient at position [7,1] of the matrix of encoded coefficients by the factor E;
scaling a coefficient at position [7,2] of the matrix of encoded coefficients by the factor F;
scaling a coefficient at position [7,3] of the matrix of encoded coefficients by the factor G;
scaling a coefficient at position [7,4] of the matrix of encoded coefficients by the factor B;
scaling a coefficient at position [7,5] of the matrix of encoded coefficients by the factor G;
scaling a coefficient at position [7,6] of the matrix of encoded coefficients by the factor F;
scaling a coefficient at position [7,7] of the matrix of encoded coefficients by the factor E.

6. The method of claim 5, wherein applying the transform to either a row vector or a column vector comprises:
calculating a value x0' by adding x0 and x4;
calculating a value x4' by adding x0 and −x4;
calculating a value $(x2*\alpha)$ by multiplying x 2 by a value $\alpha$;
calculating a value $(x6*\beta)$ by multiplying x6 by a value $\beta$;
calculating a value $(x2*\beta)$ by multiplying x2 by the value $\beta$;
calculating a value $(x6*\alpha)$ by multiplying x6 by a value $\alpha$;
calculating a value x2' by adding $(x2*\alpha)$ and $-(x6*\beta)$;
calculating a value x6' by adding $(x6*\alpha)$ and $(x2*\beta)$;
calculating a value x0" by adding x0' and x6';
calculating a value x4" by adding x4' and x2';
calculating a value x2" by adding x4' and −x2';
calculating a value x6" by adding x0' and −x6';
calculating a value x7' by adding x1 and −x7;
calculating a value x1' by adding x1 and x7;
calculating a value x7" by adding x7' and x5';
calculating a value x3" by adding x1' and −x3';
calculating a value x5" by adding x7' and −x5';
calculating a value x1" by adding x3' and x1';
calculating a value $(x7"*\epsilon)$ by multiplying x7" and a value $\epsilon$;
calculating a value $(x7"*\zeta)$ by multiplying x7" and a value $\zeta$;
calculating a value $(x3"*\gamma)$ by multiplying x3" and a value $\gamma$;
calculating a value $(x3"*\delta)$ by multiplying x3" and a value $\delta$;
calculating a value $(x5"*\delta)$ by multiplying x5" and the value $\delta$;
calculating a value $(x5"*\gamma)$ by multiplying x5" and the value $\gamma$;
calculating a value $(x1"*\zeta)$ by multiplying x1" and the value $\zeta$;
calculating a value $(x1"*\epsilon)$ by multiplying x1" and the value $\epsilon$;
calculating a value x7'" by adding $(x7"*\epsilon)$ and $-(x1"*\zeta)$;
calculating a value x3'" by adding $(x3"*\gamma)$ and $-(x5"*\delta)$;
calculating a value x5'" by adding $(x5"*\gamma)$ and $(x3"*\delta)$;
calculating a value x1'" by adding $(x1"*\epsilon)$ and $(x7"*\zeta)$;
calculating a value X0 by adding x7'" and x0";
calculating a value X1 by adding x4" and x5'";
calculating a value X2 by adding x2" and x3'";
calculating a value X3 by adding x6" and x7'";
calculating a value X4 by adding x6" and −x1'";
calculating a value X5 by adding x2" and −x3'";
calculating a value X6 by adding x4" and −x5'"; and
calculating a value X7 by adding x0" and −x1'";
wherein x0, x1, x2, x3, x4, x5, x6, x7 are coefficients in a row vector or a column vector,
wherein X1, X2, X3, X4, X5, X6, and X7 are output values of the transform; and
wherein $\alpha=41/128$, $\beta=99/128$, $\gamma=113/128$, $\delta=719/4096$, $\epsilon=1533/2048$, and $\zeta=1/2$.

7. The method of claim 6, wherein using repeated applications of the fixed-point scaled one-dimensional transform comprises applying the transform to coefficients in one of the row vectors or one of the column vectors without using multiplication or division operations.

8. The method of claim 7,
wherein calculating a value $(x1*\epsilon)$ by multiplying x1 and the value c and wherein calculating the value $(x1*\zeta)$ by x1 and the value $\zeta$ comprises performing the following sequence of arithmetic operations:
calculating a value y1, wherein y1=(x1>>9)−x1;
calculating the value $(x1*\zeta)$ by right-shifting x3 by one position; and
calculating the value $(x1*\epsilon)$ by subtracting y1 from (y1'>>2); and
wherein calculating a value $(x7*\epsilon)$ by multiplying x7 and the values and wherein calculating the value $(x7*\zeta)$ by x7 and the value $\zeta$ comprises performing the following sequence of arithmetic operations:
calculating a value y1', wherein y1'=(x7>>9)−x7;
calculating the value $(x7*\zeta)$ by right-shifting x7 by one position; and
calculating the value $(x7*\epsilon)$ by subtracting y1' from (y1'>>2); and
wherein calculating a value $(x1"*\epsilon)$ by multiplying x1" and the value $\epsilon$ and wherein calculating the value $(x1"*\zeta)$ by x1" and the value $\zeta$ comprises performing the following sequence of arithmetic operations:
calculating a value y1", wherein y1"=(x1">>9)−x1";
calculating the value $(x1"*\zeta)$ by right-shifting x1" by one position; and
calculating the value $(x1"*\epsilon)$ by subtracting y1" from (y1">>2); and
wherein calculating a value $(x7"*\epsilon)$ by multiplying x7" and the value $\epsilon$ and wherein calculating the value $(x7"*\zeta)$ by x7" and the value $\zeta$ comprises performing the following sequence of arithmetic operations:
calculating a value y1'", wherein y1'"=(x7">>9)−x7";
calculating the value $(x7"*\zeta)$ by right-shifting x7" by one position; and
calculating the value $(x7"*\epsilon)$ by subtracting y1'" from (y1'">>2).

9. The method of claim 7,
wherein calculating a value $(x3*\gamma)$ by multiplying x3 and a value $\gamma$ and wherein calculating a value $(x3*\delta)$ by multiplying x3 and a value $\delta$ comprises performing the following sequence of operations:
calculating a value y2, wherein y2=(x3>>3)−(x3>>7),
calculating a value y3, wherein y3=y2−(x3>>11);
calculating the value $(x3*\delta)$=y2+(y3>>1); and
calculating the value $(x3*\gamma)$ by subtracting y2 from x3; and
wherein calculating a value $(x5*\delta)$ by multiplying x5 and the, value $\delta$ and wherein calculating a value $(x5*\gamma)$ by multiplying x5 and the value $\gamma$ comprises performing the following sequence of operations:
calculating a value y2', wherein y2'=(x5>>3)−(x5>>7);
calculating a value y3', wherein y3'=y2'−(x5>>11);

calculating the value (x5*δ) by adding y2' and (y3'>>1); and calculating the value (x5*γ) by subtracting y2' from x5; and wherein calculating a value (x3"*γ) by multiplying x3" and a value γ and wherein calculating a value (x3"*δ) by multiplying x3" and a value δ comprises performing the following sequence of operations:

calculating a value y2", wherein y2"=(x3">>3)−(x3">>7);

calculating a value y3", wherein y3"=y2"−(x3">>11);

calculating the value (x3"*δ)=y2"+(y3">>1); and calculating the value (x3"*γ) by subtracting y2" from x3"; and wherein calculating a value (x5"*δ) by multiplying x5" and the value δ and wherein calculating a value (x5"*γ) by multiplying x5" and the value γ comprises performing the following sequence of operations:

calculating a value y2''', wherein y2'''=(x5">>3)−(x5">>7);

calculating a value y3''', wherein y3'''=y2'''−(x5">>11);

calculating the value (x5"*δ) by adding y2''' and (y3'''>>1); and calculating the value (x5"*γ) by subtracting y2''' from x5".

10. The method of claim 7, wherein calculating a value (x2*α) by multiplying x2 by a value α and wherein calculating a value (x2*β) by multiplying x2 by a value β comprises performing the following sequence of operations:

calculating a value y1, wherein y1=x2+(x2>>5);

calculating a value y2, wherein y2=y1>>2;

calculating the value (x2*α) by adding y2 and (x2>>4); and calculating the value (x2*β) by subtracting y2 from y1; and wherein calculating a value (x6*α) by multiplying x6 by a value α and wherein calculating a value (x6*β) by multiplying x6 by a value β comprises performing the following sequence of operations:

calculating a value y1', wherein y1'=x2+(x6>>5);

calculating a value y2', wherein y2'=y1'>>2;

calculating the value (x6*α) by adding y2' and (x6>>4); and calculating the value (x6*β) by subtracting y2' from y1'; and wherein calculating a value (x2"*α) by multiplying x2" by a value α and wherein calculating a value (x2"*β) by multiplying x2" by a value β comprises performing the following sequence of operations:

calculating a value y1", wherein y1"=x2+(x2">>5);

calculating a value y2", wherein y2"=y1">>2;

calculating the value (x2"*α) by adding y2" and (x2">>4); and calculating the value (x2"*β) by subtracting y2" from y1"; and wherein calculating a value (x6"*α) by multiplying x6" by a value α and wherein calculating a value (x6"*β) by multiplying x6" by a value β comprises performing the following sequence of operations:

calculating a value y1''', wherein y1'''=x2+(x6">>5);

calculating a value y2''', wherein y2'''=y1'''>>2;

calculating the value (x6"*α) by adding y2''' and (x6">>4); and calculating the value (x6"*β) by subtracting y2''' from y1'''.

11. The method of claim 6, wherein the values x0, x1, x2, x3, x4, x5, x6, x7, x0', x1', x2', x3', x4', x5', x6', x7', x0", x1", x2", x3", x4", x5", x6", x7", x1'''x3", x5", x7''', (x2*α), (x6*β), (x2*β), (x6*α), (x7"*ε), (x7"*ζ), (x3"*γ), (x3"*δ), (x5"*δ), (x5"*γ), (x1"*ζ), and (x1"*ε) are represented using fixed-point numbers that include P bits in the mantissa portions of the fixed-point numbers.

12. The method of claim 11, wherein P is equal to 10.

13. The method of claim 1, wherein the method further comprises receiving a bitstream that includes the matrix of coefficients.

14. The method of claim 1, wherein the method further comprises adding a midpoint bias term to a DC coefficient of the matrix, wherein the midpoint bias value term is equal to 2 to the power of 12.

15. The method of claim 1, wherein the method further comprises:

right-shifting each coefficient in the matrix of transformed coefficients by thirteen positions to generate a matrix of pixel component values; and constructing the block of pixels by incorporating pixel component values in the matrix of pixel component values into pixels in the block of pixels.

16. The method of claim 1, wherein scaling each coefficients in the 8×8 matrix of encoded coefficients comprises scaling the coefficients in the matrix of encoded coefficients without using multiplication or division operations.

17. A device comprising:

a processor programmed to control, a scaling module that scales each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients;

wherein A=1024, B=1138, C=1730, D=1609, E=1264, F=1922, G=1788, H=2923, I=2718, and J=2528;

an inverse transform module that uses repeated applications of a fixed-point scaled one-dimensional transform to transform the matrix of scaled coefficients into a matrix of transformed coefficients;

a right-shift module that right-shifts transformed coefficients in the matrix of transformed coefficients in order to produce a matrix of adjusted coefficients; and wherein each adjusted coefficient in the matrix of adjusted coefficients approximates a corresponding value in a matrix of values that would be produced by applying an ideal two-dimensional inverse discrete cosine transform ("IDCT") to the matrix of encoded coefficients;

an output module that outputs an 8×8 block of pixels, wherein each pixel in the block of pixels includes a pixel component value based on an adjusted coefficient in the matrix of adjusted coefficients.

18. The device of claim 17, wherein the inverse transform module applies the fixed-point scaled one-dimensional transform to each row vector of the matrix of scaled coefficients to produce a matrix of intermediate coefficients and applies the fixed-point scaled one-dimensional transform to each column vector of the matrix of intermediate coefficients to produce a matrix of transformed coefficients.

19. The device of claim 17, wherein the output module displays the 8×8 block of pixels as part of a video frame in a video sequence.

20. The device of claim 19, wherein the output module display the 8×8 block of pixels as part of a still image.

21. The device of claim 17, wherein the scaling module:

scales a coefficient at position [0,0] of the matrix of encoded coefficients by the factor A;

scales a coefficient at position [0,1] of the matrix of encoded coefficients by the factor B;

scales a coefficient at position [0,2] of the matrix of encoded coefficients by the factor C;

scales a coefficient at position [0,3] of the matrix of encoded coefficients by the factor D;
scales a coefficient at position [0,4] of the matrix of encoded coefficients by the factor A;
scales a coefficient at position [0,5] of the matrix of encoded coefficients by the factor D;
scales a coefficient at position [0,6] of the matrix of encoded coefficients by the factor C;
scales a coefficient at position [0,7] of the matrix of encoded coefficients by the factor B;
scales a coefficient at position [1,0] of the matrix of encoded coefficients by the factor B;
scales a coefficient at position [1,1] of the matrix of encoded coefficients by the factor E;
scales a coefficient at position [1,2] of the matrix of encoded coefficients by the factor F;
scales a coefficient at position [1,3] of the matrix of encoded coefficients by the factor G;
scales a coefficient at position [1,4] of the matrix of encoded coefficients by the factor B;
scales a coefficient at position [1,5] of the matrix of encoded coefficients by the factor G;
scales a coefficient at position [1,6] of the matrix of encoded coefficients by the factor F;
scales a coefficient at position [1,7] of the matrix of encoded coefficients by the factor E;
scales a coefficient at position [2,0] of the matrix of encoded coefficients by the factor C;
scales a coefficient at position [2,1] of the matrix of encoded coefficients by the factor F;
scales a coefficient at position [2,2] of the matrix of encoded coefficients by the factor H;
scales a coefficient at position [2,3] of the matrix of encoded coefficients by the factor I;
scales a coefficient at position [2,4] of the matrix of encoded coefficients by the factor C;
scales a coefficient at position [2,5] of the matrix of encoded coefficients by the factor I;
scales a coefficient at position [2,6] of the matrix of encoded coefficients by the factor H;
scales a coefficient at position [2,7] of the matrix of encoded coefficients by the factor F;
scales a coefficient at position [3,0] of the matrix of encoded coefficients by the factor D;
scales a coefficient at position [3,1] of the matrix of encoded coefficients by the factor G;
scales a coefficient at position [3,2] of the matrix of encoded coefficients by the factor I;
scales a coefficient at position [3,3] of the matrix of encoded coefficients by the factor J;
scales a coefficient at position [3,4] of the matrix of encoded coefficients by the factor D;
scales a coefficient at position [3,5] of the matrix of encoded coefficients by the factor J;
scales a coefficient at position [3,6] of the matrix of encoded coefficients by the factor I;
scales a coefficient at position [3,7] of the matrix of encoded coefficients by the factor G;
scales a coefficient at position [4,0] of the matrix of encoded coefficients by the factor A;
scales a coefficient at position [4,1] of the matrix of encoded coefficients by the factor B;
scales a coefficient at position [4,2] of the matrix of encoded coefficients by the factor C;
scales a coefficient at position [4,3] of the matrix of encoded coefficients by the factor D;
scales a coefficient at position [4,4] of the matrix of encoded coefficients by the factor A;
scales a coefficient at position [4,5] of the matrix of encoded coefficients by the factor D;
scales a coefficient at position [4,6] of the matrix of encoded coefficients by the factor C;
scales a coefficient at position [4,7] of the matrix of encoded coefficients by the factor B;
scales a coefficient at position [5,0] of the matrix of encoded coefficients by the factor D;
scales a coefficient at position [5,1] of the matrix of encoded coefficients by the factor G;
scales a coefficient at position [5,2] of the matrix of encoded coefficients by the factor I;
scales a coefficient at position [5,3] of the matrix of encoded coefficients by the factor J;
scales a coefficient at position [5,4] of the matrix of encoded coefficients by the factor D;
scales a coefficient at position [5,5] of the matrix of encoded coefficients by the factor J;
scales a coefficient at position [5,6] of the matrix of encoded coefficients by the factor I;
scales a coefficient at position [5,7] of the matrix of encoded coefficients by the factor G;
scales a coefficient at position [6,0] of the matrix of encoded coefficients by the factor C;
scales a coefficient at position [6,1] of the matrix of encoded coefficients by the factor F;
scales a coefficient at position [6,2] of the matrix of encoded coefficients by the factor H;
scales a coefficient at position [6,3] of the matrix of encoded coefficients by the factor I;
scales a coefficient at position [6,4] of the matrix of encoded coefficients by the factor C;
scales a coefficient at position [6,5] of the matrix of encoded coefficients by the factor I;
scales a coefficient at position [6,6] of the matrix of encoded coefficients by the factor H;
scales a coefficient at position [6,7] of the matrix of encoded coefficients by the factor F;
scales a coefficient at position [7,0] of the matrix of encoded coefficients by the factor B;
scales a coefficient at position [7,1] of the matrix of encoded coefficients by the factor scales a coefficient at position [7,2] of the matrix of encoded coefficients by the factor F;
scales a coefficient at position [7,3] of the matrix of encoded coefficients by the factor G;
scales a coefficient at position [7,4] of the matrix of encoded coefficients by the factor B;
scales a coefficient at position [7,5] of the matrix of encoded coefficients by the factor G;
scales a coefficient at position [7,6] of the matrix of encoded coefficients by the factor F; and
scales a coefficient at position [7,7] of the matrix of encoded coefficients by the factor E.

22. The device of claim 17, wherein the inverse transform module applies the transform to a row vector or a column vector by:
calculating a value x0' by adding x0 and x4;
calculating a value x4' by adding x0 and −x4;
calculating a value (x2*$\alpha$) by multiplying x2 by a value $\alpha$;
calculating a value (x6*$\beta$) by multiplying x6 by a value $\beta$;
calculating a value (x2*$\beta$) by multiplying x2 by the value $\beta$;
calculating a value (x6*$\alpha$) by multiplying x6 by a value $\alpha$;
calculating a value x2' by adding (x2*$\alpha$) and −(x6*$\beta$);

calculating a value x6' by adding (x6*α) and (x2*β);
calculating a value x0" by adding x0' and x6';
calculating a value x4" by adding x4' and x2';
calculating a value x2" by adding x4' and −x2';
calculating a value x6" by adding x0' and −x6';
calculating a value x7' by adding x1 and −x7;
calculating a value x1' by adding x1 and x7;
calculating a value x7" by adding x7' and x5';
calculating a value x3" by adding x1' and −x3';
calculating a value x5" by adding x7' and −x5';
calculating a value x1" by adding x3' and x1';
calculating a value (x7"*ε) by multiplying x7" and a value ε;
calculating a value (x7"*ζ) by multiplying x7" and a value ζ;
calculating a value (x3"*γ) by multiplying x3" and a value γ;
calculating a value (x3"*δ) by multiplying x3" and a value δ;
calculating a value (x5"*δ) by multiplying x5" and the value δ;
calculating a value (x5"*γ) by multiplying x5" and the value γ;
calculating a value (x1"*ζ) by multiplying x1" and the value ζ;
calculating a value (x1"*ε) by multiplying x1" and the value ε;
calculating a value x7''' by adding (x7"*ε) and −(x1"*ζ);
calculating a value x3''' by adding (x3"*γ) and −(x5"*δ);
calculating a value x5''' by adding (x5"*γ) and (x3"*δ);
calculating a value x1''' by adding (x1"*ε) and (x7"*ζ);
calculating a value X0 by adding x7''' and x0";
calculating a value X1 by adding x4" and x5''';
calculating a value X2 by adding x2" and x3''';
calculating a value X3 by adding x6" and x7''';
calculating a value X4 by adding x6" and −x1''';
calculating a value X5 by adding x2" and −x3''';
calculating a value X6 by adding x4" and −x5'''; and
calculating a value X7 by adding x0" and −x1''';
wherein x0, x1, x2, x3, x4, x5, x6, x7 are coefficients in a row vector or a column vector,
wherein X1, X2, X3, X4, X5, X6, and X7 are output values of the transform; and
wherein α=41/128, β=99/128, γ=113/128, δ=719/4096, ε=1533/2048, and ζ=1/2.

23. The device of claim 22, wherein the inverse transform module applies the transform to the matrix of coefficients without using Multiplication or division operations.

24. The device of claim 23,
wherein the inverse transform module calculates a value (x1*ε) by multiplying x1 and the value ε and wherein calculating the value (x1*ζ) by x1 and the value ζ by performing the following sequence of arithmetic operations:
calculating a value y1, wherein y1=(x1>>9)−x1;
calculating the value (x1*ζ) by right-shifting x3 by one position; and
calculating the value (x1*E) by subtracting y1 from (y1>>2); and
wherein the inverse transform module calculates a value (x7*ε) by multiplying x7 and the value ε and wherein calculating the value (x7*ζ) by x7 and the value ζ by performing the following sequence of arithmetic operations:
calculating a value y1', wherein y1'=(x7>>9)−x7;
calculating the value (x7*ζ) by right-shifting x7 by one position; and
calculating the value (x7*ε) by subtracting y1' from (y1'>>2); and
wherein the inverse transform module calculates a value (x1"*ε) by multiplying x1" and the value ε and wherein calculating the value (x1"*ζ) by x1" and the value ζ by performing the following sequence of arithmetic operations:
calculating a value y1", wherein y1"=(x1">>9)−x1";
calculating the value (x1"*ζ) by right-shifting x1" by one position; and
calculating the value (x1"*ε) by subtracting y1" from (y1">>2); and
wherein the inverse transform module calculates a value (x7"*ε) by multiplying x7" and the value ε and wherein calculating the value (x7"*ζ) by x7" and the value ζ by performing the following sequence of arithmetic operations:
calculating a value y1''', wherein y1'''=(x7">>9)−x7";
calculating the value (x7"*ζ) by right-shifting x7" by one position; and
calculating the value (x7"*ε) by subtracting y1''' from (y1'''>>2).

25. The device of claim 23,
wherein the inverse transform module calculates a value (x3*γ) by multiplying x3 and a value γ and wherein calculating a value (x3*ε) by multiplying x3 and a value δ by performing the following sequence of operations:
calculating a value y2, wherein y2=(x3>>3)−(x3>>7);
calculating a value y3, wherein y3=y2−(x3>>11);
calculating the value (x3*δ)=y2+(y3>>1); and
calculating the value (x3*γ) by subtracting y2 from x3; and
wherein the inverse transform module calculates a value (x5*δ) by multiplying x5 and the value δ and wherein calculating a value (x5*γ) by multiplying x5 and the value γ by performing the following sequence of operations:
calculating a value y2', wherein y2'=(x5>>3)−(x5>>7);
calculating a value y3', wherein y3'=y2'−(x5>>11);
calculating the value (x5*δ) by adding y2' and (y3'>>1); and
calculating the value (x5*γ) by subtracting y2' from x5; and
wherein the inverse transform module calculates a value (x3"*γ) by multiplying x3" and a value γ and wherein calculating a value (x3"*δ) by multiplying x3" and a value δ by performing the following sequence of operations:
calculating a value y2", wherein y2"=(x3">>3)−(x3">>7);
calculating a value y3", wherein y3"=y2"−(x3">>11);
calculating the value (x3"*δ)=y2"+(y3">>1); and
calculating the value (x3"*γ) by subtracting y2" from x3"; and
wherein the inverse transform module calculates a value (x5"*δ) by multiplying x5" and the value δ and wherein calculating a value (x5"*γ) by multiplying x5" and the value γ by performing the following sequence of operations:
calculating a value y2''', wherein y2'''=(x5">>3)−(x5">>7);
calculating a value y3''', wherein y3'''=y2'−(x5">>11);
calculating the value (x5"*δ) by adding y2''' and (y3'''>>1); and
calculating the value (x5"*γ) by subtracting y2''' from x5".

26. The device of claim 23,
wherein the inverse transform module calculates the value (x2*α) by multiplying x2 by a value α and calculates the value (x2*β) by multiplying x2 by the value β by performing the following sequence of operations:

calculating a value y1, wherein y1=x2+(x2>>5);
calculating a value y2, wherein y2=y1>>2;
calculating the value (x2*α) by adding y2 and (x2>>4); and
calculating the value (x2*β) by subtracting y2 from y1; and
wherein the inverse transform module calculates the value (x6*α) by multiplying x6 by a value α and calculates the value (x6*β) by multiplying x6 by the value β by performing the following sequence of operations:
calculating a value y1', wherein y1'=x6+(x6>>5);
calculating a value y2', wherein y2'=y1'>>2;
calculating the value (x6*α) by adding y2' and (x6>>4); and
calculating the value (x6*β) by subtracting y2' from y1'; and
wherein the inverse transform module calculates a value (x2"*α) by multiplying x2" by a value α and wherein calculating a value (x2"β) by multiplying x2" by a value β by performing the following sequence of operations:
calculating a value y1", wherein y1"=x2"+(x2">>5);
calculating a value y2", wherein y2"=y1">>2;
calculating the value (x2"*α) by adding y2" and (x2">>4); and
calculating the value (x2"*β) by subtracting y2" from y1"; and
wherein the inverse transform module calculate a value (x6"*α) by multiplying x6" by a value α and wherein calculating a value (x6"*β) by multiplying x6" by a value β by performing the following sequence of operations:
calculating a value y1'", wherein y1'"=x2+(x6">>5);
calculating a value y2", wherein y2'=y1'">>2;
calculating the value (x6"*α) by adding y2'" and (x6">>4); and
calculating the value (x6"*β) by subtracting y2'" from y1'".

27. The device of claim 22, wherein the values x0, x1, x2, x3, x4, x5, x6, x7, x0', x1', x2', x3', x4', x5', x6', x7', x0", x1", x2", x3", x4", x5", x6", x7", x1'"x3'", x5'", x7'", (x2*α), (x6*β), (x2*β), (x6*α), (x7"*ϵ), (x7"*ζ), (x3"*γ), (x3"*δ), (x5"*δ), (x5"*γ), (x1"*ζ), and (x1"*ϵ) are represented using fixed-point numbers that include P bits in the mantissa portions of the fixed-point numbers.

28. The device of claim 27, wherein P is equal to 10.

29. The device of claim 17, wherein the device comprises a network interface that receives data from which the matrix of encoded coefficients is derived.

30. The device of claim 17, wherein the device comprises a coefficient biasing module that adds a midpoint bias term to a DC coefficient, wherein the midpoint bias term is equal to 2 to the power of 12.

31. The device of claim 30, wherein the device further comprises:
a right-shift module that right-shifts each coefficient in the matrix of transformed coefficients by thirteen positions to generate a matrix of pixel component values; and
a pixel reconstruction module that constructs the block of pixels by incorporating pixel component values in the matrix of pixel component values into pixels in the block of pixels.

32. The device of claim 17, wherein the device further comprises a media presentation unit to display the block of pixels.

33. The device of claim 17, wherein the scaling module scales the encoded coefficients without using multiplication or division operations.

34. A device comprising:
means for scaling coefficients in an 8×8 matrix of encoded coefficients by one of a factor A, a factor B, a factor C, a factor D, a factor E, a factor F, a factor G, a factor H, a factor I, or a factor J in order to produce a matrix of scaled coefficients, wherein A=1024, B=1138, C=1730, D=1609, E=1264, F=1922, G=1788, H=2923, I=2718, and J=2528;
means for using repeated applications of a fixed-point scaled one-dimensional transform to transform the matrix of scaled coefficients into a matrix of transformed coefficients;
means for right-shifting transformed coefficients in the matrix of transformed coefficients in order to produce a matrix of adjusted coefficients;
wherein each adjusted coefficient in the matrix of adjusted coefficients approximates a corresponding value in a matrix of values that would be produced by applying an ideal two-dimensional inverse discrete cosine transform ("IDCT") to the matrix of encoded coefficients; and
means for outputting an 8×8 block, of pixels, wherein each pixel in the block of pixels includes a pixel component value based on an adjusted coefficient in the matrix of adjusted coefficients.

35. The device of claim 34, wherein the means for using repeatedly applications of the fixed-point scaled one-dimensional transform comprises:
means for applying the fixed-point scaled one-dimensional transform to each row vector of the matrix of scaled coefficients to produce a matrix of intermediate coefficients and
means for applying the fixed-point scaled one-dimensional transform to each column vector of the matrix of intermediate coefficients to produce a matrix of transformed coefficients.

36. The device of claim 34, wherein the means for outputting the 8×8 block of pixels displays the 8×8 block of pixels as part of a video frame in a video sequence.

37. The device of claim 34, wherein the means for outputting the 8×8 block of pixels displays the 8×8 block of pixels as part of a still image.

38. The device of claim 34, wherein the means for scaling coefficients comprises:
means for scaling a coefficient at position [0,0] of the matrix of encoded coefficients by the factor A;
means for scaling a coefficient at position [0,1] of the matrix of encoded coefficients by the factor B;
means for scaling a coefficient at position [0,2] of the matrix of encoded coefficients by the factor C;
means for scaling a coefficient at position [0,3] of the matrix of encoded coefficients by the factor D;
means for scaling a coefficient at position [0,4] of the matrix of encoded coefficients by the factor A;
means for scaling a coefficient at position [0,5] of the matrix of encoded coefficients by the factor D;
means for scaling a coefficient at position [0,6] of the matrix of encoded coefficients by the factor C;
means for scaling a coefficient at position [0,7] of the matrix of encoded coefficients by the factor B;
means for scaling a coefficient at position [1,0] of the matrix of encoded coefficients by the factor B;
means for scaling a coefficient at position [1,1] of the matrix of encoded coefficients by the factor E;
means for scaling a coefficient at position [1,2] of the matrix of encoded coefficients by the factor F;
means for scaling a coefficient at position [1,3] of the matrix of encoded coefficients by the factor G;

means for scaling a coefficient at position [1,4] of the matrix of encoded coefficients by the factor B;
means for scaling a coefficient at position [1,5] of the matrix of encoded coefficients by the factor G;
means for scaling a coefficient at position [1,6] of the matrix of encoded coefficients by the factor F;
means for scaling a coefficient at position [1,7] of the matrix of encoded coefficients by the factor E;
means for scaling a coefficient at position [2,0] of the matrix of encoded coefficients by the factor C;
means for scaling a coefficient at position [2,1] of the matrix of encoded coefficients by the factor F;
means for scaling a coefficient at position [2,2] of the matrix of encoded coefficients by the factor H;
means for scaling a coefficient at position [2,3] of the matrix of encoded coefficients by the factor I;
means for scaling a coefficient at position [2,4] of the matrix of encoded coefficients by the factor C;
means for scaling a coefficient at position [2,5] of the matrix of encoded coefficients by the factor I;
means for scaling a coefficient at position [2,6] of the matrix of encoded coefficients by the factor H;
means for scaling a coefficient at position [2,7] of the matrix of encoded coefficients by the factor F;
means for scaling a coefficient at position [3,0] of the matrix of encoded coefficients by the factor D;
means for scaling a coefficient at position [3,1] of the matrix of encoded coefficients by the factor G;
means for scaling a coefficient at position [3,2] of the matrix of encoded coefficients by the factor I;
means for scaling a coefficient at position [3,3] of the matrix of encoded coefficients by the factor J;
means for scaling a coefficient at position [3,4] of the matrix of encoded coefficients by the factor D;
means for scaling a coefficient at position [3,5] of the matrix of encoded coefficients by the factor J;
means for scaling a coefficient at position [3,6] of the matrix of encoded coefficients by the factor I;
means for scaling a coefficient at position [3,7] of the matrix of encoded coefficients by the factor G;
means for scaling a coefficient at position [4,0] of the matrix of encoded coefficients by the factor A;
means for scaling a coefficient at position [4,1] of the matrix of encoded coefficients by the factor B;
means for scaling a coefficient at position [4,2] of the matrix of encoded coefficients by the factor C;
means for, scaling a coefficient at position [4,3] of the matrix of encoded coefficients by the factor D;
means for scaling a coefficient at position [4,4] of the matrix of encoded coefficients by the factor A;
means for scaling a coefficient at position [4,5] of the matrix of encoded coefficients by the factor D;
means for scaling a coefficient at position [4,6] of the matrix of encoded coefficients by the factor C;
means for scaling a coefficient at position [4,7] of the matrix of encoded coefficients by the factor B;
means for scaling a coefficient at position [5,0] of the matrix of encoded coefficients by the factor D;
means for scaling a coefficient at position [5,1] of the matrix of encoded coefficients by the factor G;
means for scaling a coefficient at position [5,2] of the matrix of encoded coefficients by the factor I;
means for scaling a coefficient at position [5,3] of the matrix of encoded coefficients by the factor J;
means for scaling a coefficient at position [5,4] of the matrix of encoded coefficients by the factor D;
means for scaling a coefficient at position [5,5] of the matrix of encoded coefficients by the factor J;
means for scaling a coefficient at position [5,6] of the matrix of encoded coefficients by the factor 1;
means for scaling a coefficient at position [5,7] of the matrix of encoded coefficients by the factor G;
means for scaling a coefficient at position [6,0] of the matrix of encoded coefficients by the factor C;
means for scaling a coefficient at position [6,1] of the matrix of encoded coefficients by the factor F;
means for scaling a coefficient at position [6,2] of the matrix of encoded coefficients by the factor H;
means for scaling a coefficient at position [6,3] of the matrix of encoded coefficients by the factor I;
means for scaling a coefficient at position [6,4] of the matrix of encoded coefficients by the factor C;
means for scaling a coefficient at position [6,5] of the matrix of encoded coefficients by the factor I;
means for scaling a coefficient at position [6,6] of the matrix of encoded coefficients by the factor H;
means for scaling a coefficient at position [6,7] of the matrix of encoded coefficients by the factor F;
means for scaling a coefficient at position [7,0] of the matrix of encoded coefficients by the factor B;
means for scaling a coefficient at position [7,1] of the matrix of encoded coefficients by the factor E;
means for scaling a coefficient at position [7,2] of the matrix of encoded coefficients by the factor F;
means for scaling a coefficient at position [7,3] of the matrix of encoded coefficients by the factor G;
means for scaling a coefficient at position [7,4] of the matrix of encoded coefficients by the factor B;
means for scaling a coefficient at position [7,5] of the matrix of encoded coefficients by the factor G;
means for scaling a coefficient at position [7,6] of the matrix of encoded coefficients by the factor F; and
means for scaling a coefficient at position [7,7] of the matrix of encoded coefficients by the factor E.

39. The device of claim 38, wherein the means for applying the transform comprise:
means for calculating a value x0' by adding x0 and x4;
means for calculating a value x4' by adding x0 and −x4;
means for calculating a value (x2*α) by multiplying x2 by a value α;
means for calculating a value (x6*0) by multiplying x6 by a value β;
means for calculating a value (x2*β) by multiplying x2 by the value β;
means for calculating a value (x6*α) by multiplying x6 by a value α;
means for calculating a value x2' by adding (x2*α) and −(x6*β);
means for calculating a value x6' by adding (x6*α) and (x2*β);
means for calculating a value x0" by adding x0' and x6';
means for calculating a value x4" by adding x4' and x2';
means for calculating a value x2" by adding x4' and −x2';
means for calculating a value x6" by adding x0' and −x6';
means for calculating a value x7' by adding x1 and −x7;
means for calculating a value x1' by adding x1 and x7;
means for calculating a value x7" by adding x7' and x5';
means for calculating a value x3" by adding x1' and −x3';
means for calculating a value x5" by adding x7' and −x5';
means for calculating a value x1" by adding x3' and x1';
means for calculating a value (x7"*ε) by multiplying x7" and a value ε;

means for calculating a value (x7"*ζ) by multiplying x7" and a value ζ; means for calculating a value (x3"*γ) by multiplying x3" and a value γ;

means for calculating a value (x3"*δ) by multiplying x3" and a value δ;

means for calculating a value (x5"*δ) by multiplying x5" and the value δ;

means for calculating a value (x5"*γ) by multiplying x5" and the value γ;

means for calculating a value (x1"*ζ) by multiplying x1" and the value ζ;

means for calculating a value (x1"*ε) by multiplying x1" and the value ε;

means for calculating a value x7'" by adding (x7"*ε) and −(x1"*ζ);

means for calculating a value x3'" by adding (x3"*γ) and −(x5"*δ);

means for calculating a value x5' by adding (x5"*γ) and (x3"*δ);

means for calculating a value −x1" by adding (x1"*ε) and (x7"*ζ);

means for calculating a value X0 by adding x7'" and x0";
means for calculating a value X1 by adding x4" and x5'";
means for calculating a value X2 by adding x2" and x3'";
means for calculating a value X3 by adding x6" and x7'";
means for calculating a value X4 by adding x6" and −x1";
means for calculating a value X5 by adding x2" and −x3'";
means for calculating a value X6 by adding x4" and −x5'; and
means for calculating a value X7 by adding x0" and −x1";

wherein x0, x1, x2, x3, x4, x5, x6, x7 are coefficients in a row vector or a column vector, wherein X1, X2, X3, X4, X5, X6, and X7 are output values of the transform; and wherein α=41/128, β=99/128, γ=113/128, δ=719/4096, ε=1533/2048, and ζ=1/2.

40. The device of claim 39, wherein the means for using repeated applications of the transform applies the transform to the matrix of coefficients without using multiplication or division operations.

41. The device of claim 40, wherein the means for calculating a value (x1*ε) by multiplying x1 and the value ε and wherein the means for calculating the value (x1*ζ) by x1 and the value ζ comprise:

means for calculating a value y1, wherein y1=(x1>>9)−x1;

means for calculating the value (x1*ζ) by right-shifting x3 by one position; and means for calculating the value (x1*ζ) by subtracting y1 from (y1>>2); and wherein the means for calculating a value (x7*ε) by multiplying x7 and the value ε and wherein the means for calculating the value (x7*ζ) by x7 and the value ζ comprise:

means for calculating a value y1', wherein y1'=(x7>>9)−x7;

means for calculating the value (x7*ζ) by right-shifting x7 by one position; and means for calculating the value (x7*ε) by subtracting y1' from (y1'>>2); and wherein the means for calculating a value (x1"*ε) by multiplying x1" and the value ε and wherein the means for calculating the value (x1"*ζ) by x1" and the value comprise:

means for calculating a value y1", wherein y1"=(x1">>9)−x1";

means for calculating the value (x1"*ζ) by right-shifting x1" by one position; and means for calculating the value (x1"*ε) by subtracting y1" from (y1">>2); and wherein the means for calculating a value (x7"*ε) by multiplying x7" and the value ε and wherein the means for calculating the value (x7"*ζ) by x7" and the value ζ comprise:

means for calculating a value y1'", wherein y1'"= (x7">>9)−x7";

means for calculating the value (x7"*ζ) by right-shifting x7" by one position; and means for calculating the value (x7"*ε) by subtracting y1'" from (y1'">>2).

42. The device of claim 40, wherein the means for calculating a value (x3*γ) by multiplying x3 and a value γ and wherein the means for calculating a value (x3*δ) by multiplying x3 and a value δ comprise:

means for calculating a value y2, wherein y2=(x3>>3)−(x3>>7);

means for calculating a value y3, wherein y3=y2−(x3>>11);

means for calculating the value (x3*δ)=y2+(y3>>1); and means for calculating the value (x3*γ) by subtracting y2 from x1; and wherein the means for calculating a value (x5*δ) by multiplying x5 and the value δ and wherein the means for calculating a value (x5*γ) by multiplying x5 and the value γ comprise:

means for calculating a value y2', wherein y2'=(x5>>3)−(x5>>7);

means for calculating a value y3', wherein y3'=y2'−(x5>>11);

means for calculating the value (x5*δ) by adding y2' and (y3'>>1); and means for calculating the value (x5*γ) by subtracting y2' from x7; and wherein the means for calculating a value (x3"*γ) by multiplying x3" and a value γ and wherein the means for calculating a value (x3"*δ) by multiplying x3" and a value δ comprise:

means for calculating a value y2", wherein y2"=(x1">>3)−(x1">>7);

means for calculating a value y3", wherein y3"=y2"−(x1">>11);

means for calculating the value (x1"*δ)=y2"+(y3">>1); and means for calculating the value (x1"*γ) by subtracting y2" from x1"; and wherein the means for calculating a value (x5"*δ) by multiplying x5" and the value δ and wherein the means for calculating a value (x5"*γ) by multiplying x5" and the value γ comprise:

means for calculating a value y2'", wherein y2'"=(x5">>3)−(x5">>7);

means for calculating a value y3'", wherein y3'"=y2'"−(x5">>11);

means for calculating the value (x5"*δ) by adding y2'" and (y3'">>1); and means for calculating the value (x5"*γ) by subtracting y2'" from x5".

43. The device of claim 40, wherein the means for calculating the value (x2*α) by multiplying x2 by a value α and wherein the means for calculating the value (x2*β) by multiplying x2 by the value β comprise:

means for calculating a value y1, wherein y1'=x2+ (x2>>5);

means for calculating a value y2, wherein y2=y1>>2;

means for calculating the value (x2*α) by adding y2 and (x2>>4); and means for calculating the value (x2*β) by subtracting y2 from y1; and wherein the means for calculating the value (x6*α) by multiplying x6 by a value α and wherein the means for calculating the value (x6*β) by multiplying x6 by the value β comprise:

means for calculating a value y1', wherein y1'=x6+ (x6>>5);

means for calculating a value y2', wherein y2'=y1'>>2;

means for calculating the value (x2*α) by adding y2' and (x6>>4); and means for calculating the value (x2*β) by subtracting y2' from y1'; and wherein the means for calculating a value (x2"*α) by multiplying x2" by a value α and wherein the means for calculating a value (x2"*β) by multiplying x2" by a value β comprises:

means for calculating a value y1", wherein y1"=x2"+ (x2">>5);

means for calculating a value y2", wherein y2"=y1">>2;

means for calculating the value (x2"*α) by adding y2" and (x2">>4); and means for calculating the value (x2"*β) by subtracting y2" from y1"; and wherein the means for calculating a value (x6"sα) by multiplying x6" by a value a and wherein the means for calculating a value (x6"*β) by multiplying x6" by a value β comprises:

means for calculating a value y1'", wherein y1'"=x6"+ (x6">>5);

means for calculating a value y2'", wherein y2'"=y1'">>2;

means for calculating the value (x6"*α) by adding y2'" and (x6">>4); and means for calculating the value (x6"'*β) by subtracting y2'" from y1'".

44. The device of claim 39, wherein the values x0, x1, x2, x3, x4, x5, x6, x7, x0', x1', x2', x3', x4', x5', x6', x7', x0", x1", x2", x3", x4", x5", x6", x7", x1'"x3'", x5'", x7'", (x2*α), (x6*β), (x2*β), (x6*α), (x7"*ε), (x7"*ζ), (x3"*γ), (x3"*δ), (x5"*δ), (x5"*γ), (x1"*ζ), and (x1"*ε) are represented using fixed-point numbers that include P bits in the mantissa portions of the fixed-point numbers.

45. The device of claim 44, wherein P is equal to 10.

46. The device of claim 34, wherein the device comprises means for receiving a media file that includes data from which the matrix of encoded coefficients is derived.

47. The device of claim 34, wherein the device comprises means for adding a midpoint bias term to a DC coefficient, wherein the midpoint bias term is equal to 2 to the power of 12.

48. The device of claim 34, wherein the device further comprises:

means for right-shifting each coefficient in the matrix of transformed coefficients by thirteen positions to generate a matrix of pixel component values; and means for constructing the block of pixels by incorporating pixel component values in the matrix of pixel component values into pixels in the block of pixels.

49. The device of claim 34, wherein the device further comprises means for displaying the block of pixels.

50. The device of claim 34, wherein the means for scaling encoded coefficients scales the encoded coefficients without using multiplication or division operations.

51. A non-transitory computer-readable medium comprising instructions, when executed the instructions cause a programmable processor to:

scale each coefficient in an 8×8 matrix of encoded coefficients by one of a factor A, a factor B, a factor C, a factor D, a factor E, a factor F, a factor G, a factor H, a factor I, or a factor J in order to produce a matrix of scaled coefficients, wherein A=1024, B=1138, C=1730, D=1609, E=1264, F=1922, G=1788, H=2923, I=2718, and J=2528;

use repeated applications a fixed-point scaled one-dimensional transform to transform the matrix of scaled coefficients into a matrix of transformed coefficients, right-shift transformed coefficients in the matrix of transformed coefficients in order to produce a matrix of adjusted coefficients;

wherein each adjusted coefficient in the matrix of adjusted coefficients approximates a corresponding value in a matrix of values that would be produced by applying an ideal two-dimensional inverse discrete cosine transform ("IDCT") to the matrix of encoded coefficients; and output signals that cause a display unit to display an 8×8 block of pixels, wherein each pixel in the block of pixels includes a pixel component value based on an adjusted coefficient in the matrix of adjusted coefficients.

52. The computer-readable medium of claim 51, wherein the instructions cause the programmable processor to repeatedly apply the fixed-point scaled one-dimensional transform by causing the programmable processor to:

apply the transform to each row vector of the matrix of scaled coefficients to produce a matrix of intermediate coefficients;

apply the transform to each column vector of the matrix of intermediate coefficients to produce a matrix of transformed coefficients.

53. The computer-readable medium of claim 51, wherein the instructions that cause the programmable processor to output signals that cause the display unit to display the 8×8 block of pixels cause the programmable processor to output signals that cause the display unit to display the 8×8 block of pixels as part of a video frame in a video sequence.

54. The computer-readable medium of claim 51, wherein the instructions that cause the programmable processor to output signals that cause the display unit to display the 8×8 block of pixels cause the programmable processor to output signals that cause the display unit to display the 8×8 block of pixels as part of a still image.

55. The computer-readable medium of claim 51, wherein the instructions that cause the processor to scale the coefficients in the matrix of coefficients cause the processor to:

scale a coefficient at position [0,0] of the matrix of encoded coefficients by the factor A;

scale a coefficient at position [0,1] of the matrix of encoded coefficients by the factor B;

scale a coefficient at position [0,2] of the matrix of encoded coefficients by the factor C;

scale a coefficient at position [0,3] of the matrix of encoded coefficients by the factor D;

scale a coefficient at position [0,4] of the matrix of encoded coefficients by the factor A;

scale a coefficient at position [0,5] of the matrix of encoded coefficients by the factor D;

scale a coefficient at position [0,6] of the matrix of encoded coefficients by the factor C;

scale a coefficient at position [0,7] of the matrix of encoded coefficients by the factor B;
scale a coefficient at position [1,0] of the matrix of encoded coefficients by the factor B;
scale a coefficient at position [1,1] of the matrix of encoded coefficients by the factor E;
scale a coefficient at position [1,2] of the matrix of encoded coefficients by the factor F;
scale a coefficient at position [1,3] of the matrix of encoded coefficients by the factor G;
scale a coefficient at position [1,4] of the matrix of encoded coefficients by the factor B;
scale a coefficient at position [1,5] of the matrix of encoded coefficients by the factor G;
scale a coefficient at position [1,6] of the matrix of encoded coefficients by the factor F;
scale a coefficient at position [1,7] of the matrix of encoded coefficients by the factor E;
scale a coefficient at position [2,0] of the matrix of encoded coefficients by the factor C;
scale a coefficient at position [2,1] of the matrix of encoded coefficients by the factor F;
scale a coefficient at position [2,2] of the matrix of encoded coefficients by the factor H;
scale a coefficient at position [2,3] of the matrix of encoded coefficients by the factor I;
scale a coefficient at position [2,4] of the matrix of encoded coefficients by the factor C;
scale a coefficient at position [2,5] of the matrix of encoded coefficients by the factor I;
scale a coefficient at position [2,6] of the matrix of encoded coefficients by the factor H;
scale a coefficient at position [2,7] of the matrix of encoded coefficients by the factor F;
scale a coefficient at position [3,0] of the matrix of encoded coefficients by the factor D;
scale a coefficient at position [3,1] of the matrix of encoded coefficients by the factor G;
scale a coefficient at position [3,2] of the matrix of encoded coefficients by the factor I;
scale a coefficient at position [3,3] of the matrix of encoded coefficients by the factor J;
scale a coefficient at position [3,4] of the matrix of encoded coefficients by the factor D;
scale a coefficient at position [3,5] of the matrix of encoded coefficients by the factor J;
scale a coefficient at position [3,6] of the matrix of encoded: coefficients by the factor I;
scale a coefficient at position [3,7] of the matrix of encoded coefficients by the factor G;
scale a coefficient at position [4,0] of the matrix of encoded coefficients by the factor A;
scale a coefficient at position [4,1] of the matrix of encoded coefficients by the factor B;
scale a coefficient at position [4,2] of the matrix of encoded coefficients by the factor C;
scale a coefficient at position [4,3] of the matrix of encoded coefficients by the factor D;
scale a coefficient at position [4,4] of the matrix of encoded coefficients by the factor A;
scale a coefficient at position [4,5] of the matrix of encoded coefficients by the factor D;
scale a coefficient at position [4,6] of the matrix of encoded coefficients by the factor C;
scale a coefficient at position [4,7] of the matrix of encoded coefficients by the factor B;
scale a coefficient at position [5,0] of the matrix of encoded coefficients by the factor D;
scale a coefficient at position [5,1] of the matrix of encoded coefficients by the factor G;
scale a coefficient at position [5,2] of the matrix of encoded coefficients by the factor I;
scale a coefficient at position [5,3] of the matrix of encoded coefficients by the factor J;
scale a coefficient at position [5,4] of the matrix of encoded coefficients by the factor D;
scale a coefficient at position [5,5] of the matrix of encoded coefficients by the factor J;
scale a coefficient at position [5,6] of the matrix of encoded coefficients by the factor I;
scale a coefficient at position [5,7] of the matrix of encoded coefficients by the factor G;
scale a coefficient at position [6,0] of the matrix of encoded coefficients by the factor C;
scale a coefficient at position [6,1] of the matrix of encoded coefficients by the factor scale a coefficient at position [6,2] of the matrix of encoded coefficients by the factor H;
scale a coefficient at position [6,3] of the matrix of encoded coefficients by the factor I;
scale a coefficient at position [6,4] of the matrix of encoded coefficients by the factor C;
scale a coefficient at position [6,5] of the matrix of encoded coefficients by the factor I;
scale a coefficient at position [6,6] of the matrix of encoded coefficients by the factor H;
scale a coefficient at position [6,7] of the matrix of encoded coefficients by the factor F;
scale a coefficient at position [7,0] of the matrix of encoded coefficients by the factor B;
scale a coefficient at position [7,1] of the matrix of encoded coefficients by the factor E;
scale a coefficient at position [7,2] of the matrix of encoded coefficients by the factor F;
scale a coefficient at position [7,3] of the matrix of encoded coefficients by the factor G;
scale a coefficient at position [7,4] of the matrix of encoded coefficients by the factor B;
scale a coefficient at position [7,5] of the matrix of encoded coefficients by the factor G;
scale a coefficient at position [7,6] of the matrix of encoded coefficients by the factor F; and to scale a coefficient at position [7,7] of the matrix of encoded coefficients by the factor E.

56. The computer-readable medium of claim 55, wherein the instructions that cause the processor to apply the transform to either a row vector or a column vector cause the processor to:
calculate a value x0' by adding x0 and x4;
calculate a value x4' by adding x0 and −x4;
calculate a value (x2*$\alpha$) by multiplying x2 by a value $\alpha$;
calculate a value (x6*$\beta$) by multiplying x6 by a value $\beta$;
calculate a value (x2*$\beta$) by multiplying x2 by the value $\beta$;
calculate a value (x6*$\alpha$) by multiplying x6 by a value $\alpha$;
calculate a value x2' by adding (x2*$\alpha$) and −(x6*$\beta$);
calculate a value x6' by adding (x6*$\alpha$) and (x2*$\beta$);
calculate a value x0" by adding x0' and x6';
calculate a value x4" by adding x4' and x2';
calculate a value x2" by adding x4' and −x2';
calculate a value x6" by adding x0' and −x6';
calculate a value x7' by adding x1 and −x7;
calculate a value x1' by adding x1 and x7;
calculate a value x7" by adding x7' and x5';

calculate a value x3" by adding x1' and −x3';
calculate a value x5" by adding x7' and −x5';
calculate a value x1" by adding x3' and x1';
calculate a value (x7"*ε) by multiplying x7" and a value ε;
calculate a value (x7"*ζ) by multiplying x7" and a value ζ;
calculate a value (x3"*γ) by multiplying x3" and a value γ;
calculate a value (x3"*δ) by multiplying x3" and a value δ;
calculate a value (x5"*δ) by multiplying x5" and the value δ;
calculate a value (x5"*γ) by multiplying x5" and the value γ;
calculate a value (x1"*ζ) by multiplying x1" and the value ζ;
calculate a value (x1"*ε) by multiplying x1" and the value ε;
calculate a value x7'" by adding (x7*ε) and −(x1"*ζ);
calculate a value x3'" by adding (x3"*γ) and −(x5"*δ);
calculate a value x5'" by adding (x5"*γ) and (x3"*δ);
calculate a value x1'" by adding (x1"*δ) and (x7"*ζ);
calculate a value X0 by adding x7'" and x0";
calculate a value X1 by adding x4" and x5'";
calculate a value X2 by adding x2" and x3'";
calculate a value X3 by adding x6" and x7'";
calculate a value X4 by adding x6" and −x1'";
calculate a value X5 by adding x2" and −x3'";
calculate a value X6 by adding x4" and −x5'"; and to
calculate a value X7 by adding x0" and −x1'";
wherein x0, x1, x2, x3, x4, x5, x6, x7 are coefficients in a row vector or a column vector,
wherein X1, X2, X3, X4, X5, X6, and X7 are output values of the transform;
wherein α=41/128, β=99/128, γ=113/128, δ=719/4096, ε=1533/2048, and ζ=1/2.

57. The computer-readable medium of claim 56, wherein the instructions cause the processor to apply the transform by causing the processor to apply the transform to coefficients in one of the row vectors or one of the column vectors without using multiplication or division operations.

58. The computer-readable medium of claim 57,
wherein the instructions cause the programmable processor to calculate a value (x1*ε) by multiplying x1 and the value ε and wherein the instructions cause the programmable processor to calculate the value (x1*ζ) by x1 and the value ζ by causing the programmable processor to:
calculate a value y1, wherein y1=(x1>>9)−x1;
calculate the value (x1*ζ) by right-shifting x3 by one position; and
calculate the value (x1*ε) by subtracting y1 from (y1>>2); and
wherein the instructions cause the programmable processor to calculate a value (x7*ε) by multiplying x7 and the values ε and wherein the instructions cause the programmable processor to calculate the value (x7*ζ) by x7 and the value ζ by causing the programmable processor to:
calculate a value y1', wherein y1'=(x7>>9)−x7;
calculate the value (x7*ζ) by right-shifting x7 by one position; and
calculate the value (x7*ε) by subtracting y1' from (y1'>>2); and
wherein the instructions cause the programmable processor to calculate a value (x1'"*ε) by multiplying x1" and the value ε and wherein the instructions cause the programmable processor to calculate the value (x1"*ζ) by x1" and the value ζ by causing the programmable processor to:
calculate a value y1", wherein y1"=(x1">>9)−x1";
calculate the value (x1"*ζ) by right-shifting x1" by one position; and
calculate the value (x1"*ε) by subtracting y1" from (y1">>2); and
wherein the instructions cause the programmable processor to calculate a value (x7"*ε) by multiplying x7" and the value α and wherein the instructions cause the programmable processor to calculate the value (x7"*ζ) by x7" and the value ζ by causing the programmable processor to:
calculate a value y1'", wherein y1'"=(x7">>9)−x7";
calculate the value (x7"*ζ) by right-shifting x7" by one position; and
calculate the value (x7"*ε) by subtracting y1'" from (y1'">>2).

59. The computer-readable medium of claim 58,
wherein the instructions cause the programmable processor to calculate a value (x3*γ) by multiplying x3 and a value γ and wherein the instructions cause the programmable processor to calculate a value (x3*δ) by multiplying x3 and a value δ by causing the programmable processor to:
calculate a value y2, wherein y2=(x3>>3)−(x3>>7);
calculate a value y3, wherein y3=y2−(x3>>11);
calculate the value (x3*δ)=y2+(y3>>1); and
calculate the value (x3*γ) by subtracting y2 from x3; and
wherein the instructions cause the programmable processor to calculate a value (x5*δ) by multiplying x5 and the value 8 and wherein the instructions cause the programmable processor to calculate a value (x5*γ) by multiplying x5 and the value γ by causing the programmable processor to:
calculate a value y2', wherein y2'=(x5>>3)−(x5>>7);
calculate a value y3', wherein y3'=y2'−(x5>>11);
calculate the value (x5*δ) by adding y2' and (y3'>>1); and
calculate the value (x5*γ) by subtracting y2' from x5; and
wherein the instructions cause the programmable processor to calculate a value (x3"*γ) by multiplying x3" and a value γ and wherein the instructions cause the programmable processor to calculate a value (x3"*δ) by multiplying x3" and a value δ by causing the programmable processor to:
calculate a value y2", wherein y2"=(x3">>3)−(x3">>7);
calculate a value y3", wherein y3"=y2"−(x3">>11);
calculate the value (x3"*δ)=y2"+(y3">>1); and
calculate the value (x3"*γ) by subtracting y2" from x3"; and
wherein the instructions cause the programmable processor to calculate a value (x5"*δ) by multiplying x5" and the value δ and wherein the instructions cause the programmable processor to calculate a value (x5"*γ) by multiplying x5" and the value γ by causing the programmable processor to:
calculate a value y2'", wherein y2'"=(x5">>3)−(x5">>7);
calculate a value y3'", wherein y3'"=y2'"−(x5">>11);
calculate the value (x5"*δ) by adding y2'" and (y3'">>1); and
calculate the value (x5"*γ) by subtracting y2'" from x5".

60. The computer-readable medium of claim 58,
wherein the instructions cause the programmable processor to calculate a value (x2*α) by multiplying x2 by a value α and wherein the instructions cause the programmable processor to calculate a value (x2*β) by multiplying x2 by a value β by causing the programmable processor to:
calculate a value y1, wherein y1=x2+(x2>>5);
calculate a value y2, wherein y2=y1>>2;

calculate the value (x2*α) by adding y2 and (x2>>4); and
calculate the value (x2*β) by subtracting y2 from y1; and
wherein the instructions cause the programmable processor to calculate a value (x6*α) by multiplying x6 by a value α and wherein the instructions cause the programmable processor to calculate a value (x6*β) by multiplying x6 by a value β by causing the programmable processor to:
calculate a value y1', wherein y1'=x6+(x6>>5);
calculate a value y2', wherein y2'=y1'>>2;
calculate the value (x6*α) by adding y2' and (x6>>4); and
calculate the value (x6*β) by subtracting y2' from y1'; and
wherein the instructions cause the programmable processor to calculate a value (x2"*α) by multiplying x2" by a value α and wherein the instructions cause the programmable processor to calculate a value (x2"*β) by multiplying x2" by a value β by causing the programmable processor to:
calculate a value y1", wherein y1"=x2"+(x2">>5);
calculate a value y2", wherein y2"=y1">>2;
calculate the value (x2"*α) by adding y2" and (x2">>4); and
calculate the value (x2"*β) by subtracting y2" from y1"; and
wherein the instructions cause the programmable processor to calculate a value (x6"*α) by multiplying x6" by a value α and wherein the instructions cause the programmable processor to calculate a value (x6"*β) by multiplying x6" by a value β by causing the programmable processor to:
calculate a value y1'", wherein y1'"=x6"+(x6">>5);
calculate a value y2'", wherein y2'"=y1'">>2;
calculate the value (x6"*α) by adding y2'" and (x6">>4); and
calculate the value (x6"*β) by subtracting y2'" from y1'".

61. The computer-readable medium of claim 56, wherein the values x0, x1, x2, x3, x4, x5, x6, x7, x0', x1', x2', x3', x4', x5', x6', x7', x0", x1", x2", x3", x4", x5", x6", x7", x1'"x3'", x5'", x7'", (x2*α), (x6*β), (x2*β), (x6*α), (x7"*ε), (x7"*ε), (x3"*γ), (x3"*δ), (x5"*δ), (x5"*γ), (x1"*ζ), and (x1"*ε) are represented using fixed-point numbers that include P bits in the mantissa portions of the fixed-point numbers.

62. The computer-readable medium of claim 61, wherein P is equal to 10.

63. The computer-readable medium of claim 51, wherein the instructions further cause the processor to receive a bitstream that includes the matrix of encoded coefficients.

64. The computer-readable medium of claim 51, wherein the instructions further cause the processor to add a midpoint bias term to a DC coefficient of the matrix, wherein the midpoint bias value term is equal to 2 to the power of 12.

65. The computer-readable medium of claim 51, wherein the instructions further cause the processor to:
right-shift each coefficient in the matrix of transformed coefficients by thirteen positions to generate a matrix of pixel component values; and
construct the block of pixels by incorporating pixel component values in the matrix of pixel component values into pixels in the block of pixels.

66. The computer-readable medium of claim 51, wherein the instructions that cause the processor to scale the encoded coefficients cause the processor to scale the coefficients in the matrix of encoded coefficients without using multiplication or division operations.

* * * * *